(12) United States Patent
Chang et al.

(10) Patent No.: US 10,915,296 B2
(45) Date of Patent: Feb. 9, 2021

(54) INFORMATION APPARATUS THAT INCLUDES A TOUCH SENSITIVE SCREEN INTERFACE FOR MANAGING OR REPLYING TO E-MAILS

(71) Applicant: Flexiworld Technologies, Inc., Vancouver, WA (US)

(72) Inventors: William Ho Chang, Vancouver, WA (US); Christina Ying Liu, Fremont, CA (US)

(73) Assignee: Flexiworld Technologies, Inc., Vancouver, WA (US)

( * ) Notice: Subject to any disclaimer, the term of this patent is extended or adjusted under 35 U.S.C. 154(b) by 0 days.

(21) Appl. No.: 16/444,261

(22) Filed: Jun. 18, 2019

(65) Prior Publication Data

US 2019/0303100 A1  Oct. 3, 2019

Related U.S. Application Data

(63) Continuation-in-part of application No. 16/200,380, filed on Nov. 26, 2018, which is a continuation of
(Continued)

(51) Int. Cl.
*G06F 15/16* (2006.01)
*G06F 3/16* (2006.01)
(Continued)

(52) U.S. Cl.
CPC .............. *G06F 3/167* (2013.01); *G06F 3/041* (2013.01); *G06F 3/048* (2013.01); *G06F 3/0412* (2013.01);
(Continued)

(58) Field of Classification Search
CPC ........ G06F 3/167; G06F 3/041; G06F 3/0412; G06F 3/048; G06F 3/0482; G06F 3/0488;
(Continued)

(56) References Cited

U.S. PATENT DOCUMENTS 3,629,493 A  12/1971 Morgenfruh
3,833,297 A   9/1974 Swartz
(Continued)

FOREIGN PATENT DOCUMENTS

CN  1217503 A  5/1999
CN  1488106 A  4/2004
(Continued)

OTHER PUBLICATIONS

Office Action prepared by the US Patent and Trademark Office for U.S. Appl. No. 14/866,143, dated Aug. 25, 2017, 25 pages.
(Continued)

*Primary Examiner* — Melvin H Pollack
(74) *Attorney, Agent, or Firm* — Chernoff Vilhauer LLP

(57) ABSTRACT

An information apparatus that supports a touch sensitive screen for managing e-mails is disclosed and enabled. The information apparatus may include a graphical user interface, an e-mail application, an Internet browsing application, and applications for playing audio/video content. The information apparatus includes an operating system software and support for installation of new applications. In one example, a user of the information apparatus may reply to an e-mail by selecting an item over the touch sensitive screen. The user may scroll down or up an email using the touch sensitive screen. In other examples, the user may further select an item or functional control via the touch sensitive screen to output, synchronize, stream, transmit, play, print, display, or mirror at least part of digital content from the information apparatus to one or more output devices over air.

20 Claims, 13 Drawing Sheets

Related U.S. Application Data application No. 15/332,432, filed on Oct. 24, 2016, now Pat. No. 10,140,071, which is a continuation of application No. 10/053,765, filed on Jan. 18, 2002, now Pat. No. 9,836,257, application No. 16/444,261, which is a continuation of application No. 16/229,896, filed on Dec. 21, 2018, now Pat. No. 10,642,576, which is a continuation of application No. 15/201,194, filed on Jul. 1, 2016, now Pat. No. 10,162,596, which is a continuation of application No. 13/710,295, filed on Dec. 10, 2012, now Pat. No. 9,383,956, which is a continuation of application No. 12/903,048, filed on Oct. 12, 2010, now Pat. No. 8,332,521, which is a continuation of application No. 10/016,223, filed on Nov. 1, 2001, now Pat. No. 7,941,541, application No. 16/444,261, which is a continuation-in-part of application No. 15/973,317, filed on May 7, 2018, now Pat. No. 10,346,114, which is a continuation of application No. 09/992,413, filed on Nov. 18, 2001, now Pat. No. 9,965,233.

(60) Provisional application No. 60/262,764, filed on Jan. 19, 2001, provisional application No. 60/252,682, filed on Nov. 20, 2000, provisional application No. 60/245,101, filed on Nov. 1, 2000.

(51) Int. Cl.

| | | |
|---|---|---|
| *H04L 12/28* | (2006.01) | |
| *G06F 3/048* | (2013.01) | |
| *H04M 1/247* | (2021.01) | |
| *H04L 12/24* | (2006.01) | |
| *G06Q 20/32* | (2012.01) | |
| *H04W 4/12* | (2009.01) | |
| *G06F 3/12* | (2006.01) | |
| *G06F 3/041* | (2006.01) | |
| *G06Q 20/40* | (2012.01) | |
| *H04W 64/00* | (2009.01) | |
| *G06F 3/0488* | (2013.01) | |
| *G06F 3/0482* | (2013.01) | |
| *G06F 3/14* | (2006.01) | |
| *H04W 88/02* | (2009.01) | |
| *H04W 76/10* | (2018.01) | |

(52) U.S. Cl.
CPC .......... *G06F 3/0482* (2013.01); *G06F 3/0488* (2013.01); *G06F 3/12* (2013.01); *G06F 3/1206* (2013.01); *G06F 3/126* (2013.01); *G06F 3/1226* (2013.01); *G06F 3/1247* (2013.01); *G06F 3/1285* (2013.01); *G06F 3/1292* (2013.01); *G06F 3/14* (2013.01); *G06F 15/16* (2013.01); *G06Q 20/327* (2013.01); *G06Q 20/3224* (2013.01); *G06Q 20/3226* (2013.01); *G06Q 20/3278* (2013.01); *G06Q 20/405* (2013.01); *G06Q 20/4012* (2013.01); *G06Q 20/40145* (2013.01); *H04L 12/2805* (2013.01); *H04L 41/0803* (2013.01); *H04M 1/2478* (2013.01); *H04W 4/12* (2013.01); *H04W 64/003* (2013.01); *H04W 88/02* (2013.01); *G06Q 2220/00* (2013.01); *H04L 12/2809* (2013.01); *H04L 12/2838* (2013.01); *H04L 2012/285* (2013.01); *H04L 2012/2841* (2013.01); *H04L 2012/2849* (2013.01); *H04W 76/10* (2018.02)

(58) Field of Classification Search
CPC ........ G06F 3/12; G06F 3/1206; G06F 3/1226; G06F 3/1247; G06F 3/126; G06F 3/1285; G06F 3/1292; G06F 3/14; G06F 15/16; G06Q 20/3224; G06Q 20/3226; G06Q 20/327; G06Q 20/3278; G06Q 20/4012; G06Q 20/40145; G06Q 20/405; G06Q 2220/00; H04L 12/2805; H04L 41/0803; H04L 12/2809; H04L 12/2838; H04L 2012/2841; H04L 2012/2849; H04L 2012/285; H04M 1/2478; H04W 4/12; H04W 64/003; H04W 88/02; H04W 76/10
USPC ...................................................... 709/204
See application file for complete search history.

(56) References Cited

U.S. PATENT DOCUMENTS

| | | |
|---|---|---|
| 3,848,856 A | 11/1974 | Reeber et al. |
| 4,262,301 A | 4/1981 | Erlichman |
| 4,266,863 A | 5/1981 | Hollingsworth et al. |
| 4,291,956 A | 9/1981 | Vogelgesang |
| 4,291,957 A | 9/1981 | Hollingsworth |
| 4,301,599 A | 11/1981 | Leay |
| 4,335,955 A | 6/1982 | Lopata |
| 4,340,905 A | 7/1982 | Balding |
| 4,360,264 A | 11/1982 | Baker et al. |
| 4,417,792 A | 11/1983 | Martin |
| 4,428,001 A | 1/1984 | Yamamura et al. |
| 4,431,282 A | 2/1984 | Martin |
| 4,435,059 A | 3/1984 | Gerber |
| 4,495,490 A | 1/1985 | Hopper et al. |
| 4,539,585 A | 9/1985 | Spackova et al. |
| 4,541,010 A | 9/1985 | Alston |
| 4,553,835 A | 11/1985 | Morgan, Jr. |
| 4,580,880 A | 4/1986 | Watson |
| 4,602,280 A | 7/1986 | Maloomian |
| 4,603,330 A | 7/1986 | Horne et al. |
| 4,758,881 A | 7/1988 | Laspada |
| 4,956,665 A | 9/1990 | Niles |
| 4,958,220 A | 9/1990 | Alessi et al. |
| 4,979,032 A | 12/1990 | Alessi et al. |
| 5,048,057 A | 9/1991 | Saleh et al. |
| 5,129,639 A | 7/1992 | DeHority |
| 5,166,809 A | 11/1992 | Surbrook |
| 5,220,674 A | 6/1993 | Morgan et al. |
| 5,228,118 A | 7/1993 | Sasaki |
| 5,257,097 A | 10/1993 | Pineau et al. |
| 5,270,773 A | 12/1993 | Sklut et al. |
| 5,287,194 A | 2/1994 | Lobiondo |
| 5,303,342 A | 4/1994 | Edge |
| 5,319,711 A | 6/1994 | Servi |
| 5,337,258 A | 8/1994 | Dennis |
| 5,353,388 A | 10/1994 | Motoyama |
| 5,404,433 A | 4/1995 | Hosogai |
| 5,412,798 A | 5/1995 | Garney |
| 5,463,623 A | 10/1995 | Grimes et al. |
| 5,467,434 A | 11/1995 | Hower, Jr. et al. |
| 5,475,507 A | 12/1995 | Suzuki et al. |
| 5,479,206 A | 12/1995 | Ueno et al. |
| 5,485,634 A | 1/1996 | Weiser et al. |
| 5,487,069 A | 1/1996 | O'Sullivan et al. |
| 5,490,287 A | 2/1996 | Itoh et al. |
| 5,506,661 A | 4/1996 | Hanzawa |
| 5,515,480 A | 5/1996 | Frazier |
| 5,519,641 A | 5/1996 | Beers et al. |
| 5,524,185 A | 6/1996 | Na |
| 5,537,107 A | 7/1996 | Funado |
| 5,537,517 A | 7/1996 | Wakabayashi et al. |
| 5,546,079 A | 8/1996 | Wagner |
| 5,564,109 A | 10/1996 | Snyder et al. |
| 5,566,278 A | 10/1996 | Patel et al. |
| 5,568,595 A | 10/1996 | Yosefi et al. |
| 5,572,632 A | 11/1996 | Laumeyer et al. |
| 5,574,979 A | 11/1996 | West |
| 5,580,177 A | 12/1996 | Gase et al. |
| 5,589,889 A | 12/1996 | Kawaoka |

(56) References Cited

U.S. PATENT DOCUMENTS

| | | |
|---|---|---|
| 5,596,697 A | 1/1997 | Foster et al. |
| 5,604,843 A | 2/1997 | Shaw et al. |
| 5,613,123 A | 3/1997 | Tsang et al. |
| 5,613,124 A | 3/1997 | Atkinson et al. |
| 5,613,191 A | 3/1997 | Hylton et al. |
| 5,619,257 A | 4/1997 | Reele et al. |
| 5,619,649 A | 4/1997 | Kovnat et al. |
| 5,625,757 A | 4/1997 | Kageyama et al. |
| 5,629,981 A | 5/1997 | Nerlikar |
| 5,636,211 A | 6/1997 | Newlin et al. |
| 5,644,662 A | 7/1997 | Vuylsteke |
| 5,664,243 A | 9/1997 | Okada et al. |
| 5,675,717 A | 10/1997 | Yamamoto |
| 5,687,332 A | 11/1997 | Kurahashi et al. |
| 5,699,495 A | 12/1997 | Snipp |
| 5,710,557 A | 1/1998 | Schuette |
| 5,717,688 A | 2/1998 | Belanger et al. |
| 5,717,742 A | 2/1998 | Hyde-Thomson |
| 5,724,106 A | 3/1998 | Autry et al. |
| 5,727,135 A | 3/1998 | Webb et al. |
| 5,737,501 A | 4/1998 | Tsunekawa |
| 5,739,928 A | 4/1998 | Scott |
| 5,748,859 A | 5/1998 | Takayanagi et al. |
| 5,754,655 A | 5/1998 | Hughes et al. |
| 5,757,952 A | 5/1998 | Buytaert et al. |
| 5,761,480 A | 6/1998 | Fukada et al. |
| 5,771,353 A | 6/1998 | Eggleston et al. |
| 5,793,966 A | 8/1998 | Amstein et al. |
| 5,796,394 A | 8/1998 | Wicks et al. |
| 5,796,727 A | 8/1998 | Harrison et al. |
| 5,799,067 A | 8/1998 | Kikinis et al. |
| 5,799,068 A | 8/1998 | Kikinis et al. |
| 5,802,314 A | 9/1998 | Tullis et al. |
| 5,822,230 A | 10/1998 | Kikinis et al. |
| 5,826,244 A | 10/1998 | Huberman |
| 5,831,664 A | 11/1998 | Wharton et al. |
| 5,832,191 A | 11/1998 | Thorne |
| 5,838,320 A | 11/1998 | Matthews, III et al. |
| 5,838,926 A | 11/1998 | Yamagishi |
| 5,845,078 A | 12/1998 | Tezuka et al. |
| 5,850,449 A | 12/1998 | McManis |
| 5,852,721 A | 12/1998 | Dillon et al. |
| 5,859,970 A | 1/1999 | Pleso |
| 5,862,321 A | 1/1999 | Lamming et al. |
| 5,862,404 A | 1/1999 | Onaga |
| 5,867,633 A | 2/1999 | Taylor, III et al. |
| 5,870,723 A | 2/1999 | Pare, Jr. et al. |
| 5,880,858 A | 3/1999 | Jin |
| 5,881,213 A | 3/1999 | Shaw et al. |
| 5,884,140 A | 3/1999 | Ishizaki et al. |
| 5,897,260 A | 4/1999 | Zingher |
| 5,903,832 A | 5/1999 | Seppanen et al. |
| 5,907,831 A | 5/1999 | Lotvin et al. |
| 5,911,044 A | 6/1999 | Lo et al. |
| 5,916,309 A | 6/1999 | Brown et al. |
| 5,917,542 A | 6/1999 | Moghadam et al. |
| 5,926,104 A | 7/1999 | Robinson |
| 5,930,466 A | 7/1999 | Rademacher |
| 5,931,919 A | 8/1999 | Thomas et al. |
| 5,933,498 A | 8/1999 | Schneck et al. |
| 5,937,112 A | 8/1999 | Herregods et al. |
| 5,940,843 A | 8/1999 | Zucknovich et al. |
| 5,946,031 A | 8/1999 | Douglas |
| 5,946,110 A | 8/1999 | Hu et al. |
| 5,946,458 A | 8/1999 | Austin et al. |
| 5,949,966 A | 9/1999 | Hayashi |
| 5,949,978 A | 9/1999 | Kondo et al. |
| 5,953,546 A | 9/1999 | Okada et al. |
| 5,960,162 A | 9/1999 | Yamamoto |
| 5,968,176 A | 10/1999 | Nessett et al. |
| 5,970,473 A | 10/1999 | Gerszberg et al. |
| 5,974,234 A | 10/1999 | Levine et al. |
| 5,974,401 A | 10/1999 | Enomoto et al. |
| 5,978,560 A | 11/1999 | Tan et al. |
| 5,983,200 A | 11/1999 | Slotznick |
| 5,987,454 A | 11/1999 | Hobbs |
| 5,993,047 A | 11/1999 | Novogrod et al. |
| 6,003,065 A | 12/1999 | Yan et al. |
| 6,006,265 A | 12/1999 | Rangan et al. |
| 6,008,777 A | 12/1999 | Yiu |
| 6,009,464 A | 12/1999 | Hamilton et al. |
| 6,020,973 A | 2/2000 | Levine et al. |
| 6,023,715 A | 2/2000 | Burkes et al. |
| 6,034,621 A | 3/2000 | Kaufman |
| 6,035,214 A | 3/2000 | Henderson |
| 6,041,346 A | 3/2000 | Chen et al. |
| 6,043,898 A | 3/2000 | Jacobs |
| 6,046,820 A | 4/2000 | Konishi |
| 6,061,142 A | 5/2000 | Shim |
| 6,069,707 A | 5/2000 | Pekelman |
| 6,070,185 A | 5/2000 | Anupam et al. |
| 6,072,595 A | 6/2000 | Yoshiura et al. |
| 6,076,076 A | 6/2000 | Gottfreid |
| 6,076,109 A | 6/2000 | Kikinis |
| 6,078,906 A | 6/2000 | Huberman |
| 6,084,968 A | 7/2000 | Kennedy et al. |
| 6,087,060 A | 7/2000 | Chase et al. |
| 6,088,337 A | 7/2000 | Eastmond et al. |
| 6,088,450 A | 7/2000 | Davis et al. |
| 6,088,702 A | 7/2000 | Plantz et al. |
| 6,091,956 A | 7/2000 | Hollenberg |
| 6,101,291 A | 8/2000 | Amey et al. |
| 6,115,137 A | 9/2000 | Ozawa et al. |
| 6,122,526 A | 9/2000 | Parulski et al. |
| 6,138,178 A | 10/2000 | Watanabe |
| 6,141,659 A | 10/2000 | Barker et al. |
| 6,144,950 A | 11/2000 | Davies et al. |
| 6,144,997 A | 11/2000 | Lamming et al. |
| 6,145,031 A | 11/2000 | Mastie et al. |
| 6,148,346 A | 11/2000 | Hanson |
| 6,167,514 A | 12/2000 | Matsui et al. |
| 6,169,789 B1 | 1/2001 | Rao et al. |
| 6,173,407 B1 | 1/2001 | Yoon et al. |
| 6,175,922 B1 | 1/2001 | Wang |
| 6,177,926 B1 | 1/2001 | Kunert |
| 6,184,996 B1 | 2/2001 | Gase |
| 6,189,148 B1 | 2/2001 | Clark et al. |
| 6,189,993 B1 | 2/2001 | Mantell |
| 6,192,407 B1 | 2/2001 | Smith et al. |
| 6,195,564 B1 | 2/2001 | Rydbeck et al. |
| 6,199,099 B1 | 3/2001 | Gershman et al. |
| 6,199,106 B1 | 3/2001 | Shaw et al. |
| 6,201,611 B1 | 3/2001 | Carter et al. |
| 6,205,495 B1 | 3/2001 | Gilbert et al. |
| 6,211,858 B1 | 4/2001 | Moon et al. |
| 6,215,483 B1 | 4/2001 | Zigmond |
| 6,215,494 B1 | 4/2001 | Teo |
| 6,223,029 B1 | 4/2001 | Stenman et al. |
| 6,223,059 B1 | 4/2001 | Haestrup |
| 6,225,993 B1 | 5/2001 | Lindblad et al. |
| 6,226,098 B1 | 5/2001 | Kulakowski |
| 6,233,611 B1 | 5/2001 | Ludtke et al. |
| 6,236,971 B1 | 5/2001 | Stefik et al. |
| 6,246,486 B1 | 6/2001 | Takahashi |
| 6,252,964 B1 | 6/2001 | Wasilewski et al. |
| 6,255,961 B1 | 7/2001 | Van Ryzin et al. |
| 6,256,666 B1 | 7/2001 | Singhal |
| 6,263,503 B1 | 7/2001 | Margulis |
| 6,285,357 B1 | 9/2001 | Kushiro et al. |
| 6,285,889 B1 | 9/2001 | Nykänen et al. |
| 6,288,790 B1 | 9/2001 | Yellepeddy et al. |
| 6,292,283 B1 | 9/2001 | Grandbois |
| 6,312,106 B1 | 11/2001 | Walker |
| 6,324,521 B1 | 11/2001 | Shiota et al. |
| 6,330,611 B1 | 12/2001 | Itoh et al. |
| 6,332,193 B1 | 12/2001 | Glass et al. |
| 6,339,706 B1 | 1/2002 | Tillgren et al. |
| 6,360,252 B1 | 3/2002 | Rudy et al. |
| 6,363,149 B1 | 3/2002 | Candelore |
| 6,363,452 B1 | 3/2002 | Lach |
| 6,366,682 B1 | 4/2002 | Hoffman et al. |
| 6,366,912 B1 | 4/2002 | Wallent et al. |
| 6,366,965 B1 | 4/2002 | Binford et al. |
| 6,369,909 B1 | 4/2002 | Shima |

(56) References Cited

U.S. PATENT DOCUMENTS

| | | |
|---|---|---|
| 6,379,058 B1 | 4/2002 | Petteruti et al. |
| 6,385,305 B1 | 5/2002 | Gerzberg et al. |
| 6,389,010 B1 | 5/2002 | Kubler et al. |
| 6,393,271 B1 | 5/2002 | Dougherty |
| 6,396,531 B1 | 5/2002 | Gerszberg et al. |
| 6,396,598 B1 | 5/2002 | Kashiwagi et al. |
| 6,418,439 B1 | 7/2002 | Papierniak et al. |
| 6,421,716 B1 | 7/2002 | Eldridge et al. |
| 6,421,748 B1 | 7/2002 | Lin et al. |
| 6,426,798 B1 | 7/2002 | Yeung |
| 6,430,599 B1 | 8/2002 | Baker et al. |
| 6,430,601 B1 | 8/2002 | Eldridge et al. |
| 6,434,535 B1 | 8/2002 | Kupka et al. |
| 6,437,786 B1 | 8/2002 | Yasukawa |
| 6,442,375 B1 | 8/2002 | Parmentier |
| 6,449,052 B1 | 9/2002 | Sherer et al. |
| 6,452,692 B1 | 9/2002 | Yacoub |
| 6,453,127 B2 | 9/2002 | Wood et al. |
| 6,467,688 B1 | 10/2002 | Goldman et al. |
| 6,470,189 B1 | 10/2002 | Hill et al. |
| 6,473,070 B2 | 10/2002 | Mishra et al. |
| 6,473,800 B1 | 10/2002 | Jerger et al. |
| 6,477,575 B1 | 11/2002 | Koeppel et al. |
| 6,480,292 B1 | 11/2002 | Sugiyama |
| 6,483,906 B1 | 11/2002 | Iggulden et al. |
| 6,487,587 B1 | 11/2002 | Dubey |
| 6,487,599 B1 | 11/2002 | Smith et al. |
| 6,489,934 B1 | 12/2002 | Klausner |
| 6,493,104 B1 | 12/2002 | Cromer et al. |
| 6,493,550 B1 | 12/2002 | Raith |
| 6,496,855 B1 | 12/2002 | Hunt et al. |
| 6,510,235 B1 | 1/2003 | Shin et al. |
| 6,510,515 B1 | 1/2003 | Raith |
| 6,515,988 B1 | 2/2003 | Eldridge et al. |
| 6,519,049 B1 | 2/2003 | Nagaska |
| 6,526,129 B1 | 2/2003 | Beaton et al. |
| 6,529,522 B1 | 3/2003 | Ito et al. |
| 6,535,855 B1 | 3/2003 | Cahill et al. |
| 6,540,722 B1 | 4/2003 | Boyle et al. |
| 6,542,173 B1 | 4/2003 | Buckley |
| 6,542,491 B1 | 4/2003 | Tari et al. |
| 6,545,612 B1 | 4/2003 | Lindgren et al. |
| 6,545,669 B1 * | 4/2003 | Kinawi ................. G06F 3/0486 345/1.1 |
| 6,545,722 B1 | 4/2003 | Schultheiss et al. |
| 6,546,387 B1 | 4/2003 | Triggs |
| 6,546,419 B1 | 4/2003 | Humpleman et al. |
| 6,550,672 B1 | 4/2003 | Tracy et al. |
| 6,553,240 B1 | 4/2003 | Dervarics |
| 6,553,431 B1 | 4/2003 | Yamamoto et al. |
| 6,556,313 B1 | 4/2003 | Chang et al. |
| 6,560,651 B2 | 5/2003 | Katz et al. |
| 6,574,672 B1 | 6/2003 | Mitchell et al. |
| 6,577,861 B2 | 6/2003 | Ogasawara |
| 6,578,072 B2 | 6/2003 | Watanabe et al. |
| 6,584,903 B2 | 7/2003 | Jacobs |
| 6,587,835 B1 | 7/2003 | Treyz et al. |
| 6,598,031 B1 | 7/2003 | Ice |
| 6,600,569 B1 | 7/2003 | Osada et al. |
| 6,601,108 B1 | 7/2003 | Marmor |
| 6,604,135 B1 | 8/2003 | Rogers et al. |
| 6,604,148 B1 | 8/2003 | Dennison |
| 6,607,314 B1 | 8/2003 | McCannon et al. |
| 6,608,928 B1 | 8/2003 | Queiroz |
| 6,618,039 B1 | 9/2003 | Grant et al. |
| 6,618,592 B1 | 9/2003 | Vilander et al. |
| 6,621,589 B1 | 9/2003 | Al-Kazily et al. |
| 6,622,015 B1 | 9/2003 | Himmel et al. |
| 6,622,018 B1 | 9/2003 | Erekson |
| 6,623,527 B1 | 9/2003 | Hamzy |
| 6,628,302 B2 | 9/2003 | White et al. |
| 6,628,417 B1 | 9/2003 | Naito et al. |
| 6,633,346 B1 | 10/2003 | Yamamoto |
| 6,633,395 B1 | 10/2003 | Tuchitoi et al. |
| 6,633,757 B1 * | 10/2003 | Hermann ............ H04N 21/4126 370/908 |
| 6,636,202 B2 | 10/2003 | Ishmael, Jr. et al. |
| 6,636,259 B1 | 10/2003 | Anderson et al. |
| 6,643,650 B1 | 11/2003 | Slaughter et al. |
| 6,654,135 B2 | 11/2003 | Mitani |
| 6,658,625 B1 | 12/2003 | Allen |
| 6,670,982 B2 | 12/2003 | Clough et al. |
| 6,671,068 B1 | 12/2003 | Chang et al. |
| 6,678,004 B1 | 1/2004 | Schultheiss et al. |
| 6,678,751 B1 | 1/2004 | Hays et al. |
| 6,690,918 B2 | 2/2004 | Evans et al. |
| 6,694,371 B1 | 2/2004 | Sanai |
| 6,697,848 B2 | 2/2004 | Hamilton et al. |
| 6,701,009 B1 | 3/2004 | Makoto et al. |
| 6,702,181 B2 | 3/2004 | Ramachandran |
| 6,705,781 B2 | 3/2004 | Iwazaki |
| 6,707,581 B1 | 3/2004 | Browning |
| 6,711,677 B1 | 3/2004 | Wiegley |
| 6,725,281 B1 | 4/2004 | Zintel et al. |
| 6,735,616 B1 | 5/2004 | Thompson et al. |
| 6,738,841 B1 | 5/2004 | Wolff |
| 6,741,871 B1 | 5/2004 | Silverbrook et al. |
| 6,745,229 B1 | 6/2004 | Gobin et al. |
| 6,745,937 B2 | 6/2004 | Walsh et al. |
| 6,748,056 B1 * | 6/2004 | Capriotti ................. H04L 51/066 379/88.17 |
| 6,748,195 B1 | 6/2004 | Phillips |
| 6,750,978 B1 | 6/2004 | Marggraff et al. |
| 6,751,732 B2 | 6/2004 | Strobel et al. |
| 6,753,978 B1 | 6/2004 | Chang |
| 6,757,070 B1 | 6/2004 | Lin et al. |
| 6,760,745 B1 | 7/2004 | Tan et al. |
| 6,769,012 B1 * | 7/2004 | Liu ........................ H04L 51/22 709/204 |
| 6,771,749 B1 * | 8/2004 | Bansal ................... H04L 51/14 379/67.1 |
| 6,775,407 B1 | 8/2004 | Gindele et al. |
| 6,778,289 B1 | 8/2004 | Iwata |
| 6,784,855 B2 * | 8/2004 | Matthews ............. G06F 1/1601 345/1.1 |
| 6,785,727 B1 | 8/2004 | Yamazaki |
| 6,788,332 B1 | 9/2004 | Cook |
| 6,788,428 B1 | 9/2004 | Shimokawa |
| 6,789,107 B1 * | 9/2004 | Bates .................... G06Q 10/107 709/203 |
| 6,789,228 B1 | 9/2004 | Merril et al. |
| 6,792,148 B1 | 9/2004 | Wergeland et al. |
| 6,798,530 B1 | 9/2004 | Buckley et al. |
| 6,801,692 B2 | 10/2004 | Nishimura et al. |
| 6,801,962 B2 | 10/2004 | Taniguchi et al. |
| 6,813,039 B1 | 11/2004 | Silverbrook et al. |
| 6,816,274 B1 * | 11/2004 | Silverbrook ........ G06F 3/03545 358/1.15 |
| 6,816,724 B1 | 11/2004 | Asikainen |
| 6,819,919 B1 | 11/2004 | Tanaka |
| 6,826,632 B1 | 11/2004 | Wugofski |
| 6,839,623 B1 * | 1/2005 | Tillgren ................. B41J 2/315 701/420 |
| 6,839,775 B1 | 1/2005 | Kao et al. |
| 6,840,441 B2 | 1/2005 | Monaghan et al. |
| 6,845,398 B1 | 1/2005 | Galensky et al. |
| 6,850,252 B1 | 2/2005 | Hoffberg |
| 6,850,767 B1 * | 2/2005 | Maxymych ........... G06F 1/1616 362/154 |
| 6,856,430 B1 | 2/2005 | Gase |
| 6,857,021 B1 | 2/2005 | Schuster et al. |
| 6,857,132 B1 | 2/2005 | Rakib et al. |
| 6,857,716 B1 | 2/2005 | Nagahashi |
| 6,859,197 B2 | 2/2005 | Klein et al. |
| 6,859,228 B1 | 2/2005 | Chang et al. |
| 6,859,937 B1 | 2/2005 | Narayan et al. |
| 6,873,836 B1 | 3/2005 | Sorrells et al. |
| 6,882,859 B1 | 4/2005 | Rao et al. |
| 6,885,878 B1 * | 4/2005 | Borgstrom ............ G06F 16/955 455/556.1 |
| 6,888,643 B1 * | 5/2005 | Grimes ................... G06F 3/147 358/1.1 |

(56) References Cited

U.S. PATENT DOCUMENTS

| | | | |
|---|---|---|---|
| 6,889,385 B1 | 5/2005 | Rakib et al. | |
| 6,892,251 B2 | 5/2005 | Anderson et al. | |
| 6,895,444 B1* | 5/2005 | Weisshaar | H04L 29/06 709/203 |
| 6,898,640 B1* | 5/2005 | Kurita | H04L 65/1059 709/238 |
| 6,901,429 B2 | 5/2005 | Dowling | |
| 6,904,527 B1 | 6/2005 | Parlour et al. | |
| 6,909,424 B2* | 6/2005 | Liebenow | G06F 1/1626 345/168 |
| 6,914,694 B1 | 7/2005 | Ichikawa et al. | |
| 6,915,124 B1 | 7/2005 | Kiessling et al. | |
| 6,915,422 B1* | 7/2005 | Nakamura | G06F 21/35 713/155 |
| 6,922,258 B2 | 7/2005 | Pineau | |
| 6,930,709 B1 | 8/2005 | Creamer et al. | |
| 6,932,523 B1* | 8/2005 | Yamada | H04N 1/00209 400/77 |
| 6,941,014 B2 | 9/2005 | Lin et al. | |
| 6,947,067 B2 | 9/2005 | Halttunen | |
| 6,947,995 B2 | 9/2005 | Chang et al. | |
| 6,950,645 B1* | 9/2005 | Kammer | H04W 52/0229 455/343.1 |
| 6,952,414 B1 | 10/2005 | Willig | |
| 6,957,194 B2 | 10/2005 | Stefik et al. | |
| 6,958,821 B1 | 10/2005 | McIntyre | |
| 6,959,339 B1 | 10/2005 | Wu et al. | |
| 6,963,582 B1* | 11/2005 | Xu | H04L 12/4633 370/392 |
| 6,980,319 B2 | 12/2005 | Ohta | |
| 6,983,310 B2 | 1/2006 | Rouse et al. | |
| 6,990,548 B1 | 1/2006 | Kaylor | |
| 6,996,555 B2 | 2/2006 | Mute et al. | |
| 6,999,112 B2 | 2/2006 | Seaman et al. | |
| 7,004,395 B2 | 2/2006 | Koenck et al. | |
| 7,007,066 B1* | 2/2006 | Malik | G06Q 10/107 709/201 |
| 7,007,067 B1* | 2/2006 | Azvine | G06F 3/011 709/202 |
| 7,016,062 B2 | 3/2006 | Ishizuka | |
| 7,020,685 B1* | 3/2006 | Chen | H04W 88/02 455/403 |
| 7,024,200 B2 | 4/2006 | McKenna et al. | |
| 7,025,256 B1 | 4/2006 | Drummond et al. | |
| 7,028,102 B1 | 4/2006 | Larsson et al. | |
| 7,038,797 B1* | 5/2006 | Lapstun | G06F 3/04883 358/1.15 |
| 7,039,358 B1 | 5/2006 | Shellhammer et al. | |
| 7,039,445 B1 | 5/2006 | Yoshizawa | |
| 7,058,356 B2 | 6/2006 | Slotznick | |
| 7,062,651 B1 | 6/2006 | Lapstun et al. | |
| 7,068,621 B2 | 6/2006 | Bouet et al. | |
| 7,076,534 B1 | 7/2006 | Cleron et al. | |
| 7,076,730 B1* | 7/2006 | Baker | G06F 9/44 709/206 |
| 7,088,691 B2 | 8/2006 | Fujita | |
| 7,088,990 B1* | 8/2006 | Isomursu | H04W 88/02 455/412.1 |
| 7,095,854 B1 | 8/2006 | Ginter et al. | |
| 7,099,027 B1* | 8/2006 | Barry | G06F 3/1212 358/1.15 |
| 7,099,304 B2 | 8/2006 | Liu et al. | |
| 7,103,834 B1 | 9/2006 | Humpleman et al. | |
| 7,112,138 B2 | 9/2006 | Hedrick et al. | |
| 7,113,979 B1* | 9/2006 | Smith | H04L 51/12 709/204 |
| 7,133,845 B1 | 11/2006 | Ginter et al. | |
| 7,133,846 B1 | 11/2006 | Ginter et al. | |
| 7,139,591 B2 | 11/2006 | Callaghan et al. | |
| 7,143,356 B1 | 11/2006 | Shafrir et al. | |
| 7,149,726 B1 | 12/2006 | Lingle et al. | |
| 7,155,163 B2 | 12/2006 | Cannon et al. | |
| 7,164,413 B2 | 1/2007 | Davis et al. | |
| 7,164,885 B2 | 1/2007 | Jonsson et al. | |
| 7,170,857 B2 | 1/2007 | Stephens et al. | |
| 7,178,718 B2 | 2/2007 | Silverbrook et al. | |
| 7,180,614 B1 | 2/2007 | Senoo et al. | |
| 7,184,707 B2 | 2/2007 | Tada et al. | |
| 7,185,108 B1* | 2/2007 | Okachi | G06Q 30/02 709/207 |
| 7,187,947 B1 | 3/2007 | White et al. | |
| 7,197,531 B2 | 3/2007 | Anderson | |
| 7,203,721 B1 | 4/2007 | Ben-Efraim et al. | |
| 7,209,955 B1* | 4/2007 | Major | G06F 16/9535 709/207 |
| 7,213,061 B1* | 5/2007 | Hite | H04L 12/2803 361/803 |
| 7,215,436 B2 | 5/2007 | Hull et al. | |
| 7,221,961 B1* | 5/2007 | Fukumoto | G06F 1/1616 455/41.2 |
| 7,237,253 B1 | 6/2007 | Blackketter et al. | |
| 7,239,346 B1 | 7/2007 | Priddy | |
| 7,239,868 B2 | 7/2007 | Furukawa et al. | |
| 7,260,597 B1 | 8/2007 | Hofrichter et al. | |
| 7,262,873 B1* | 8/2007 | Rasche | H04N 1/00132 348/207.2 |
| 7,263,270 B1 | 8/2007 | Lapstun et al. | |
| 7,272,788 B2 | 9/2007 | Anderson et al. | |
| 7,283,808 B2* | 10/2007 | Castell | H04L 51/36 370/401 |
| 7,287,089 B1* | 10/2007 | Lamoureux | G06Q 30/06 709/204 |
| 7,289,792 B1* | 10/2007 | Turunen | H04L 51/38 370/254 |
| 7,289,964 B1* | 10/2007 | Bowman-Amuah | G06F 9/5038 705/1.1 |
| 7,305,713 B1 | 12/2007 | Crance | |
| 7,318,086 B2 | 1/2008 | Chang et al. | |
| 7,327,481 B2 | 2/2008 | Such et al. | |
| 7,330,110 B1 | 2/2008 | Heintzman et al. | |
| 7,334,024 B2 | 2/2008 | Martino | |
| 7,337,472 B2* | 2/2008 | Olsen | G06F 21/608 380/243 |
| 7,346,374 B2 | 3/2008 | Witkowski et al. | |
| 7,348,961 B1 | 3/2008 | Shneidman | |
| 7,349,722 B2 | 3/2008 | Witkowski et al. | |
| 7,349,955 B1 | 3/2008 | Korb et al. | |
| 7,353,280 B2* | 4/2008 | Chiles | H04L 12/4633 709/220 |
| 7,355,730 B2 | 4/2008 | Landau et al. | |
| 7,356,347 B1* | 4/2008 | Kammer | H04L 29/12811 455/517 |
| 7,359,714 B2 | 4/2008 | Parupudi et al. | |
| 7,360,230 B1 | 4/2008 | Paz et al. | |
| 7,366,468 B2 | 4/2008 | Yoshida | |
| 7,370,090 B2 | 5/2008 | Nakaoka et al. | |
| 7,376,583 B1 | 5/2008 | Rolf | |
| 7,379,660 B2 | 5/2008 | Shiohara | |
| 7,379,914 B2 | 5/2008 | Aoki et al. | |
| 7,379,958 B2 | 5/2008 | Karhu | |
| 7,383,355 B1* | 6/2008 | Berkman | G06F 9/541 709/201 |
| 7,403,510 B1 | 7/2008 | Miyake | |
| 7,412,651 B2 | 8/2008 | Lapstun et al. | |
| 7,428,575 B1* | 9/2008 | Motoyama | H04L 51/18 370/352 |
| 7,440,772 B2 | 10/2008 | White et al. | |
| 7,451,195 B1 | 11/2008 | Seligmann | |
| 7,454,796 B2 | 11/2008 | Mazzagatte et al. | |
| 7,460,853 B2 | 12/2008 | Toyoshima | |
| 7,477,890 B1 | 1/2009 | Narayanaswami | |
| 7,478,403 B1 | 1/2009 | Allavarpu et al. | |
| 7,483,958 B1 | 1/2009 | Elabbady et al. | |
| 7,511,630 B2 | 3/2009 | Strickland et al. | |
| 7,512,671 B1 | 3/2009 | Gladwin et al. | |
| 7,533,344 B1* | 5/2009 | Motoyama | G06F 11/3414 709/224 |
| 7,554,684 B1 | 6/2009 | Senoo et al. | |
| 7,555,287 B1 | 6/2009 | Heinonen et al. | |
| 7,571,142 B1 | 8/2009 | Flitcroft et al. | |
| 7,574,723 B2 | 8/2009 | Putterman et al. | |

(56) References Cited

U.S. PATENT DOCUMENTS

| | | |
|---|---|---|
| 7,580,005 B1 | 8/2009 | Palin |
| RE40,910 E | 9/2009 | Aoki et al. |
| 7,584,269 B2 | 9/2009 | Moore et al. |
| 7,587,196 B2 | 9/2009 | Hansen |
| 7,593,123 B2 | 9/2009 | Sugahara |
| 7,609,402 B2 | 10/2009 | Chang et al. |
| 7,616,600 B2 | 11/2009 | Sparr et al. |
| 7,630,721 B2 | 12/2009 | Ortiz |
| 7,644,039 B1 | 1/2010 | Magee et al. |
| 7,646,503 B2* | 1/2010 | Silverbrook ........ G06Q 20/3829 358/1.15 |
| 7,650,145 B2 | 1/2010 | Ukita et al. |
| 7,660,460 B2 | 2/2010 | Wu et al. |
| 7,660,601 B2 | 2/2010 | Janik et al. |
| 7,668,535 B2* | 2/2010 | Conneely ................ H04L 67/04 455/412.2 |
| 7,685,244 B2* | 3/2010 | Mousseau ............... H04L 51/14 709/206 |
| 7,688,467 B2* | 3/2010 | Enmei .................... G06F 1/165 358/1.15 |
| 7,697,467 B2 | 4/2010 | Kubler et al. |
| 7,712,125 B2 | 5/2010 | Herigstad et al. |
| 7,725,912 B2 | 5/2010 | Margulis |
| 7,738,886 B1* | 6/2010 | Connolly ............. H04Q 3/0029 455/461 |
| 7,743,133 B1 | 6/2010 | Motoyama et al. |
| RE41,416 E | 7/2010 | Liu et al. |
| 7,761,541 B1 | 7/2010 | Morley et al. |
| RE41,487 E | 8/2010 | Liu et al. |
| RE41,532 E | 8/2010 | Liu et al. |
| 7,779,097 B2 | 8/2010 | Lamkin et al. |
| RE41,689 E | 9/2010 | Liu et al. |
| 7,797,367 B1 | 9/2010 | Gelvin et al. |
| 7,805,720 B2 | 9/2010 | Chang et al. |
| RE41,882 E | 10/2010 | Liu et al. |
| 7,812,856 B2 | 10/2010 | Ortiz et al. |
| 7,814,516 B2 | 10/2010 | Stecyk et al. |
| 7,831,276 B2 | 11/2010 | Kumar |
| 7,840,639 B1* | 11/2010 | Gough ................ G06Q 10/107 709/206 |
| 7,890,581 B2* | 2/2011 | Rao ........................ H04L 67/16 709/204 |
| 7,900,833 B2 | 3/2011 | Silverbrook et al. |
| 7,904,579 B2 | 3/2011 | Janik et al. |
| 7,908,401 B2 | 3/2011 | Chang |
| 7,929,950 B1 | 4/2011 | Rao et al. |
| 7,937,450 B2 | 5/2011 | Janik |
| 7,941,541 B2 | 5/2011 | Chang et al. |
| 7,944,577 B2 | 5/2011 | Chang et al. |
| 7,949,223 B2 | 5/2011 | Shiohara |
| 7,953,818 B2 | 5/2011 | Chang et al. |
| 7,957,354 B1 | 6/2011 | Hickman et al. |
| 7,958,457 B1 | 6/2011 | Brandenberg et al. |
| 7,971,784 B2 | 7/2011 | Lapstun et al. |
| 7,984,098 B2 | 7/2011 | Enete et al. |
| 7,986,298 B1 | 7/2011 | Dulaney et al. |
| 7,991,347 B1 | 8/2011 | Chan |
| RE42,725 E | 9/2011 | Chang et al. |
| RE42,828 E | 10/2011 | Liu et al. |
| 8,045,952 B2 | 10/2011 | Qureshey et al. |
| 8,073,565 B2 | 12/2011 | Johnson |
| 8,086,961 B2 | 12/2011 | Saeki et al. |
| 8,098,140 B1 | 1/2012 | Escobosa et al. |
| RE43,181 E | 2/2012 | Liu et al. |
| 8,122,163 B2 | 2/2012 | Morohashi |
| 8,146,077 B2 | 3/2012 | McNally et al. |
| 8,169,649 B2 | 5/2012 | Chang et al. |
| 8,184,324 B2 | 5/2012 | Chang et al. |
| 8,285,802 B2 | 10/2012 | Chang et al. |
| 8,295,406 B1* | 10/2012 | Sorrells .................. H03D 7/00 375/340 |
| 8,296,757 B2 | 10/2012 | Chang et al. |
| 8,332,521 B2 | 12/2012 | Chang et al. |
| 8,339,496 B2 | 12/2012 | Shiohara |
| 8,359,397 B2 | 1/2013 | Traversat et al. |
| 8,386,557 B2 | 2/2013 | Fillebrown et al. |
| RE44,103 E | 3/2013 | Williams |
| 8,448,215 B2 | 5/2013 | Hassell et al. |
| 8,467,969 B2 | 6/2013 | Nielsen et al. |
| 8,533,352 B2 | 9/2013 | Chang |
| 8,583,263 B2 | 11/2013 | Hoffberg et al. |
| 8,595,717 B2 | 11/2013 | Chang et al. |
| 8,630,000 B2 | 1/2014 | Chang et al. |
| 8,705,097 B2 | 4/2014 | Chang et al. |
| 8,706,627 B2 | 4/2014 | Shore |
| 8,707,185 B2* | 4/2014 | Robinson ............... G06F 3/0481 715/751 |
| 8,711,408 B2 | 4/2014 | Chang et al. |
| 8,964,220 B2 | 2/2015 | Chang et al. |
| 8,972,610 B2 | 3/2015 | Chang |
| 8,989,064 B2 | 3/2015 | Chang et al. |
| 9,009,060 B2* | 4/2015 | McNally ............ G06Q 30/0623 705/5 |
| 9,015,329 B2 | 4/2015 | Chang et al. |
| 9,031,537 B2 | 5/2015 | Ortiz et al. |
| 9,036,181 B2 | 5/2015 | Chang et al. |
| 9,037,088 B2 | 5/2015 | Chang et al. |
| 9,042,811 B2 | 5/2015 | Chang et al. |
| 9,043,482 B2 | 5/2015 | Chang |
| 9,069,510 B2 | 6/2015 | Chang et al. |
| 9,075,504 B2* | 7/2015 | Takeuchi .......... H04M 1/72552 |
| 9,092,177 B2 | 7/2015 | Chang et al. |
| 9,092,535 B1* | 7/2015 | Gough ................. G06F 16/958 |
| 9,099,152 B2 | 8/2015 | Marcus |
| 9,100,825 B2 | 8/2015 | Schultz et al. |
| 9,110,622 B2 | 8/2015 | Chang et al. |
| 9,116,723 B2 | 8/2015 | Chang et al. |
| 9,122,429 B1 | 9/2015 | Cecile et al. |
| 9,164,718 B2 | 10/2015 | Chang et al. |
| 9,210,340 B2 | 12/2015 | Mizutani et al. |
| 9,298,407 B2 | 3/2016 | Chang et al. |
| 9,324,208 B2 | 4/2016 | Gagner et al. |
| 9,351,193 B2 | 5/2016 | Raleigh et al. |
| 9,383,956 B2 | 7/2016 | Chang et al. |
| 9,389,822 B2 | 7/2016 | Chang et al. |
| 9,491,523 B2 | 11/2016 | Margulis |
| 9,549,835 B2 | 1/2017 | Schreck et al. |
| 9,622,058 B1 | 4/2017 | Imes |
| 9,798,516 B2 | 10/2017 | Chang et al. |
| 9,819,710 B2 | 11/2017 | Anderson et al. |
| RE46,637 E | 12/2017 | Liu et al. |
| 9,836,257 B2 | 12/2017 | Chang et al. |
| 9,836,259 B2 | 12/2017 | Chang et al. |
| 9,841,935 B2 | 12/2017 | Chang et al. |
| 9,965,233 B2 | 5/2018 | Chang et al. |
| 9,971,555 B2 | 5/2018 | Chang et al. |
| 10,037,178 B2 | 7/2018 | Chang et al. |
| 10,055,634 B2 | 8/2018 | Han et al. |
| 10,108,394 B2 | 10/2018 | Chang et al. |
| 10,126,991 B2 | 11/2018 | Chang et al. |
| 10,133,527 B2 | 11/2018 | Chang et al. |
| 10,140,071 B2 | 11/2018 | Chang et al. |
| 10,140,072 B2 | 11/2018 | Chang et al. |
| 10,140,073 B2 | 11/2018 | Chang et al. |
| 10,152,285 B2 | 12/2018 | Chang et al. |
| 10,162,596 B2 | 12/2018 | Chang et al. |
| 10,261,739 B2 | 4/2019 | Chang et al. |
| 10,284,953 B2 | 5/2019 | Hammer et al. |
| 10,303,411 B2 | 5/2019 | Chang et al. |
| 10,346,114 B2 | 7/2019 | Chang et al. |
| 10,359,957 B2 | 7/2019 | Chang et al. |
| 10,387,087 B2 | 8/2019 | Chang et al. |
| 10,481,846 B2 | 11/2019 | Chang et al. |
| 10,481,847 B2 | 11/2019 | Chang et al. |
| 10,489,096 B2 | 11/2019 | Chang et al. |
| 10,592,201 B2 | 3/2020 | Chang et al. |
| 10,592,202 B2 | 3/2020 | Chang et al. |
| 10,606,535 B2 | 3/2020 | Chang et al. |
| 10,642,576 B2 | 5/2020 | Chang et al. |
| RE48,066 E | 6/2020 | Liu et al. |
| RE48,088 E | 7/2020 | Liu et al. |
| 10,740,066 B2 | 8/2020 | Chang et al. |
| 10,761,791 B2 | 9/2020 | Chang et al. |

(56) References Cited

U.S. PATENT DOCUMENTS

| | | |
|---|---|---|
| 10,768,871 B2 | 9/2020 | Chang et al. |
| 10,841,798 B2 | 11/2020 | Chang et al. |
| 10,846,031 B2 | 11/2020 | Chang et al. |
| 10,860,290 B2 | 12/2020 | Chang et al. |
| 10,866,773 B2 | 12/2020 | Chang et al. |
| 2001/0011302 A1 | 8/2001 | Son |
| 2001/0012281 A1 | 8/2001 | Hall et al. |
| 2001/0015717 A1 | 8/2001 | Mishra et al. |
| 2001/0019953 A1 | 9/2001 | Furukawa et al. |
| 2001/0029531 A1 | 10/2001 | Ohta |
| 2001/0032254 A1 | 10/2001 | Hawkins |
| 2001/0034222 A1 | 10/2001 | Roustaei et al. |
| 2001/0055492 A1 | 12/2001 | Wood et al. |
| 2001/0055951 A1 | 12/2001 | Slotznick |
| 2002/0002707 A1 | 1/2002 | Ekel et al. |
| 2002/0009988 A1 | 1/2002 | Murata |
| 2002/0012329 A1 | 1/2002 | Atkinson et al. |
| 2002/0013730 A1 | 1/2002 | Bigus |
| 2002/0017827 A1 | 2/2002 | Zuppero et al. |
| 2002/0026492 A1 | 2/2002 | Fujita |
| 2002/0038612 A1 | 4/2002 | Iwazaki |
| 2002/0042263 A1 | 4/2002 | Ishikawa |
| 2002/0049839 A1 | 4/2002 | Miida et al. |
| 2002/0051200 A1 | 5/2002 | Chang et al. |
| 2002/0057452 A1 | 5/2002 | Yoshino |
| 2002/0059489 A1 | 5/2002 | Davis et al. |
| 2002/0062398 A1 | 5/2002 | Chang et al. |
| 2002/0062406 A1 | 5/2002 | Chang et al. |
| 2002/0065873 A1 | 5/2002 | Ishizuka |
| 2002/0071577 A1 | 6/2002 | Lemay et al. |
| 2002/0077980 A1 | 6/2002 | Chang et al. |
| 2002/0078101 A1 | 6/2002 | Chang et al. |
| 2002/0081993 A1 | 6/2002 | Toyoshima |
| 2002/0087622 A1 | 7/2002 | Anderson |
| 2002/0090912 A1 | 7/2002 | Cannon et al. |
| 2002/0092029 A1 | 7/2002 | Smith |
| 2002/0097408 A1 | 7/2002 | Chang et al. |
| 2002/0097415 A1 | 7/2002 | Chang et al. |
| 2002/0097416 A1 | 7/2002 | Chang et al. |
| 2002/0097417 A1 | 7/2002 | Chang et al. |
| 2002/0097418 A1 | 7/2002 | Chang et al. |
| 2002/0097419 A1 | 7/2002 | Chang et al. |
| 2002/0097433 A1 | 7/2002 | Chang et al. |
| 2002/0099884 A1 | 7/2002 | Chang et al. |
| 2002/0178272 A1 | 11/2002 | Igarashi et al. |
| 2002/0194302 A1 | 12/2002 | Blumberg |
| 2003/0002072 A1 | 1/2003 | Berkema et al. |
| 2003/0013483 A1 | 1/2003 | Ausems et al. |
| 2003/0013484 A1 | 1/2003 | Nishimura et al. |
| 2003/0028481 A1 | 2/2003 | Flitcroft et al. |
| 2003/0054846 A1 | 3/2003 | Parry |
| 2003/0061381 A1 | 3/2003 | Brisebois et al. |
| 2003/0061606 A1 | 3/2003 | Hartwig et al. |
| 2003/0073431 A1 | 4/2003 | Dorenbosch |
| 2003/0084177 A1 | 5/2003 | Mulligan |
| 2003/0088421 A1 | 5/2003 | Maes et al. |
| 2003/0115256 A1 | 6/2003 | Brockway et al. |
| 2003/0120754 A1 | 6/2003 | Muto et al. |
| 2003/0122934 A1 | 7/2003 | Shiohara |
| 2003/0128272 A1 | 7/2003 | Clough et al. |
| 2003/0160993 A1 | 8/2003 | Kang |
| 2003/0211188 A1 | 11/2003 | Kachnic |
| 2003/0228842 A1 | 12/2003 | Heinonen et al. |
| 2004/0057075 A1 | 3/2004 | Stewart et al. |
| 2004/0127254 A1 | 7/2004 | Chang |
| 2004/0193900 A1 | 9/2004 | Nair |
| 2005/0078088 A1* | 4/2005 | Davis ............... H04N 1/00973 345/163 |
| 2005/0086300 A1 | 4/2005 | Yeager et al. |
| 2005/0114869 A1 | 5/2005 | Iwamura et al. |
| 2005/0125664 A1 | 6/2005 | Berkema et al. |
| 2005/0204176 A1 | 9/2005 | Togawa |
| 2005/0210120 A1 | 9/2005 | Yukie et al. |
| 2005/0222963 A1 | 10/2005 | Johnson |
| 2006/0013630 A1* | 1/2006 | Silverbrook ......... B42C 19/02 400/62 |
| 2006/0129627 A1* | 6/2006 | Phillips ................ H04L 67/06 709/200 |
| 2006/0167784 A1 | 7/2006 | Hoffberg |
| 2007/0125860 A1 | 6/2007 | Lapstun et al. |
| 2007/0129109 A1 | 6/2007 | Silverbrook et al. |
| 2007/0133073 A1 | 6/2007 | Shida et al. |
| 2008/0004925 A1 | 1/2008 | Bangel et al. |
| 2008/0004965 A1 | 1/2008 | Park |
| 2008/0007482 A1 | 1/2008 | Morioka |
| 2008/0049253 A1 | 2/2008 | Chang et al. |
| 2008/0049651 A1 | 2/2008 | Chang et al. |
| 2008/0098468 A1 | 4/2008 | Cortopassi et al. |
| 2008/0146283 A1 | 6/2008 | Rao et al. |
| 2008/0201236 A1 | 8/2008 | Field et al. |
| 2008/0218776 A1 | 9/2008 | Takami et al. |
| 2008/0250459 A1* | 10/2008 | Roman ............... H04N 5/23216 725/62 |
| 2008/0318602 A1 | 12/2008 | Chang et al. |
| 2009/0002760 A1 | 1/2009 | Chang et al. |
| 2009/0048978 A1 | 2/2009 | Ginter et al. |
| 2009/0070411 A1 | 3/2009 | Chang et al. |
| 2009/0094457 A1 | 4/2009 | Lapstun et al. |
| 2009/0180142 A1 | 7/2009 | Suzuki et al. |
| 2009/0290182 A1 | 11/2009 | Hashimoto et al. |
| 2010/0003966 A1 | 1/2010 | Lu et al. |
| 2010/0020199 A1 | 1/2010 | Meitav et al. |
| 2010/0020382 A1 | 1/2010 | Su et al. |
| 2010/0022755 A1 | 1/2010 | Umeda et al. |
| 2010/0039660 A1 | 2/2010 | Chang et al. |
| 2010/0039669 A1 | 2/2010 | Chang et al. |
| 2010/0201996 A1 | 8/2010 | Chang et al. |
| 2010/0203824 A1 | 8/2010 | Chang et al. |
| 2010/0227550 A1 | 9/2010 | Chang et al. |
| 2011/0016280 A1 | 1/2011 | Chang et al. |
| 2011/0034150 A1 | 2/2011 | Chang et al. |
| 2011/0035319 A1 | 2/2011 | Brand et al. |
| 2011/0035682 A1 | 2/2011 | Chang et al. |
| 2011/0138378 A1 | 6/2011 | Chang et al. |
| 2011/0145074 A1 | 6/2011 | Polizzotto |
| 2011/0167166 A1 | 7/2011 | Chang et al. |
| 2011/0167175 A1 | 7/2011 | Chang |
| 2011/0197159 A1 | 8/2011 | Chaganti et al. |
| 2011/0211226 A1 | 9/2011 | Chang et al. |
| 2011/0279829 A1 | 11/2011 | Chang et al. |
| 2011/0279863 A1 | 11/2011 | Chang et al. |
| 2011/0313775 A1 | 12/2011 | Laligand et al. |
| 2012/0036016 A1 | 2/2012 | Hoffberg et al. |
| 2012/0089299 A1 | 4/2012 | Breed |
| 2012/0226777 A1 | 9/2012 | Shanahan |
| 2012/0230315 A1 | 9/2012 | Chang et al. |
| 2012/0258700 A1 | 10/2012 | Chang et al. |
| 2013/0079141 A1 | 3/2013 | Barney et al. |
| 2013/0095887 A1 | 4/2013 | Chang et al. |
| 2013/0103775 A1 | 4/2013 | Chang et al. |
| 2013/0104052 A1 | 4/2013 | Chang et al. |
| 2013/0109353 A1 | 5/2013 | Chang et al. |
| 2013/0267204 A1 | 10/2013 | Schultz et al. |
| 2013/0297670 A1 | 11/2013 | Lundberg et al. |
| 2014/0018130 A1 | 1/2014 | Chang |
| 2014/0082604 A1 | 3/2014 | Chang et al. |
| 2014/0309806 A1 | 10/2014 | Ricci |
| 2014/0309813 A1 | 10/2014 | Ricci |
| 2014/0309862 A1 | 10/2014 | Ricci |
| 2014/0309863 A1 | 10/2014 | Ricci |
| 2014/0309870 A1 | 10/2014 | Ricci et al. |
| 2014/0310031 A1 | 10/2014 | Ricci |
| 2014/0310333 A1 | 10/2014 | Franco et al. |
| 2014/0310788 A1 | 10/2014 | Ricci |
| 2015/0238817 A1 | 8/2015 | Watterson et al. |
| 2015/0325061 A1 | 11/2015 | Gerstenberg et al. |
| 2015/0356561 A1 | 12/2015 | Chang et al. |
| 2015/0356564 A1 | 12/2015 | Chang et al. |
| 2015/0356565 A1 | 12/2015 | Chang et al. |
| 2015/0363763 A1 | 12/2015 | Chang et al. |
| 2015/0381612 A1 | 12/2015 | Chang et al. |
| 2015/0382150 A1 | 12/2015 | Ansermet et al. |
| 2016/0011836 A1 | 1/2016 | Chang et al. |

(56) References Cited

U.S. PATENT DOCUMENTS

| | | |
|---|---|---|
| 2016/0054962 A1 | 2/2016 | Park |
| 2016/0072975 A1 | 3/2016 | Fujioka |
| 2016/0087957 A1 | 3/2016 | Shah et al. |
| 2016/0112798 A1 | 4/2016 | Kim et al. |
| 2016/0174068 A1 | 6/2016 | Chang et al. |
| 2016/0179462 A1 | 6/2016 | Bjorkengren |
| 2016/0239232 A1 | 8/2016 | Chang et al. |
| 2016/0239243 A1 | 8/2016 | Chang et al. |
| 2016/0274839 A1 | 9/2016 | Ohguro et al. |
| 2016/0313974 A1 | 10/2016 | Chang et al. |
| 2016/0314546 A1 | 10/2016 | Malnati et al. |
| 2016/0360341 A1 | 12/2016 | Srivatsa et al. |
| 2017/0006329 A1 | 1/2017 | Jang et al. |
| 2017/0039009 A1 | 2/2017 | Chang et al. |
| 2017/0064746 A1 | 3/2017 | Chang et al. |
| 2017/0075636 A1 | 3/2017 | Chang et al. |
| 2017/0078521 A1 | 3/2017 | Chang et al. |
| 2017/0078922 A1 | 3/2017 | Raleigh et al. |
| 2017/0185376 A1 | 6/2017 | Chang et al. |
| 2017/0228202 A1 | 8/2017 | Chang et al. |
| 2017/0242649 A1 | 8/2017 | Jarvis et al. |
| 2017/0249116 A1 | 8/2017 | Chang et al. |
| 2017/0277487 A1 | 9/2017 | Chang et al. |
| 2017/0286027 A1 | 10/2017 | Chang et al. |
| 2017/0318115 A1 | 11/2017 | Peng et al. |
| 2017/0364326 A1 | 12/2017 | Chang et al. |
| 2018/0011667 A1 | 1/2018 | Chang et al. |
| 2018/0024790 A1 | 1/2018 | Chang et al. |
| 2018/0024791 A1 | 1/2018 | Chang et al. |
| 2018/0039456 A1 | 2/2018 | Chang et al. |
| 2018/0039459 A1 | 2/2018 | Chang et al. |
| 2018/0041482 A1 | 2/2018 | Chang et al. |
| 2018/0046418 A1 | 2/2018 | Chang et al. |
| 2018/0107449 A1 | 4/2018 | Krampf et al. |
| 2018/0203647 A1 | 7/2018 | Chang et al. |
| 2018/0203648 A1 | 7/2018 | Chang et al. |
| 2018/0227140 A1 | 8/2018 | Ansari et al. |
| 2018/0253264 A1 | 9/2018 | Chang et al. |
| 2018/0335989 A1 | 11/2018 | Chang et al. |
| 2018/0364929 A9 | 12/2018 | Chang et al. |
| 2018/0370701 A1 | 12/2018 | Maguire |
| 2019/0107980 A1 | 4/2019 | Chang et al. |
| 2019/0121585 A1 | 4/2019 | Chang et al. |
| 2019/0121613 A1 | 4/2019 | Chang et al. |
| 2019/0250883 A1 | 8/2019 | Chang et al. |
| 2019/0272148 A1 | 9/2019 | Chang et al. |
| 2019/0344944 A1 | 11/2019 | Maguire |
| 2019/0361617 A1 | 11/2019 | Chang et al. |
| 2019/0384547 A1 | 12/2019 | Chang et al. |
| 2020/0097225 A1 | 3/2020 | Chang et al. |
| 2020/0225889 A1 | 7/2020 | Chang et al. |

FOREIGN PATENT DOCUMENTS

| | | |
|---|---|---|
| CN | 100334577 C | 8/2007 |
| CN | 1541370 B | 5/2010 |
| CN | 101833430 A | 9/2010 |
| CN | 101834892 A | 9/2010 |
| CN | 101825996 B | 5/2012 |
| DE | 19846452 A1 | 12/1999 |
| EP | 0866398 A2 | 9/1998 |
| EP | 09388041 A2 | 8/1999 |
| EP | 738949 B1 | 2/2002 |
| EP | 952513 B1 | 2/2004 |
| EP | 691619 B1 | 2/2007 |
| GB | 2332764 B | 11/2002 |
| JP | H11143656 A | 5/1999 |
| JP | 11316658 A | 11/1999 |
| JP | 2000132353 A | 5/2000 |
| WO | 98/17032 A1 | 4/1998 |
| WO | 98/33293 A1 | 7/1998 |
| WO | 98/39766 A1 | 9/1998 |
| WO | 00/51293 A1 | 8/2000 |
| WO | 0195096 A2 | 12/2001 |
| WO | 0195097 A2 | 12/2001 |
| WO | 02084928 A2 | 10/2002 |

OTHER PUBLICATIONS

Office Action prepared by the US Patent and Trademark Office for U.S. Appl. No. 14/828,369, dated Feb. 22, 2018, 151 pages.
Office Action prepared by the US Patent and Trademark Office for U.S. Appl. No. 14/828,359, dated Feb. 23, 2018, 153 pages.
Office Action prepared by the US Patent and Trademark Office for U.S. Appl. No. 14/828,349, dated Mar. 9, 2018, 121 pages.
Office Action prepared by the US Patent and Trademark Office for U.S. Appl. No. 14/866,143, dated Apr. 18, 2018, 11 pages.
Notice of Allowance prepared by the US Patent and Trademark Office for U.S. Appl. No. 14/866,143, dated Jun. 28, 2018, 9 pages.
Notice of Allowance prepared by the US Patent and Trademark Office for U.S. Appl. No. 15/201,194, dated Aug. 9, 2018, 87 pages.
Office Action prepared by the US Patent and Trademark Office for U.S. Appl. No. 14/828,359, Oct. 29, 2018, 50 pages.
Office Action prepared by the US Patent and Trademark Office for U.S. Appl. No. 14/828,369, Oct. 29, 2018, 52 pages.
Office Action prepared by the US Patent and Trademark Office for U.S. Appl. No. 14/828,349, dated Dec. 26, 2018, 43 pages.
Office Action prepared by the US Patent and Trademark Office for U.S. Appl. No. 14/828,349, dated Apr. 15, 2019, 57 pages.
Office Action prepared by the US Patent and Trademark Office for U.S. Appl. No. 14/828,359, dated Jun. 21, 2019, 56 pages.
Notice of Allowance prepared by the US Patent and Trademark Office for U.S. Appl. No. 16/229,896, dated Jul. 29, 2019, 7 pages.
Office Action prepared by the US Patent and Trademark Office for U.S. Appl. No. 14/828,369, dated Sep. 6, 2019, 52 pages.
Office Action prepared by the US Patent and Trademark Office for U.S. Appl. No. 15/692,977, dated Oct. 3, 2019, 114 pages.
Schulyer et al., "Solutions to Sharing Local Printers: LAN Systems Inc., LANSpool, $395 per Server", PC Week, Oct. 1989, vol. 6, No. 39, pp. 75 (2), 3 pages.
Haynie, Dave, "The Zorro III Bus Specification: A General Purpose Expansion Bus for High Performance Amiga Computers," Mar. 20, 1991, Revision 1.0, pp. 1-84.
House et al., "An on-line communication print service for the demanding client." In Proceedings of the 11th Annual International Conference on Systems Documentation (Waterloo, Ontario, Canada, Oct. 5-8, 1993). SIGDOC 93. ACM, New York, NY, 135-139, 8 pages.
Screenshots from Microsoft® NT™, Figures 5-7, 1998, 3 pages.
Bisdikian et al., "WiSAP: a wireless personal access network for handheld computing devices," Personal Communications, IEEE [see also IEEE Wireless Communications], vol. 5, No. 6, pp. 18-25, Dec. 1998, 9 pages.
Screenshots from Microsoft® Word 2000, Figures 1-4, 1999, 4 pages.
Miller, Brent, "Mapping Salutation Architecture APIs to Bluetooth Service Discovery Layer", Jul. 1, 1999, Version 1.0., 26 pages.
U.S. Appl. No. 60/224,701, U.S. Appl. No. 60/227,878, U.S. Appl. No. 601243,654, U.S. Appl. No. 60/208,967, U.S. Appl. No. 60/220,047, U.S. Appl. No. 60/239,320.
Bettstetter et al., "A Comparison of Service Discovery Protocols and Implementation of the Service Location Protocol", Sep. 13-15, 2000, In Proceedings of the 6th EUNICE Open European Summer School: Innovative Internet Applications, 12 pages.
Jun. 7, 2002, International Search Report from the International Searching Authority in international patent application No. PCT/US01/46247, 4 pages.
Jul. 24, 2002, International Preliminary Examination Report from the International Preliminary Examining Authority in international patent application No. PCT/US01/46247, 3 pages.
Jan. 6, 2003, International Search Report from the International Searching Authority in international patent application No. PCT/US01/48057, 3 pages.
May 28, 2004, Office action from the U.S. Patent and Trademark Office in U.S. Appl. No. 10/016,630, 34 pages.

(56) References Cited

OTHER PUBLICATIONS

Aug. 24, 2004, International Preliminary Examination Report from the International Preliminary Examining Authority in international patent application No. PCT/US01/48057, 11 pages.
Jan. 13, 2005, Office action from the U.S. Patent and Trademark Office in U.S. Appl. No. 10/000,732, 16 pages.
Mar. 9, 2005, Office action from the U.S. Patent and Trademark Office in U.S. Appl. No. 10/003,594, 13 pages.
Mar. 29, 2005, Office action from the U.S. Patent and Trademark Office in U.S. Appl. No. 10/016,630, 33 pages.
Oct. 11, 2005, Office action from the U.S. Patent and Trademark Office in U.S. Appl. No. 10/000,732, 18 pages.
Sep. 11, 2006, Advisory action from the U.S. Patent and Trademark Office in U.S. Appl. No. 10/000,732, 3 pages.
Jun. 24, 2010, Notice of Allowance from the U.S. Patent and Trademark Office in U.S. Appl. No. 10/016,223, 7 pages.
Oct. 26, 2010, Office action from the European Patent Office in European patent application No. 01985549.3, 4 pages.
Dec. 29, 2010, Notice of Allowance from the U.S. Patent and Trademark Office in U.S. Appl. No. 10/016,223, 5 pages.
Mar. 18, 2011, Notice of Allowance from the U.S. Patent and Trademark Office in U.S. Appl. No. 12/907,865, 22 pages.
Jun. 11, 2012, Notice of Allowance from the U.S. Patent and Trademark Office in U.S. Appl. No. 12/907,865, 37 pages.
Jul. 17, 2012, Notice of Allowance from the U.S. Patent and Trademark Office in U.S. Appl. No. 12/903,048, 11 pages.
Nov. 16, 2012, Notice of Allowance from the U.S. Patent and Trademark Office in U.S. Appl. No. 13/103,958, 6 pages.
Jun. 24, 2013, Office action from the U.S. Patent and Trademark Office in U.S. Appl. No. 13/708,607, 36 pages.
Jun. 24, 2013, Office action from the U.S. Patent and Trademark Office in U.S. Appl. No. 13/710,295, 24 pages.
Jul. 26, 2013, Office action from the U.S. Patent and Trademark Office in U.S. Appl. No. 13/864,000, 41 pages.
Sep. 11, 2013, Notice of Allowance from the U.S. Patent and Trademark Office in U.S. Appl. No. 13/103,958, 15 pages.
Sep. 26, 2013, Office action from the U.S. Patent and Trademark Office in U.S. Appl. No. 13/710,306, 72 pages.
Dec. 23, 2013, Office action from the U.S. Patent and Trademark Office in U.S. Appl. No. 13/476,947, 20 pages.
Jan. 13, 2014, Office action from the U.S. Patent and Trademark Office in U.S. Appl. No. 13/864,000, 16 pages.
Feb. 28, 2014, Office action from the U.S. Patent and Trademark Office in U.S. Appl. No. 13/103,958, 11 pages.
Mar. 20, 2014, Notice of Allowance from the U.S. Patent and Trademark Office in U.S. Appl. No. 13/708,607, 19 pages.
Apr. 2, 2014, Notice of Allowance from the U.S. Patent and Trademark Office in U.S. Appl. No. 13/710,306, 24 pages.
Apr. 17, 2014, Office action from the U.S. Patent and Trademark Office in U.S. Appl. No. 13/864,000, 6 pages.
Jun. 18, 2014, Notice of Allowance from the U.S. Patent and Trademark Office in U.S. Appl. No. 13/103,958, 8 pages.
Jun. 26, 2014, Office action from the U.S. Patent and Trademark Office in U.S. Appl. No. 13/476,947, 85 pages.
Jul. 7, 2014, Office action from the U.S. Patent and Trademark Office in U.S. Appl. No. 13/710,295, 85 pages.
Aug. 29, 2014, Notice of Allowance from the U.S. Patent and Trademark Office in U.S. Appl. No. 13/864,000, 7 pages.
Oct. 31, 2014, Office action from the U.S. Patent and Trademark Office in U.S. Appl. No. 13/710,299, 145 pages.
Nov. 17, 2014, Office action from the U.S. Patent and Trademark Office in U.S. Appl. No. 13/103,958, 6 pages.
Dec. 19, 2014, Notice of Allowance from the U.S. Patent and Trademark Office in U.S. Appl. No. 13/684,000, 7 pages.
Jan. 8, 2015, Notice of Allowance from the U.S. Patent and Trademark Office in U.S. Appl. No. 13/476,947, 55 pages.
Jan. 14, 2015, Notice of Allowance from the U.S. Patent and Trademark Office in U.S. Appl. No. 13/708,607, 66 pages.
Jan. 21, 2015, Notice of Allowance from the U.S. Patent and Trademark Office in U.S. Appl. No. 13/710,306, 42 pages.
Mar. 25, 2015, Corrected Notice of Allowability from the U.S. Patent and Trademark Office in U.S. Appl. No. 13/708,607, 6 pages.
Jun. 10, 2015, Notice of Allowance from the U.S. Patent and Trademark Office in U.S. Appl. No. 13/103,958, 7 pages.
Jun. 12, 2015, Office action from the U.S. Patent and Trademark Office in U.S. Appl. No. 13/710,299, 94 pages.
Jun. 25, 2015, Notice of Allowance from the United States Patent and Trademark Office in U.S. Appl. No. 13/710,295, 42 pages.
Oct. 13, 2015, Notice of Allowance from the United States Patent and Trademark Office in U.S. Appl. No. 13/710,295, 10 pages.
Feb. 22, 2016, Notice of Allowance from the United States Patent and Trademark Office, in U.S. Appl. No. 13/710,295, 9 pages.
Apr. 1, 2016, Office Action from the United States Patent and Trademark Office, in U.S. Appl. No. 13/710,299, 70 pages.
Oct. 4, 2016, Notice of Allowance from the United States Patent and Trademark Office, in U.S. Appl. No. 13/710,299, 14 pages.
May 6, 2013, Notice of Allowance from the United States Patent and Trademark Office, in U.S. Appl. No. 13/103,958, 10 pages.
Jan. 26, 2017, Notice of Allowance from the United States Patent and Trademark Office, for U.S. Appl. No. 13/710,299, 16 pages.
Jun. 14, 2017, Notice of Allowance from the United States Patent and Trademark Office, for U.S. Appl. No. 13/710,299, 16 pages.
Jan. 10, 2017, Examination Report from the European Patent Office, for European Patent Application No. 01985549.3, 10 pages.
Albrecht et al., "IP Services over Bluetooth: Leading the Way to a New Mobility," IEEE Proceedings of 24th Conference on Local Computer Networks, Lowell, MA, Oct. 18-20, 1999, 10 pages.
Notice of Allowance prepared by the United States Patent and Trademark Office for U.S. Appl. No. 16/229,896, dated Nov. 7, 2019, 82 pages.
Final Office Action prepared by the United States Patent and Trademark Office for U.S. Appl. No. 14/828,349, dated Nov. 26, 2019, 56 pages.
Notice of Allowance prepared by the United States Patent and Trademark Office for U.S. Appl. No. 14/828,359, dated Jan. 10, 2020, 47 pages.
Notice of Allowance prepared by the United States Patent and Trademark Office for U.S. Appl. No. 14/828,369, dated Jan. 13, 2020, 46 pages.
Office Action prepared by the United States Patent and Trademark Office for U.S. Appl. No. 14/828,349, dated Apr. 13, 2020, 84 pages.
Office Action prepared by the United States Patent and Trademark Office for U.S. Appl. No. 16/416,088, dated Apr. 15, 2020, 87 pages.
Office Action prepared by the United States Patent and Trademark Office for U.S. Appl. No. 15/692,977, dated Jun. 25, 2020, 59 pages.
International Telecommunication Union, "Series T: Terminals for Telematic Services, Mixed Raster Content (MRC)", Apr. 1999, 55 pages.
Bluetooth, Core, "Specification of the Bluetooth System," Dec. 1, 1999, 1080 pages (attachments are in 4 parts).
Notice of Allowance prepared by the US Patent and Trademark Office for U.S. Appl. No. 16/215,506, dated Aug. 6, 2020, 119 pages.
Notice of Allowance prepared by the US Patent and Trademark Office for U.S. Appl. No. 16/416,088, dated Sep. 22, 2020, 20 pages.
White, "How Computers Work," Oct. 2003, 420 pages (attachments are in 5 parts).
Wright, "Design Goals for an Internet Printing Protocol," Apr. 1999, 43 pages.
Office Action prepared by the US Patent and Trademark Office for U.S. Appl. No. 14/835,585, dated Sep. 30, 2020, 86 pages.
Office Action prepared by the US Patent and Trademark Office for U.S. Appl. No. 14/828,349, dated Oct. 26, 2020, 137 pages.

\* cited by examiner

INFORMATION APPARATUS THAT INCLUDES A TOUCH SENSITIVE SCREEN INTERFACE FOR MANAGING OR REPLYING TO E-MAILS

CROSS-REFERENCE TO RELATED APPLICATIONS

This application is a continuation of U.S. patent application Ser. No. 16/229,896 filed Dec. 21, 2018, which is a continuation of U.S. patent application Ser. No. 15/201,194 filed Jul. 1, 2016 and issued as U.S. Pat. No. 10,162,596, which is a continuation of U.S. patent application Ser. No. 13/710,295 filed Dec. 10, 2012 and issued as U.S. Pat. No. 9,383,956, which is a continuation of U.S. patent application Ser. No. 12/903,048 filed Oct. 12, 2010 and issued as U.S. Pat. No. 8,332,521, which is a continuation of U.S. patent application Ser. No. 10/016,223 filed Nov. 1, 2001 and issued as U.S. Pat. No. 7,941,541, and which claims benefit of U.S. Provisional Patent Application Ser. No. 60/245,101 filed Nov. 1, 2000. The complete disclosures of the above applications are hereby incorporated by reference for all purposes. Additionally, this application is a continuation-in-part of U.S. patent application Ser. No. 16/200,380 filed Nov. 26, 2018, which is a continuation of U.S. patent application Ser. No. 15/332,432 filed Oct. 24, 2016 and issued as U.S. Pat. No. 10,140,071, which is a continuation of U.S. patent application Ser. No. 10/053,765 filed Jan. 18, 2002 and issued as U.S. Pat. No. 9,836,257, and which claims the benefit of U.S. Provisional Patent Application Ser. No. 60/262,764 filed Jan. 19, 2001. The complete disclosures of the above applications are hereby incorporated by reference for all purposes. Moreover, this application is a continuation-in-part of U.S. patent application Ser. No. 15/973,317, filed May 7, 2018, which is a continuation of U.S. patent application Ser. No. 09/992,413 filed Nov. 18, 2001 and now issued as U.S. Pat. No. 9,965,233, which claims benefit of U.S. Provisional Patent Application Ser. No. 60/252,682 filed Nov. 20, 2000. The complete disclosures of the above applications are hereby incorporated by reference for all purposes.

TECHNICAL FIELD OF INVENTION

Present invention relates to device synchronization and digital output and, in particular, to providing pervasive output for information apparatuses.

SUMMARY OF THE INVENTION

An Information apparatus refers to both stationary computers and mobile computing devices (pervasive devices). Examples of information apparatuses include without limitation desktop computers, laptop computers, palmtop (hand-held) computers, personal digital assistants (PDAs), Internet-enabled cellular phones, smart phones, pagers, Internet appliances, e-books, digital pads, Web pads, and digital capturing devices (e.g., digital cameras and video cameras). An output device 140 may include a fax machine, printer, copier, image or video display device, projector, and an audio output device.

For simplicity and convenience, hereafter, the following description may refer to an output device as a printer and an output process as printing. However, it should be understood that the term printer and printing is used as a specific example to simplify description or may be one exemplary embodiment. The reference to printing used here is intended to be applied or extended to the larger scope and definition of output devices and should not be construed as restricting the scope and practice of present invention.

Fueled by ever-increasing bandwidth and processing power and ever-increasing numbers of wireless mobile devices and available software applications for pervasive devices, millions of users are or will be creating, downloading, and transmitting content and information using their pervasive computing devices. Unfortunately, the small display screen of a pervasive device may not provide a good viewing experience. As a result, there is a need to allow users to easily output content and information from their pervasive computing devices to any output device. People need to output directly and conveniently from their pervasive information apparatus, without depending on synchronizing with a stationary computer (e.g., desktop personal computer) for printing, as an example.

To illustrate, an information worker at an airport receiving e-mail in his hand-held computer may want to walk up to a nearby printer or fax machine to have his e-mail printed. In addition, the mobile worker may also want to print a copy of his to-do list, appointment book, business card, and his flight schedule from his mobile device. As another example, a traveler stopping at a convenience store, gas station, or kiosks may want to print out a copy of the map he just downloaded from the Internet using his Internet enable wireless phone (information apparatus). In still another example, an individual who just finished a stock trade or performed an e-commerce transaction using his PDA (information apparatus) may want to print out a copy of his transaction confirmation, invoice or receipt. In yet another example, a user who takes a picture with a digital camera may want to easily print it out to a nearby printer.

Conventionally, an output device (e.g., a printer) is connected to an information apparatus via a wired connection such as a cable line. A wireless connection is also possible by using, for example, radio communication or infrared communication. Regardless of whether the connection is wired or wireless, a user must first install in the information apparatus a printer driver corresponding to a particular printer model and make. Using a device-dependent or specific driver, the information apparatus may process output content or a digital document into the printer input space. The printer input space corresponds to the type of input that a printer understands (herein referred to as print data). For example, the printer input space or print data may include a printer-specific input format (e.g., image, graphics, file, data format), encoding, page description language, markup language, instructions, protocols or data that can be understood or used by a particular printer make and model.

Print data may be proprietary or a published standard or a combination of the two. A printer input space or print data is therefore, in general, device dependent. Different printer models may specify their own input, designed or adopted for optimal operation by the printer manufacturer according to a specification. Consequently, different printers usually require use of specific printer drivers for accurate printing. A device driver (printer driver in this example) may control, manage, communicate, and output print data to a printer. Sometimes, instead of using a printer or device driver, the device driving feature may be included as part of an application software. The application in this example may process the document and communicate directly with an output device without utilizing a device driver. Print data is an output data sent to a printer. However, the term print data used here is intended to be applied or extended to the larger scope and definition of output data which applies to any output devices including display, projection and audio devices, and this should not be construed as restricting the scope and practice of present invention.

Installation of a printer driver or application may be accomplished by, for example, manual installation using a CD or floppy disk supplied by the printer manufacturer. Or alternatively, a user may be able to download that particular driver or application from a network. For a home or office user, this installation process may take anywhere from several minutes to several hours depending on the type of driver and user's sophistication level with computing devices and networks. Even with plug-and-play driver installation, the user is still required to execute a multi-step process for each printer. This installation and configuration process adds a degree of complexity and work to end-users who may otherwise spend their time doing other productive or enjoyable work. Moreover, many unsophisticated users may be discouraged from adding new peripherals (e.g., printers, scanners, etc.) to their home computers or networks to avoid the inconvenience of installation and configuration. Therefore, there is a need to provide a way for a user to more conveniently or easily output digital content to an output device without the inconvenience of manually finding and installing new device drivers or printer drivers. Installation of printer drivers, if needed, should be more automatic and transparent to end-users.

In addition, conventional printing methods may pose significantly higher challenges and difficulties for mobile device users than for home and office computer users. The requirement for pre-installation of a device-dependent driver is in conflict with the concept of mobile (pervasive) computing and output. For example, a mobile user may want to print e-mail, PowerPoint® presentation documents, web pages, or other documents in an airplane or at an airport, gas station, convenience store, kiosk, hotel, conference room, office, home, etc. It is highly unlikely that the user would find at any of these locations a printer of the same make and model as is at the user's base station. Therefore, the user may have to install and configure a printer driver each time at each of these locations before printing. Alternatively, it is also not a viable option usually to pre-install all of the possible hundreds, or even thousands, of printer drivers available to the user's information apparatus. A mobile information device usually has limited memory and storage capacity. As a consequence, the user would currently be required to install and configure a printer driver each time at each such different location before printing. Moreover, the user may not want to be bothered with looking for a driver or downloading it and installing it just to print out one page of email at the airport. This is certainly an undesirable and discouraging process to promote pervasive or mobile computing. Therefore, a more convenient or automated printing solution is needed so that a user can simply walk up to a printer and easily print a digital document without having to install or pre-install a particular printer driver.

Network printing may partially solve the above problem in a local area network (LAN). Network printing was first motivated to allow people to share printing resources within a network. Printers are often connected to the network using a network adapter or network card. Print servers may be used to manage print jobs (such as spooling). Different clients may send print jobs to the print server for queuing, prioritizing and managing. The driver of each networked printer may be stored in the network (for example, in an application server) and available for clients to download.

The above configuration is often used in a local area network (LAN) such as in an office building. An office worker with a mobile or static computing device connected to this network may be able to send a print job to any printer that is connected to the same network. He either has the necessary printer drivers pre-installed in his device or he can download a driver from the LAN before printing to a particular printer. But once outside of the office building, or meaning outside of his wired or wireless network coverage, the office worker can no longer print to any printer he or she desires.

In one instance, it has been argued that the idea of local network printing can be further extended to the Internet as the larger and public network. In an ideal situation, every printer and every computing device (information apparatus) is connected to the same network, for example the Internet. But in reality, extending network printing to a big super-network or the Internet is still unavailable.

Nevertheless, one drawback of network printing may be higher cost. To connect the output devices and information apparatus to the same network, additional hardware or software may need to be installed. And therefore, the costs of output devices may be raised substantially. In addition to hardware and software costs there are also service charges to maintain the connectivity to a large network such as the Internet. Furthermore, a large permanent network infrastructure would need to be built and made available to each location.

In addition to costs, another drawback of network printing is reliability. Network printing requires perfect function in any part of the chain of network hardware, software and services. If any component of the link is down or not fully functional, for any reason, printing service may be unavailable, interrupted or result in inaccuracies.

Finally, another drawback of network printing is the issue of security. A user does not feel secure if confidential documents or information must pass through the entire network before reaching the printer immediately in front of him or her. There may be the fear that the confidential document could be intercepted, viewed, copied or stored within any segment of the connected network. There can also be the fear that the document could actually be printed to a different printer instead of the intended one. This problem may be caused by, for example, errors in directory service software, a software component that is not up-to-date or corrupted, inconsistent or incompatible software and/or hardware versions, or any combination of human, software, network, or hardware errors. There is also risk when downloading a software component (e.g., printer driver) from the network to an information apparatus. This software component maybe damaged, corrupted or carrying a malicious attack or virus or otherwise modified by hackers. A damaged software component can disrupt or corrupt the user's information apparatus. Finally, some internal corporate or local networks may reject unknown documents trying to reach their printers and other output devices protected within a firewall. It is therefore more desirable if the communication and exchange of information are done locally between users' information apparatus and the selected output device, all within the range of the users watchful, and inspecting eyes.

Accordingly, the present invention provides a convenient method of digital printing in which a user need not pre-install a device-dependent printer driver on an information apparatus in order to print.

This invention can provide an easy, friendly and convenient process for printing. Unlike conventional printing, a user need not manually install a printer driver from a CD, floppy disk, or download it somewhere from an existing static network. With the apparatus and process of present invention, all the software components, data, or printer drivers can be loaded to the information apparatus through easy and automatic synchronization process between the information apparatus and a printer having an output controller of present invention. As a result, a mobile user with an information apparatus equipped with an output manager of present invention can print pervasively virtually at any time, anywhere, to any printer.

Furthermore, this invention can provide a convenient method allowing users to print to any printer with or without connection to a static permanent network for both the information apparatus and the output device. Through local communication and synchronization directly between the information apparatus and the output device, hardware and software installation for static network connectivity may not be necessary. Therefore printing costs may be reduced.

In addition, this invention can provide a more reliable printing method than conventional remote network printing methods or processes. By communicating locally between an information apparatus and an output device, the printing process does not depend on the perfect function of each element of a network chain. This chain may include, for example, network connections, network servers, application servers, service providers and application providers. Therefore, the chance of a successful printing under present invention is greatly enhanced as processing and communication involves fewer elements.

This invention can further provide a more secure printing process than conventional network printing processes and methods. Uploading or downloading data or software components such as a printer driver from an output device immediately in front of user provides a more secure feeling than dealing with components from a remote location in the network. Components stored in a large network may be perceived to have more exposure to tampering (e.g., contaminated with a virus). An erroneous module or component in the network caused by a human or software or hardware error may also disrupt the function of the information apparatus. Furthermore, sending a confidential digital document or print data directly to the printer in front of user provides a more secure feeling than if the document is routed through a large network with a plurality of users and servers. There are greater possibilities of the document being intercepted, viewed, copied, stored or finally printed on a wrong printer in conventional network printing.

In accordance with present invention, an electronic system and method of pervasive output allow an information apparatus to output digital content conveniently to virtually any output device. The information apparatus may be equipped with a central processing unit, input/output control unit, storage unit, memory unit, and wired or wireless communication unit or adapters. The information apparatus preferably also includes output manager that may be implemented as application software, a client application, or device driver (printer driver in case of printer). The output manager may include management and control capabilities with hardware and software components including for example one or more communication chipsets residing in its host information apparatus.

The output manager in the information apparatus may be capable of communicating with, managing and synchronizing data or software components with an output device equipped with an output controller of present invention. Examples of output devices include, without limitation, printers, fax machines, copiers, image or video display devices, monitors, display screens, projectors, and audio output devices.

The output controller may be a circuit board, card or software components residing in an output device. Alternatively, the output controller may be connected externally to an output device as an external component or "box." The output controller may be implemented with one or a combination of embedded processor, software, firmware, ASIC, DSP, FPGA, system on a chip, special chipsets, among others. In another embodiment, the functionality of the output controller may be provided by application software running on a PC, workstation or server connected externally to an output device.

The output controller may include a processing unit, memory/storage unit and communication adapter unit, among others. The storage or memory unit of the output controller may store device drivers, software components or objects encapsulating device dependent data, algorithms, and code. Device dependent data may be, for example, parameters and information about the output device and output controller. Software components and objects may encapsulate for example code or executables of algorithms necessary for converting or encoding an image or document description or language into print data or output data compatible with a specific output device. The output manager may manage the process of uploading data and or software components from an output controller to an information apparatus in order to, for example, enable the information apparatus to generate and transmit print data or output data accurately to the output device or the output controller.

Output data (or print data in the case where the output device is a printer) may be specific data, instructions, page description language, markup language, graphics and or image file format among others. Print data may also be encoded or compressed with one or more compression or encoding techniques. Furthermore, print data may use one or more open standards or one or more proprietary techniques and formats, or a combination. Output data (or print data for printers) refers to the electronic data sent from an information apparatus to the output device.

One implementation of a digital content output process of this invention includes the following steps.

1. A user requests to print a digital content from his/her information apparatus.
2. The information apparatus detects available output devices by a discovery process.
3. The information apparatus exchanges service information with output controllers associated with the available output devices in a service negotiation process. The user may then select one or more output devices based on the service information provided.
4. The information apparatus communicates with output controller to identify and upload the necessary components to enable output to a specific output device as part of a synchronization process. The uploaded components or data may then be installed or configured in the information apparatus.
5. The digital content intended for output is processed by one or more components to be compatible with the output device. The one or more components include the information apparatus with an output manager, an output controller and the output device.
6. The printer engine or display engine or audio engine generates final output.

In the output process of present invention, an output manager residing in the information apparatus may participate in, coordinate and manage the communication and exchange of information/components between its host information apparatus and output controllers.

DETAILED DESCRIPTION OF PREFERRED EMBODIMENTS

Figure 1:
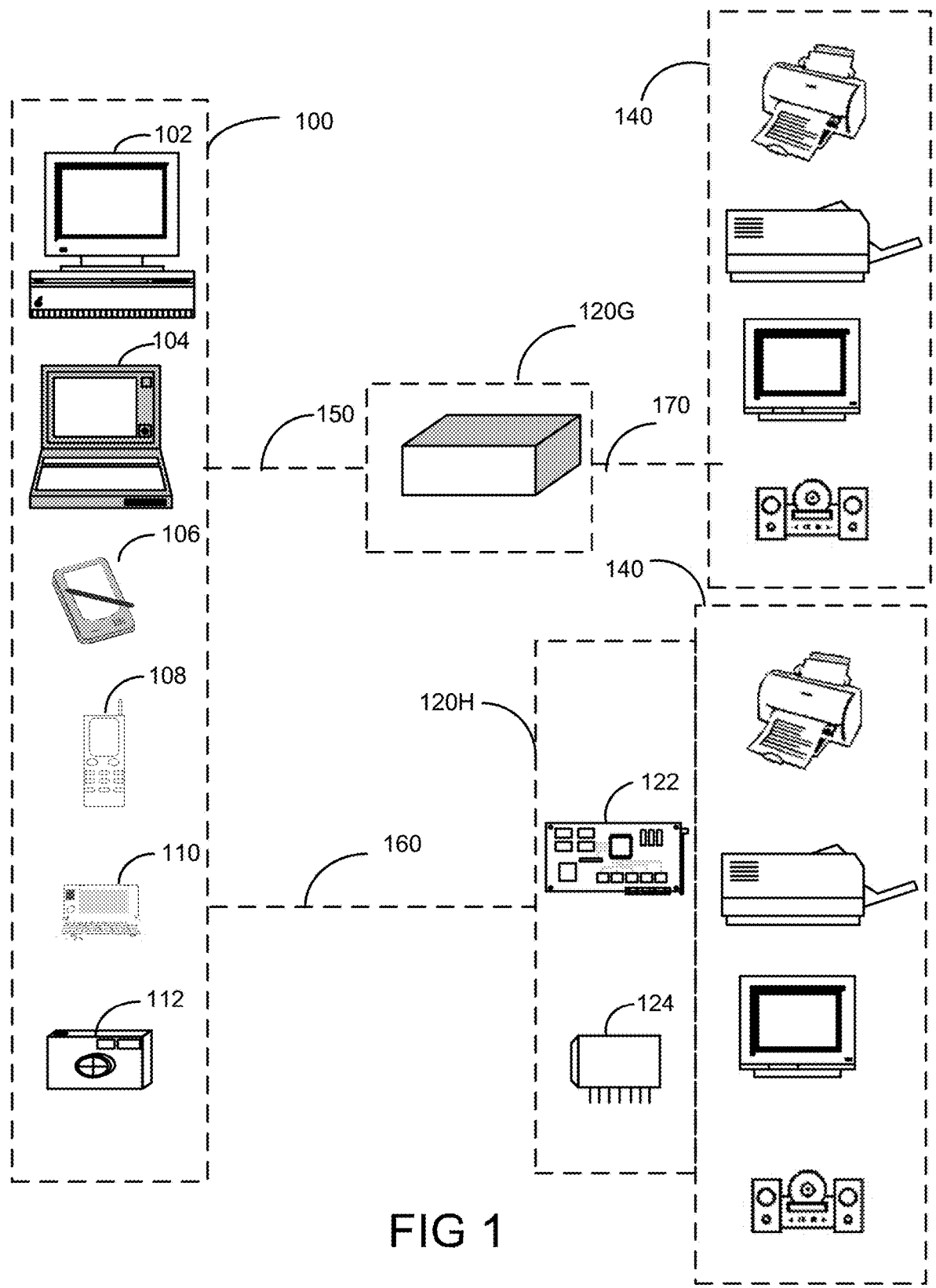
FIG. 1 is a block diagram of an output system that can implement the process and apparatus of the present invention.

FIG. 1 is a block diagram illustrating exemplary components of an electronic communication system that may provide an operating environment for the present invention and includes an information apparatus 100, which is a computing device with processing capability. As illustrated in FIG. 1, examples of information apparatus 100 may include, but are not limited to, a desktop personal computer (PC), laptop computer, palmtop computer, handheld or mobile device, personal digital assistant (PDA), smart phone, screen phone, set-top box, e-book, Internet pad, digital camera, Internet appliance, pager, etc.

Information apparatus 100 may contain components (not shown) such as a processing unit, a memory unit, a storage unit and an input/output control unit, as are known in the art. Information apparatus 100 may also contain an interface (not shown) for interactions with users. The interface may be implemented in software or hardware or a combination. Examples of such an interface include, without limitation, a mouse, a keyboard, a touch-sensitive or non-touch-sensitive screen, one or more push buttons, soft keys, a stylus, a speaker, a microphone, etc.

An information apparatus 100 may be a dedicated single task device (e.g. email terminal, web terminal, e-book, etc) or a general-purpose computing device with multiple features and functions. These multiple functions and features may be implemented by one or more software applications (e.g., applications 302, FIG. 3) installed in the information apparatus 100, which may or may not include an operating system. A digital camera 112 equipped with processing capability and feature sets of the present invention is also an example of an information apparatus 100.

Some information apparatuses 100 (e.g., dedicated devices) may be pre-configured by manufacturers with fixed functionalities and features. Other information apparatuses 100 may allow users to install additional hardware components and application software (e.g., applications 302, FIG. 3) to expand or change functionality. Examples of functionalities and applications of information apparatuses 100 may include, for example, e-mail, messaging, voice communication, web browsing, image acquisition, text processing, graphics applications, document or image editing, and output functionalities, among others.

Functionalities and feature sets of an information apparatus 100 may be implemented in software or hardware or a combination of both. When features are implemented in software, this software may be installed by the manufacturer or by users. Application software may be implemented using embedded software running on embedded processors or it may run on a specific operating system. Some or all or combinations of applications and feature sets may also be implemented in hardware or in silicon. Some functionality or feature sets may be implemented in special chip sets and may include one or more or combinations of, for example, application-specific integrated circuits (ASICs), field programmable gate arrays (FPGAs), digital signal processors (DSPs), systems on a chip, firmwares, etc.

Information apparatus 100 may or may not contain an operating system. In an implementation having an operating system, the operating system may provide a variety of application programming interfaces (APIs) or object models (e.g., APIs 300, FIG. 3) for software applications to interface and communicate with device drivers. Device drivers in an information apparatus 100 control and communicate with peripheral devices such as printers, copiers, fax machines, display monitors, screens, etc. Several different applications can share a common device driver through the use of APIs or interfaces or object models provided by an operating system, as described below with reference to FIG. 3A. In implementations having no operating system or an operating system that does not support or provide a device driver API, each application may have to implement its own device driver or its own output and communication capability, as described below with reference to FIGS. 3B and 3C. For example, to output a digital document to a printer, each application may have to implement its own printer-specific driving, processing and/or communication capability.

Figure 3A:
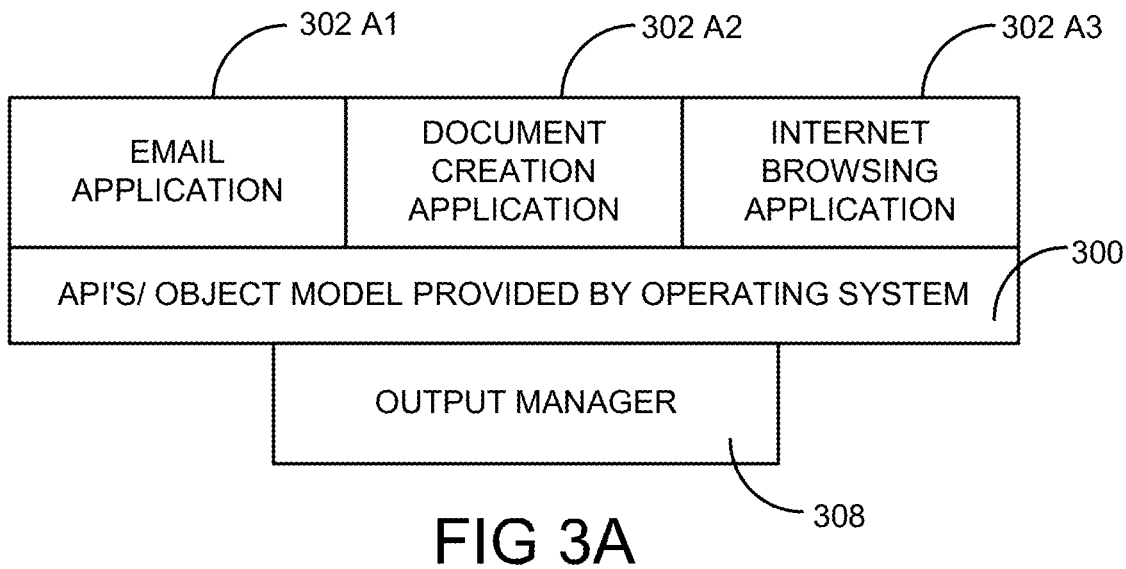
FIG. 3A-3C illustrates various configurations and implementations of output manager with respect to an information apparatus.
Figure 3B:
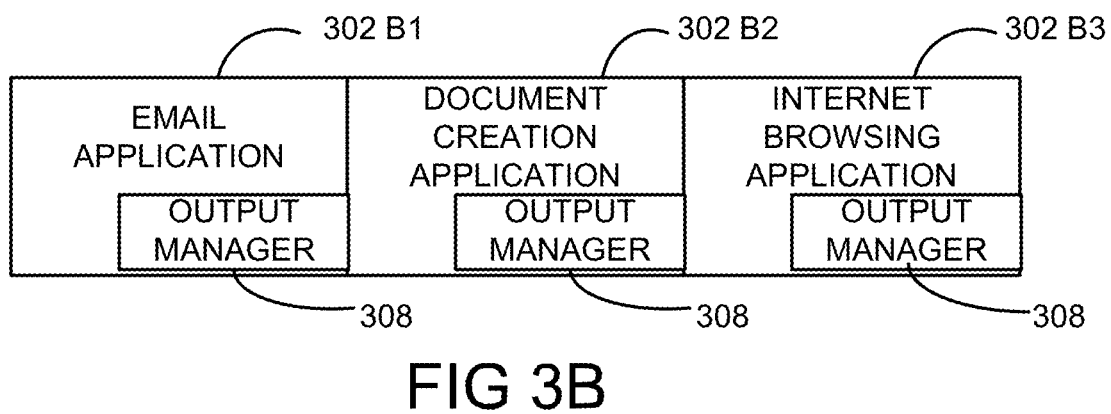
Figure 3C:
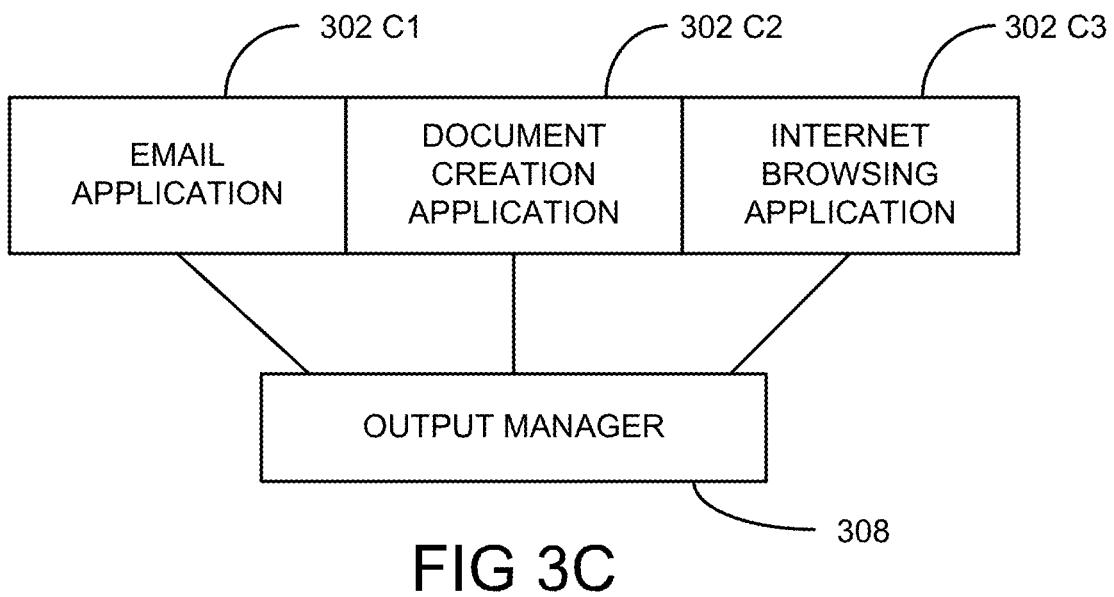

In one implementation, information apparatus 100 includes an output manager 308 (FIGS. 3A-3C), which is typically implemented in software. Output manager 308 may be implemented or included in a client application, or as a stand-alone application, or as part of another application software 302B (FIG. 3B), or in the form of a device driver (e.g., a printer driver, in case of a printer being the output device), which may be invoked, shared and used by one or more application software programs 302 (FIGS. 3A-3C).

One task for output manager 308 is to manage and coordinate communication between information apparatus 100 and one or more output controllers 120. Output manager 308 may, for example, implement an open-standard or a proprietary communication protocol to directly or indirectly interact with, manage, or utilize functionalities provided by hardware components residing in a host information apparatus 100. Such hardware components may include, for example, a processing unit, a memory unit and communication chipsets (not shown). Output manager 308 may include one or more of the following features and functionalities:

Output manager 308 may communicate and interact with one or more software applications 302 included in a host information apparatus 100 to provide pervasive output capability or feature to those software applications 302. The type of information passed from the software applications 302 to the output manager 308 may be, for example, a digital document or digital content data that needs output. In some instances, application software 302 may invoke or launch the output manager 308 as a separate application (as shown in FIG. 3C) or as an integrated part of the application software (as shown in FIG. 3B). Examples of possible communication and management between output manager 308 and application software 302 may include, among others, messages, objects models, instances, procedural calls, program invocation and APIs, which may or may not be provided by an operating system.

Figure 2A:
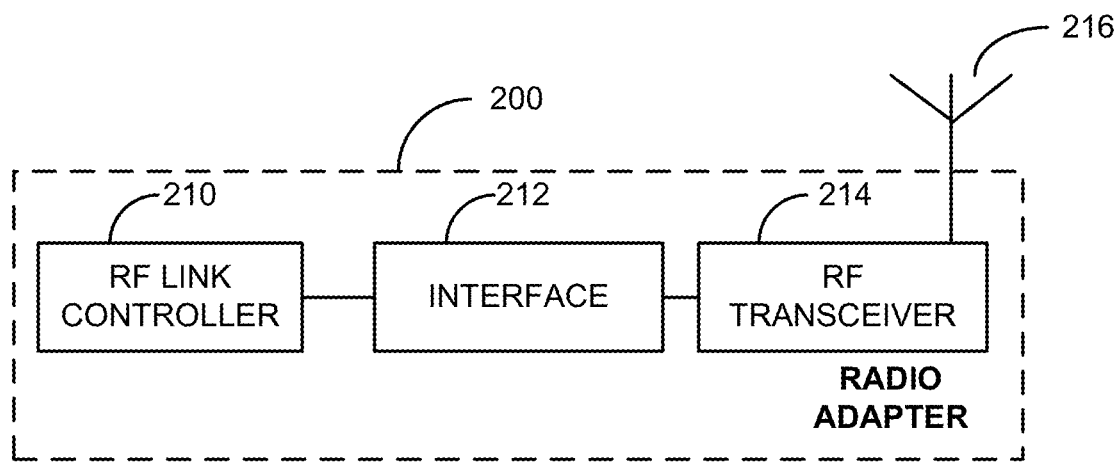
FIGS. 2A and 2B are block diagrams illustrating exemplary configurations of hardware components of wireless communication units.
Figure 2B:
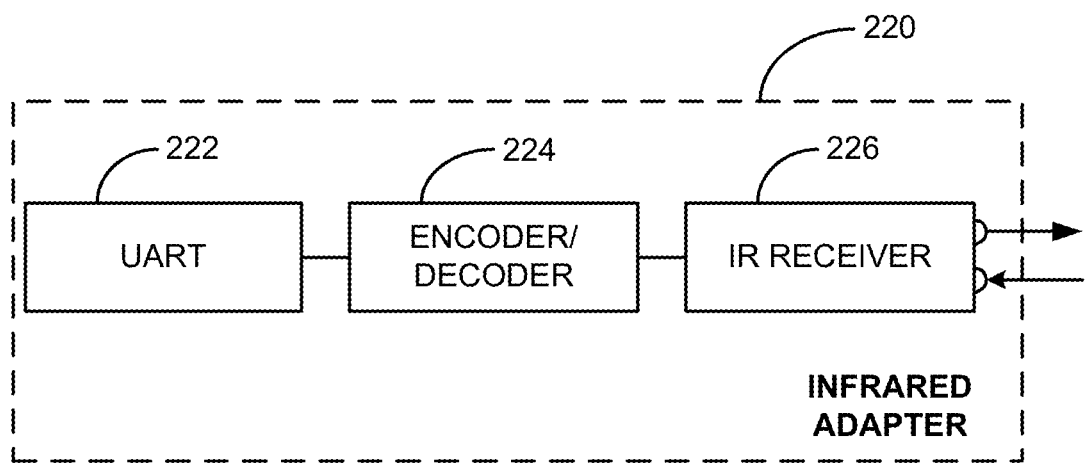

Output manager 308 may manage and maintain wired or wireless communications with output controller 120. Output manager 308 may interact with functionalities implemented by hardware components of its host information apparatus 100. As an example, the output manager 308 may manage and interact with the communication unit in the information apparatus 100. FIGS. 2A and 2B show an example of communication units using wireless adapters, as described below in greater detail. A user may interact with the output manager 308 through a user interface provided by output manager 308 through the host information apparatus 100.

Output manager 308 may help discover available output devices 140, verify communication connections, identify devices available or compatible for service, or send or broadcast service requests to one or more devices.

Output manager 308 may communicate with output controller 120 to identify necessary software components, data, or any other device dependent information or parameters, if any, that need to be uploaded from the output controller 120 to the host information apparatus 100 to enable pervasive output. Software components may be, for example, a device driver, an application, a special code or algorithm, an executable object or device dependent data, parameter, information, etc.

Output manager 308 may coordinate with output controller 120 to upload the necessary components or data from the output controller 120 to its host information apparatus 100 so that the user can output digital content pervasively to that output controller 120 or its associated output device 140.

Output manager 308 may perform raster image processing operations (e.g. rasterization, color management, halftoning operations) or convert digital content from its original format into print data compatible for input to a specific output controller 120 or output device 140. The digital content may be created, stored or received by the information apparatus 100. For example, an output manager 308 may convert digital document information from a certain format or language into a specific print data or intermediate format or language such as PostScript, PCL, EMF, XML, TIFF, JPEG, RTL, among others, for output.

Output manager 308 may coordinate or manage the communication between a host information apparatus 100 and output controller 120 to send or transmit the print data to the output controller 120.

Output Controller 120

An output controller 120 may be implemented as software or hardware and may be connected to or integrated within an output device 140. Output controllers 120H illustrate hardware implementations in the form of a circuit board or card that is installed or integrated into an output device 140, such as a printer, copiers, fax machine, display screen among others. In another configuration (not shown), output controller 120 may be implemented as a software application or component that is installed or integrated into an output device 140. Output controller 120G illustrates a hardware implementation in the form of an external component or "box" that is separately connected to one or more output devices 140.

Whether externally connected to or internally installed in output device 140, output controller 120 may be implemented with hardware, software, or both, that perform the feature sets and functionalities of the output controller 120 described herein. In the case of output device 140 being a printer, output controller 120 can also sometimes be called a printer server. Exemplary configurations and implementations of output controller 120 are described below with reference to FIG. 4.

As one example, output controller 120 may be implemented as a computer connected to one or more output devices 140. For example, a conventional PC, workstation or server may serve the purpose of an output controller 120. In this case, the functionalities of output controller 120 may be implemented using application software installed in the computer (PC, server, or workstation), with the computer connected to the output device 140.

An output controller 120 installed or connected to an output device 140, such as a printer, enables the output device 140 to communicate and negotiate services with information apparatus 100. In one implementation, an information apparatus 100 may communicate with an output controller 120 connected to a printer or an output controller 120 internally installed within a printer to obtain device dependent data or software components such as device specific printer driver. An application such as an output manager 308 residing in the information apparatus 100 may install and configure the uploaded components or data, allowing information apparatus 100 to print to that printer directly. An example of an output process is described below with reference to FIG. 5.

Functionalities and feature sets of output controller 120 may include one or more of the following:

Provide service to clients—Output controller 120 may actively search for available clients, including information apparatus 100 or output manager 308 or other communication units, to which clients' output service could be provided. Alternatively or in combination, an output controller 120 may passively wait to be discovered by one or more clients, including information apparatus 100, to provide output service to the client or clients.

Negotiation of services with information apparatus 100—Output controller 120 may communicate and exchange information with information apparatus 100 as part of negotiating the output services to be provided. As an example, in communication with an information apparatus 100, an output controller 120 may inform the information apparatus 100 of the make, model, identification, version, type of input language, type of device driver software, type of services provided, type of components available for upload, etc. for a selected output device 140 such as a printer. As another example, an information apparatus 100 may send one or more messages to an output controller 120 inquiring about what software component or data, if any, the information apparatus 100 needs to upload from the output controller 120 to enable output to a specific output device 140.

Provide security functionalities such as authentication and encryption—Authentication is used to prevent unwanted access to services, while encryption is used to prevent eavesdropping. Security procedures may be implemented by software, hardware or a combination of both, in various steps and stages of communication between the output controller 120 or the output device 140 and the information apparatus 100.

Payment or transaction management and services—A user may be charged a service fee when, for example, providing output to a printer 140 or other output device 140. Output controller 120 may have the ability to calculate and process payment according to the services requested by or rendered to a client. Output controller 120 may process payments in various forms such as cash, E-cash, credit card, debit card, E-card, smart card, virtual cash, etc.

Storage capability—Output controller 120 may include a memory or storage unit and may store within it one or more of the following: application software, device or printer driver, software components, device dependent data or parameters, user interfaces, etc. Software components or data stored in the output device 140 or the output controller 120 may be uploaded to the information apparatus 100 in order for the information apparatus 100 or the output manager 308 to drive the output device 140. Software components may be executable or partially executable programs or data.

Synchronize with information apparatus 100—After output controller 120 or the output manager 308 in information apparatus 100 identifies the components (software component, data, information or parameters) necessary to enable output or printing, the output controller 120 may coordinate with the output manager 308 to upload to the information apparatus 100 the components stored in a memory or storage unit of output controller 120.

Provide management tools—Multiple information apparatuses 100 may request service from the same output device 140 at the same time or at overlapping times. Management tools such as queuing and spooling of print jobs, quality of service, etc. may be provided by the output controller 120.

As indicated above, output controller 120 may be implemented in a variety of ways and may include hardware, software, or a combination of the two. In hardware implementations, for example, output controller 120 may include components using one or more of hardware types such as ASIC, DSP, FPGA, firmware, system on a chip, and communication chip set. Output controller 120 may also include embedded processors with software components or embedded application software to implement its feature sets, and functionalities. An output controller 120 may or may not contain an operating system.

Output controller 120 typically includes a memory or storage unit (ROM, RAM, flash memory, disk drive—not shown), which may store one or more software applications, software components and data. Some software applications may run in the output controller 120 to perform its functionalities (e.g., communicate with information apparatus 100).

The memory or storage unit of an output controller 120 may also store data and one or more software components that may be available to be uploaded to or synchronized with an information apparatus 100 during communication with output manager 308. A software component may be a device driver or complete application software that can run on the information apparatus 100. Once such a software component is uploaded and installed, the information apparatus 100 can drive or output to that specific output device 140.

A software component may also be a partial device driver or partial application software or partial software component. A software component may be an executable or partially executable program, object or code. Software components may encapsulate information, algorithms, and data. Examples (of algorithms that may be included in the software components include compression/decompression methods, file conversion, graphics representation and rendering, image processing and enhancement operations, color space transformation and data conversion, encoding/decoding techniques, color matching and management methods, image transformation, interpolation methods halftoning techniques, user interface software codes etc. Examples of data that may be included in software components include, for example, a color table, color space information, halftoning tables, output device type, output resolution, bit depth, input type, format or language, communication protocol type, output status, device identification and signature, graphics, image and text descriptions etc.

Such software components may be uploaded to output manager 308 to facilitate communication and generation of print data or output data suitable, compatible or optimized for the output controller 120 or the output device 140. The output controller 120 and output manager 308 manage and negotiate the proper components to be uploaded to the information apparatus 100.

Not all situations require uploading an entire or complete driver or application to output manager 308 or information apparatus 100. In some implementations uploading only a software component may be sufficient. For example, there are many inkjet printers that commonly use one-bit or multi-bit CMYK printing technology, and sometimes have similar resolutions. An information apparatus 100 may pre-install a more generic printer driver, where this printer driver contains the device independent portion of the software code, algorithms, and data that is common or can be used for this entire class of printers. Device-independent code may include, for example, a rasterization process (including half-toning and color management methods) and image enhancement of the digital document that is suitable for use with this entire class of printers. In this example, it is feasible to upload only a smaller software component or data that includes the device-dependent components for a particular printer or output device 140. The device-dependent portion or component or data may include, but is not limited to, color tables, halftoning tables, output resolution, bit depth, compression/decompression methods, color space conversion, encoding algorithms or conversion software that is specific to that printer or output device 140.

Another example of a software component stored in the memory unit of an output controller 120 for uploading to an information apparatus 100 is an installation wizard or a user interface to capture a user's preferences for printing or output operation. Examples of user preferences in the case of printing may include, without limitation, color and print quality parameter adjustments, number of copies, number of cards per page, number of pages per sheet, duplex, portrait or landscape, security information, etc.

Once the software components or data are uploaded or installed in information apparatus 100, the information apparatus 100 can drive or output to the output device 140. For example, an application 302 in the information apparatus 100 can print a digital document or image to a printer.

Different information apparatuses 100 may require different software components to be uploaded in order to drive a specific output device 140. Accordingly, a variety of software components and data or device drivers for a plurality of information apparatuses 100, operating systems, and platform types may be stored in the memory or storage components of an output controller 120.

Output controller 120 may contain an embedded operating system to manage its applications. With an operating system, some or all functionalities and feature sets of the output controller 120 may be implemented as application software. Additional application software may be installed or upgraded to newer versions in order to, for example, provide additional functionalities or bug fixes.

Output controller 120 may contain a user interface that allows a user to configure and manage the functions provided by the output controller 120. The user interface of the output controller 120 maybe accomplished by, for example, using display screens, soft keys, pushbuttons, mouse, stylus and keypads to allow users to interact with and manage the functions provided by the output controller 120. Examples of such functions may include any or all of an on-off power switch, status display or indicator, cancel current job, or reorder existing jobs, etc.

Output controller 120 typically also includes a communication or adapter unit, which allows output controller 120 to communicate with other devices including information apparatus 100 through wired or wireless connections. Exemplary configurations of wireless adapter or communication unit are described below with reference to FIG. 2.

When output controller 120 is implemented as firmware, or an embedded application, the configuration and management of the functionalities of output controller 120 may be optionally accomplished by, for example, using controller management software in a host computer (not shown). A host computer may be a desktop personal computer (PC), workstation, or server. The host computer may be connected locally or through a network to the output device 140 or controller 120. Communication between the host computer and output controller 120 can be accomplished through wired or wireless communication. The management application software in the host computer can manage the settings, configurations, and feature sets of the output controller 120. Furthermore, a host computer configuration application may download or install application software, software components or data in the output controller 120 for the purpose of upgrading, updating, and or modifying the features and capabilities of the output controller 120.

Output device 140 in one implementation includes or is connected to output controller 120 described above. Therefore, functionalities and feature sets provided by output controller 120 are automatically included as part of the functionalities of output device 140. The output device 140 may, however, implement or include other controllers or applications that provide at least partially the features and functionalities of the output controller 120.

Therefore, the output device 140 may include some or all of the functionalities and feature sets provided by the output controller 120.

Output Device 140

Output device 140 is an electronic system capable of outputting digital content regardless of whether the output medium is a substrate (e.g., paper), a display image, a projection, or sound. A typical example of output device 140 may be a printer, which outputs digital documents containing text, graphics, images or any combination onto a substrate. Output device 140 may also be a display device capable of displaying still images or video, such as, without limitation, televisions, monitors, and projectors. Output device 140 can also be a device capable of outputting sound. Any device capable of playing or reading digital content in audio (e.g., music) or data (e.g., text or document) formats is also a possible output device 140. A printer (including a fax machine, copier, etc.) is frequently referred to herein as the exemplary output device 140. However, it should be recognized that the present invention applies as well to output devices 140 other than printers.

Figure 9:
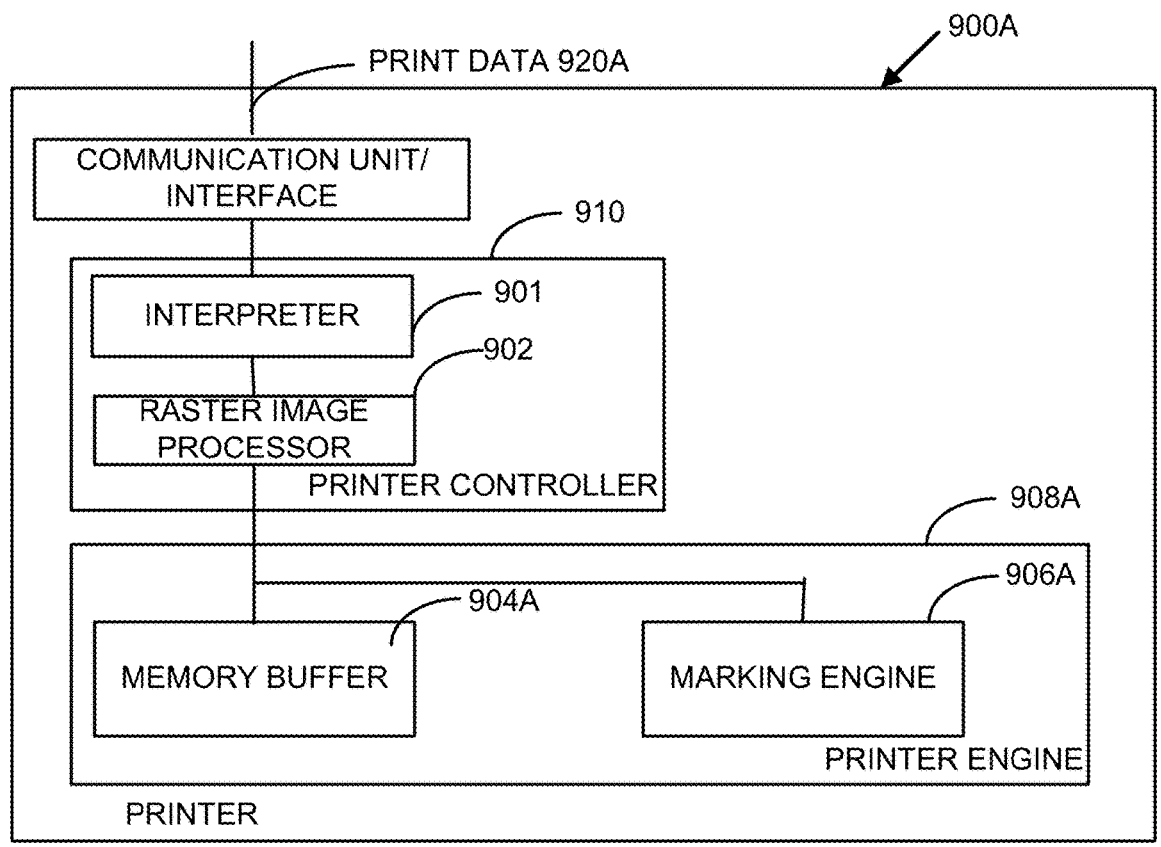
FIG. 9A-9B is a block diagram of a conventional printing system or printer.
Figure 9:
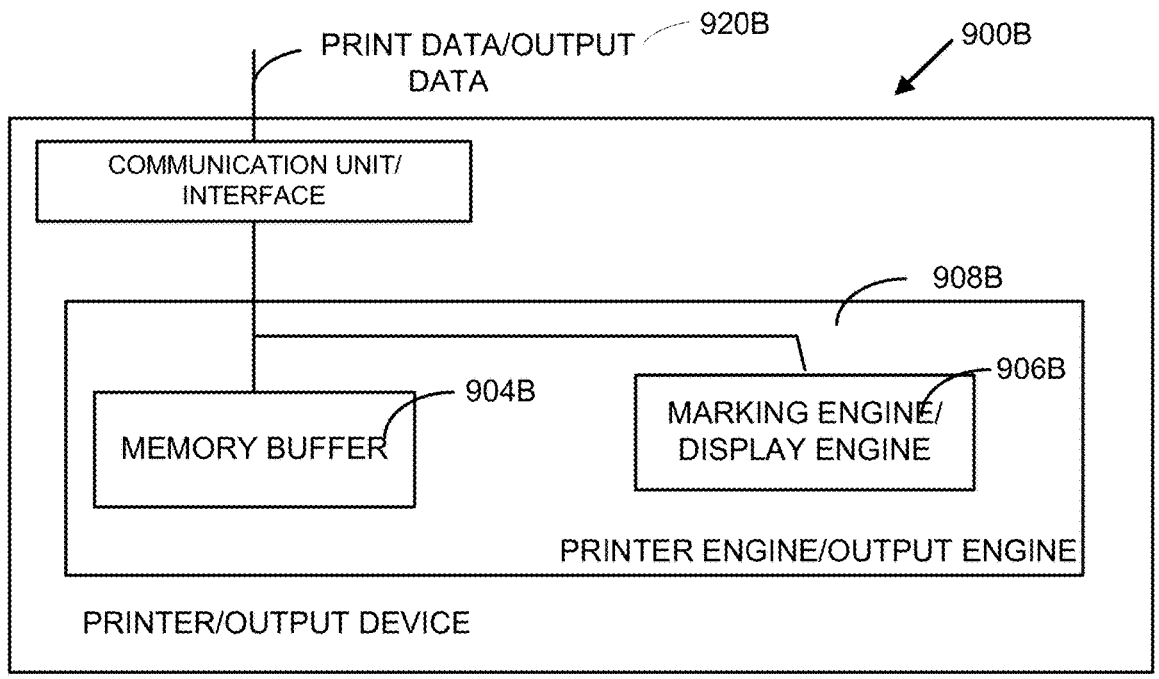

FIG. 9A is a block diagram of a conventional printing system or printer 900A having three basic components: raster image processor (RIP) 902, a memory buffer 904, and a marking engine 906. Raster image processor 902 converts digital content into a bitmap suitable for printing; memory buffer 904 holds the rasterized image ready for printing; and marking engine 906 transfers colorant to a substrate (e.g., paper).

Marking engine 906 may use any of a variety of different technologies to transform a rasterized image to paper or other media or, in other words, to transfer colorant to a substrate. The different marking or printing technologies that may be used include both impact and non-impact printing. Examples of impact printing may include dot matrix, Teletype, daisywheel, etc. Non-impact printing technologies may include inkjet, laser, electrostatic, thermal, dye sublimation, etc.

Marking engine 906 and memory buffer 904 of a printer 900 form its printer engine 908, which may also include additional circuitry and components, such as firmware, software and or chips or chipsets for decoding and signal conversion etc. (not shown). Input to a printer engine 908 is usually a final rasterized print data generated by the raster image processor 902. Such input is usually device dependent and printer specific. The printer engine 908 may take this device dependent input and generate output pages.

Raster image processor (RIP) 902 may be located within the printing device itself (as shown in FIG. 10A) or externally implemented as hardware, software, or a combination. As an example, RIP may be implemented in a software application or device driver in the information apparatus. A RIP may also reside within a printer controller, a print server or an output controller of present invention. Examples of raster image processing operations may include image and graphics interpretation, rasterization, segmentation, color space transformation, image enhancement, color correction, halftoning etc.

When a RIP 902 is located inside an output device 140, the RIP 902 is usually included in a printer controller 910 that may, for example, interpret, convert and/or rasterize input print data into a final format, language or instructions that printer engine 908 can understand. A laser printer with a faster printing speed is an example that falls in this category. For example, a PostScript printer controller 910 may contain a postscript interpreter (not shown) and a raster image processor 902 (RIP). Postscript interpreter interpret the postscript language and the raster image processor 902 may process the digital document and converting it to a printer specific format, language or instructions that can be accepted by the printer engine 908. In this example, a device-dependent printer driver (e.g., a Postscript driver, not shown) may be needed in the information apparatus 100 to convert digital document from its original format into print data (e.g. in PostScript) that is acceptable to the printer controller 910.

Another example of page description language is PCL (Printer Command Language) from HP (Hewlett Packard). In the same way as postscript, a printer equipped with PCL printer controller 910 can take PCL as input. Information apparatus 100 usually needs to have PCL printer driver in order to drive or print to a printer equipped with a PCL controller.

Although the illustrations above use PostScript and PCL as examples, a variety of other page description languages, markup languages, image formats, graphics formats, and file formats may also be used as input print data 920 to a printer 900 or output device 140. Examples of possible inputs other than PostScript and PCL may include without limitation, EMF, XML, HTML, among many others. Some printer manufacturers may also use a combination of proprietary or non-proprietary page description languages, markup languages, file formats, graphics and image formats, color spaces, metafiles, encoding, decoding, compression or decompression etc. for the print data 920. Print data 920 sent to printers with printer controllers 910 are usually intermediate descriptions of a digital document that may require further interpretation, processing and/or conversion before it can be send a printer engine for output. A printer controller 910 may interpret and process the input intermediate print data information into the final format that can be understood by the printer engine 908. Regardless of the type of print data 920, users usually have to pre-install a device-specific driver in their information apparatus 100 in order to output the proper language, format, or file that can be accepted by a specific printer 140.

Some output devices 900B do not have a printer controller 910 as shown in FIG. 9B. A typical example is a lower-cost inkjet printer. RIP in this example may be implemented in a software application 302 or device driver or output manager 308 of present invention in the information apparatus 100. Therefore, the rasterization process may occur in the information apparatus 100 that outputs to such a printer. A device-specific driver or application may need to reside in the information apparatus 100 to rasterize and convert the digital document from its original format into final print data 920B (e.g., compressed CMKY data with one or more bits per pixel) that can be understood by a particular printer engine 908B.

In present invention, for the printer 900B, RIP can be integrated within the output manager 308 or application software 302 in the information apparatus 100. Alternatively, RIP may also be integrated as a part or a function of any one of output controllers as shown in configurations 120D, 120E, and 120F.

The output controller 120 may be connected externally to an output device 140 or integrated internally into the output device 140. If an output device 140 such as a printer already includes a printer controller 910, the output controller 120 may be implemented serially or cascaded with the printer controller 910 as two separate controllers. Alternatively, output controller 120 can be integrated with a printer controller to become a "combined controller" 120C. A combined controller (e.g., 120 C or 120 F) has functionalities of both printer controller 910 (e.g., input interpretation and or raster image processing) and output controller 120 of the present invention. Other configurations and implementations of output controller 120 and printer controller 910 are also possible. The various possible configurations and implementations of output controller are described below with reference to FIG. 4.

Communication Unit

Communication links 150 and 160 between information apparatus 100 with an output controller 120, whether externally connected and or internally integrated, may be variously implemented. In one implementation, information apparatus 100 communicates with output controller 120 through wireless connections such as infrared or radio links. Examples of wireless connections technology include without limitation IrDA, home RF, Bluetooth, IEEE 802.11, HiperLan2, among others. However, wired connections such as serial interfaces, parallel interfaces, USB interfaces, Fire Wire (IEEE 1394), Ethernet and token ring network among others may also be implemented in the present invention. Adapter pairs may be incorporated into each communicating node (e.g., information apparatus 100 and output controller 120) to conduct communications by performing signal conversions.

Figure 4A:
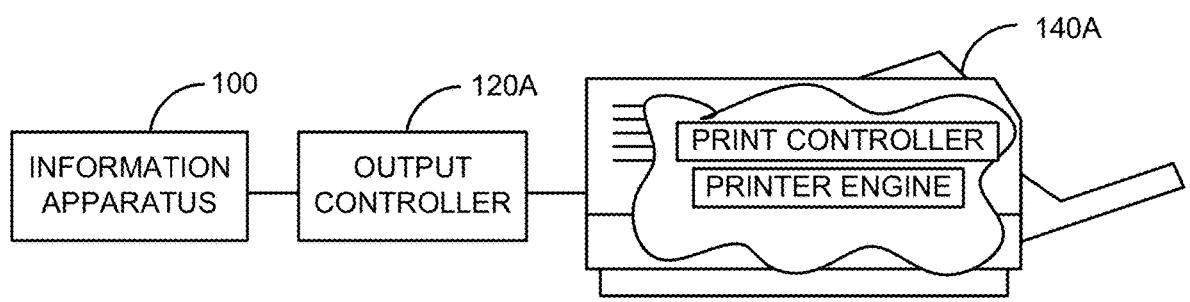
FIGS. 4A-4F illustrate various configurations and implementations of output controller with respect to a printer or output device.

In the case that output controller 120 is installed as an external component or "box" (as shown in FIG. 4A), the communication link 170 between output controller 120 and output device 140 may also be implemented using wired or wireless adapters.

FIGS. 2A and 2B are block diagrams illustrating two exemplary configurations and implementations of wireless communication adapters that may be included in an information apparatus 100, output controller 120 or output device 140. Referring to FIG. 2A, a radio adapter 200 may be implemented to enable data/voice transmission among devices through radio links. A RF transceiver 214 coupled with antenna 216 is used to receive and transmit radio frequency signals. The RF transceiver 214 also converts radio signals into and from electronic signals. The RF transceiver 214 is connected to a RF link controller 210 by an interface 212. The interface 212 may perform functions such as analog-to-digital conversion, digital-to-analog conversion, modulation/demodulation and other data conversion functions.

RF link controller 210 implements real-time lower layer (e.g., physical layer) protocol processing that enables the hosts (e.g., information apparatus 100, output controller 120, output device 140, etc.) to communicate over a radio link. Functions performed by the link controller 210 may include, without limitation, error detection/correction, power control, data packet processing, data encryption/decryption and other data processing functions.

A variety of radio links may be utilized, including a group of competing technologies operating in the 2.4 GHz unlicensed frequency band. This group currently includes Bluetooth, Home radio frequency (Home RF) and implementations based on the IEEE 802.11 standard. Each of these technologies has a different set of protocols and they all provide solutions for wireless local area networks (LANs). Interference among these technologies could limit deployment of these protocols simultaneously. It is anticipated that new local area wireless technologies may emerge or that the existing ones may converge. Nevertheless, all theses existing and future wireless technologies may be implemented in the present invention to transmit data between different devices without limitation and therefore in no way depart from the scope of present invention.

Among the current available wireless technologies, Bluetooth requires relatively lower power consumption. Bluetooth has its own protocol stack and is designed for short range (10 meters), point-to-multipoint voice and data transfer. It is based on a frequency-hopping version of spread spectrum. Seventy-nine hop frequencies are utilized beginning at the lowest frequency of 2402 MHz and each of the 79 hop frequencies is 1 MHz above the next lower frequency. Bluetooth-enabled devices operate in piconets, in which several devices, using the same hopping pattern or sequence, are connected in a point-to-multipoint system (piconet). One device (master) in each piconet determines how the bandwidth is allocated to other devices (slaves). As many as 10 piconets of 8 devices each can operate simultaneously.

Referring to FIG. 2B, infrared (IR) adapters 220 may be implemented to enable data transmission among devices through infrared transmission. The IR adapters 220 may be conveniently implemented in accordance with the Infrared Data Association (IrDA) standards and specifications. In general, the IrDA standard is used to provide wireless connectivity technologies for devices that would normally use cables for connection. The IrDA standard is a point-to-point (vs. point-to-multipoint as in Bluetooth), narrow angle, ad-hoc data transmission standard designed to operate over a distance of 0 to 1 meter and at speeds up to 4 Mbps.

Configuration of infrared adapters 220 may vary depending on the intended rate of data transfer. FIG. 2B illustrates one embodiment of infrared adapter 220. Transceiver 226 receives/emits IR signals and converts IR signals to/from electrical signals. A UART (universal asynchronous receiver/transmitter) 222 performs the function of serialization/deserialization, converting serial data stream to/from data bytes. The UART 222 is connected to the IR transceiver 226 by encoder/decoder (ENDEC) 224. This configuration is generally suitable for transferring data at relatively low rate, for example 115.2 kbps or below. Other components (e.g. packet framer, phase-locked loop) may be needed for higher data transfer rates.

FIGS. 2A and 2B illustrate exemplary configurations of wireless adapters. Such adapters are implemented into devices (e.g., information apparatus 100, output controller 120, output device 140, etc.) to enable wireless communications among/between them. Wired links, however, such as parallel interface, USB, firewire interface, Ethernet and token ring networks may also be implemented in the present invention by using appropriate adapters and configurations.

Different Output Manager Configurations and Processes

FIGS. 3A-3C illustrate different implementations of output manager 308. FIG. 3A shows an exemplary configuration of output manager 308 in which its host information apparatus 100 includes an operating system. Such information apparatuses 100 may include, without limitation, desktop PC, laptop PC and handheld or palmtop computer, among others. The operating system provides API's or object models 300 for software applications 302 to interface and communicate with various device management applications sometimes called device drivers. Output manager 308 in this case may be characterized as one of the device management applications or device drivers. Different software applications 302A can share the same output manager 308 through the use of API's 300 provided by an operating system.

As shown in FIG. 3A, email application 302 A1, document creation application 302 A2 and Internet browsing application 302 A3 (referred to generally or together as application software 302) may operate on top of or through an operating system included in the information apparatus 100. The operating system provides or supports API's or object models 300 for these software applications 302 to communicate with and access utilities and services provided by output manager 308. Application software 302 and output manager 308 may communicate with each other through a variety of means using for example file transfer, metafile, messages, instances, procedural calls, etc., which may or may not be provided by the operating system or its API's or object models 300. The output manager 308 communicates and synchronizes with output controller 120 to enable pervasive output. Therefore, a user may output digital contents from any of these software applications 302 (email, document creation, Internet browsing, etc.) to an output device 140 equipped with or connected to output controller 120.

It should be recognized that the three software applications 302(1)-302(3) illustrated in FIG. 3 are merely examples of applications that may be included in the information apparatus 100. Various other software applications 302 (e.g., messaging, digital imaging, graphics, video, audio, etc.) may also exist in the same information apparatus 100 and they may all access the utilities provided by the output manager 308. It should also be recognized that other device management applications or drivers might also be included in the information apparatus 100. These device management applications or drivers may be implemented in the same way as output manager 308 so that they can be accessed by other software applications supported by the operating system.

FIGS. 3B and 3C illustrate exemplary configurations of output manager 308 when information apparatus 100 includes, respectively, no operating system or a less capable operating system that does not provide API's or object models 300 for software application 302 interactions. Examples of such an information apparatus 100 may include, without limitation, PDA, smart phone, pager, Internet pad, email terminal, digital and video cameras, ebook and other dedicated devices etc. In this case, each software application 302 in the information apparatus 100 provides or implements the capabilities to enable pervasive output. As shown in FIG. 3B, each software application 302 B1-302 B3 integrates output manager 308 or includes the features of output manager 308 to enable pervasive output. It should be recognized that, even in an environment where there is a complete operating system, application software 302 can still decide to implement its own output or device management capabilities (as shown in FIG. 3B) and not depend or use the functionalities or API's or object models 300 provided by an operating system to facilitate access of output manager as a separate application.

Instead of integrating the output manager 308 into application software 302, an alternative implementation is shown in FIG. 3C. The software applications 302 C1-302 C3 may establish direct links with the output manager 308, which may be used as a helper program that can be invoked or launched by each software application 302 as needed.

The communication and exchange of information between output manager 308 and other software applications 302 can be accomplished by one or more of many available techniques, such as passing, transferring or exchanging objects, messages, procedural calls, files, metafiles, etc. Some of these techniques may be facilitated by a set of APIs or object models provided by the application software 302 or output manager 308 or the operating system. The exact technique may depend for example on the type of application, platform, language, and developer preference etc. This may be easily implemented and recognized by an average software engineer skilled in the art.

The above are merely exemplary implementations of output manager 308. Due to the diversity of feature sets and capabilities of operating systems, other implementations of output manager 308 are also possible. As an example, some operating systems may provide partial APIs or object models to support limited output capability. In this case, software applications 302 may rely on the limited output capacity to interact with device management applications, or the software applications 302 can implement or incorporate partially other desired output features of the output manager 308 using the configurations or combination of configuration illustrated in FIG. 3B or 3C.

Different Output Controller Configurations and Processes

FIGS. 4A-4F illustrate various alternative configurations and implementations of output controller 120. As described above, a printer 900A (FIG. 9) may include within it a RIP 902 or printer controller 910. Such printer 900A is usually more powerful and therefore more expensive than printers without these features. One example of such printer 900A is high-speed laser printer. Output controller 120 may be variously implemented in printers regardless of whether they include a printer controller.

FIG. 4A shows that output controller 120 may be cascaded externally to one or more printers (only one shown). Information apparatus 100 communicates with output controller 120A, which then communicates with output device such as a printer 104A. The communication link between the output controller 120A and the printer 140A may be a wired link or a wireless link, as described above.

Figure 4B:
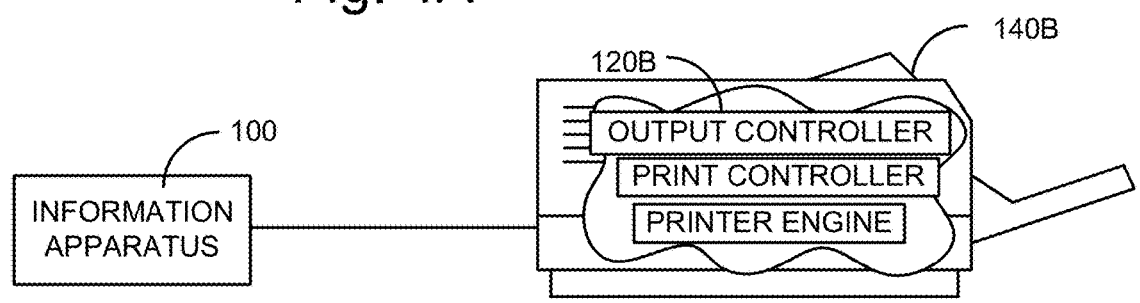

FIG. 4B shows another implementation in which output controller 120B is installed as one or more circuit boards or cards internally inside printer 140B. The output controller 120B may co-exist with printer controller and other components of the printer 140B. One example of this implementation is to connect output controller 120B sequentially with the printer controller.

Figure 4C:
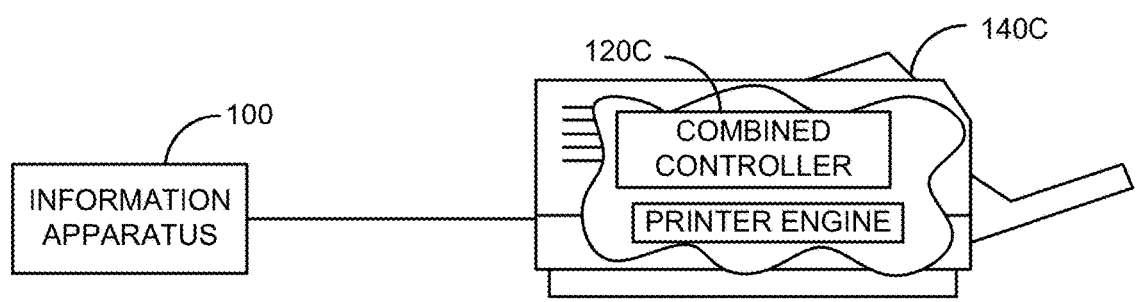

FIG. 4C show a third implementation in which the functionalities of output controller 120 and printer controller 910 are combined into a single controller (-referred to as "combined controller") 120C. The combined controller 120C is a more capable controller. In this implementation, it is possible to reduce the cost of material when compared to implementing two separate controllers as shown in FIG. 4B. As an example, the combined controller 120C may share the same processors, memories, and storages to run the applications and functionalities of the two types of controllers and therefore, may have lower component costs when compared to providing two separate controllers.

Some printers do not include a raster image processor or printer controller 910, as illustrated in FIG. 9B, and as a result are usually less expensive. An example of this type of printer is a low-cost desktop inkjet printer. This type of printer may use a proprietary or published input format. For example, the input to an inkjet printer may consist of specific proprietary compressed CMYK data with one or more bits per pixel input. Application software 302 or printer drivers included in information apparatus 100 usually perform raster image processing. It is therefore necessary that the proper device driver or application software runs the raster image processing on an information apparatus 100 before printing. Accordingly, output controller 120 may be implemented into a variety of printing systems, including printers without capable or complete printer controllers for performing raster image processing functions.

Figure 4D:
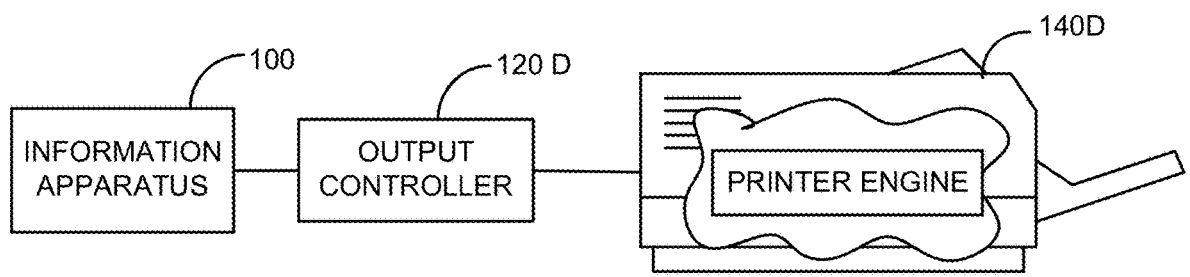

FIG. 4D shows as a fourth implementation of output controller 120D that is installed in an external component or "box," which is connected to a printer 140D that does not include a printer controller or raster image processor. In this configuration, an application software 302 or device driver 308 in information apparatus 100 would typically perform the rasterization function. However, some or all operations of raster image processing may also be implemented in the output controller 120D. Any print data sent to the printer 140D from the output controller 120D is preferred to be in a final format that can be understood and processed by the printer engine of the printer 140D. As in other examples, connection between output controller 120D and output device 140D can be wired or wireless. Connection between information apparatus 100 and output controller 120D is preferred to be wireless, for example.

Figure 4E:
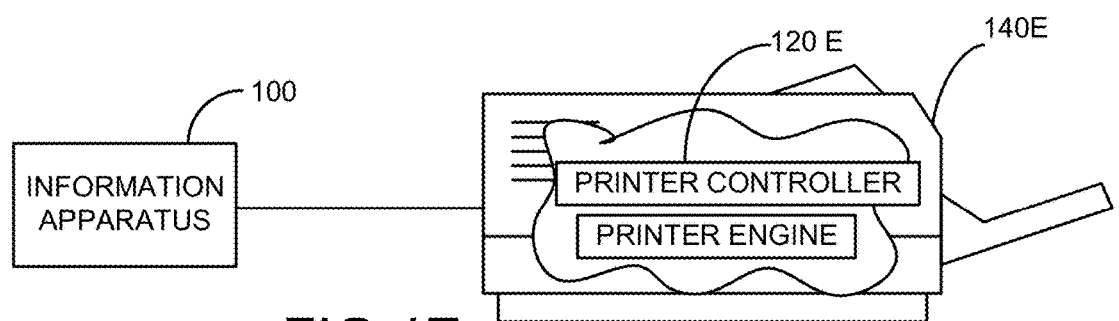

FIG. 4E shows as a fifth implementation of an output controller 120E that is incorporated within printer 140E as one or more circuit boards or cards and may contain software and applications running on an embedded processor. As with printer 140D (FIG. 4D), printer 140E does not include a printer controller or raster image processing capability. Accordingly, information apparatus 100 would typically perform rasterization functions in this implementation. However, raster image processing could alternatively be provided completely or partially by output controller 120E, for example, to speed up raster image processing operations for an information apparatus 100 having limited processing and memory capabilities.

Figure 4F:
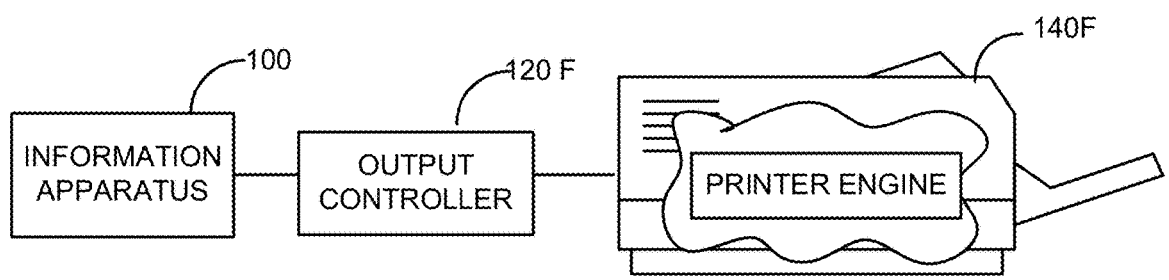

FIG. 4F shows a sixth implementation, a combined controller 120F that integrates the functionalities of a printer controller and an output controller into a single external combined controller component or "box" 120F. The two controller functions may share a common processor as well as a common memory space to run applications of the two types of controllers. Under this configuration, either information apparatus 100 or the combined controller 120F could perform or share raster image processing functionality. One exemplary implementation of the combined controller 120F shown in FIG. 4F is to use an external computing device (PC, workstation, or server) running one or more applications that includes the functionality of output controller 120 and printer controller 910.

The above are exemplary implementations of output controller 120, but other implementations are also possible. For example, partial functionalities of output controller 120 may be implemented in an external "box" while the remaining functionalities may reside within an output device 140 as a separate circuit board or integrated with a printer controller. As another example, the functionalities of output controller 120 may be implemented into a plurality of external boxes connected to the same output device 140. As a further example, the same output controller 120 may be connected to and service multiple output devices 140.

Figure 5:
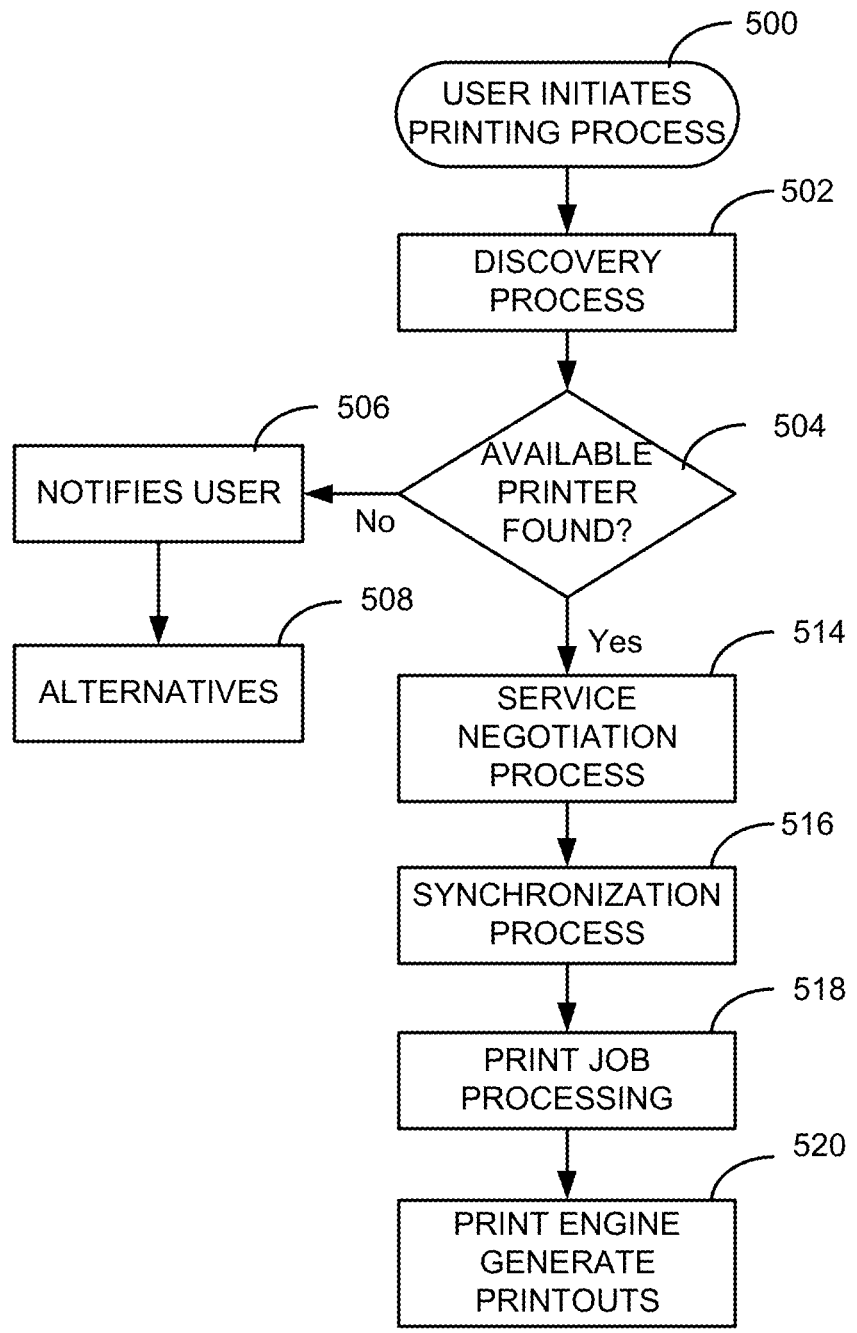
FIG. 5 is a flow diagram of a pervasive output process of the present invention.

FIG. 5 illustrates one embodiment of output process using a printer as primary output device 140. It should be recognized, however, the following described process can be similarly applied to other output devices 140 such as fax machines, digital copiers, display screens, monitors, TVs, voice output devices, etc Step 500 indicates that a user initiates output from an information apparatus 100. For example, a user may want to print or otherwise output an email, receipt, confirmation, map, photo, graphics, web page, one or more slides of a PowerPoint®-brand presentation, or any other document or digital content from an information apparatus 100. The output may be initiated by various means, such as by using a soft key, push button, keyboard, keypad, mouse, stylus, software GUI, command or voice activated command, etc. An exemplary user interface with which a user may initiate such a process from an information apparatus 100 is described below with reference to FIG. 8. Step 500 and one or more other steps of output process, shown in FIG. 5, may be implemented by an output manager 308 residing in a user's information apparatus 100.

Step 502 references a discovery process in which, for example, information apparatus 100 searches for available output devices 140, including display devices, printers, copiers or fax machines among others (collectively refer to as "printers" here for simplicity of discussion), that can perform a requested output or print job. The output manager 308 residing in the information apparatus 100 may participate in, coordinate and manage the discovery process 502. As part of discovery process 502, information apparatus 100 may communicate via a wired or wireless connection with output controllers 120 that are connected to or included in output devices 140.

In some situations, the discovery process 502, or part of it, may be skipped. For example, discovery process 502 may be skipped if a user already knows the output device or printer to which output is to be directed. As another example, a user may set a frequently used printer as a preferred default printer so that discovery process 502 may be partly skipped if the default printer is found to be available. Other examples in which discovery process 502 may be optional or partly skipped involve direct wire line connections or infrared communications. In these cases, a user may directly connect or physically point an information apparatus 100 to a specific output device 140 so that it could be sufficient only to check the connection and establish communication between the devices.

Discovery process 502 may operate in a variety of scenarios. In one scenario, information apparatus 100 broadcasts a service request, for example printing, through wired or wireless signals. Service devices, such as output device 140 equipped with output controller 120, "listen to" such signals, "read" the request, "see" whether they can provide requested service, and respond if they can provide the requested service. Alternatively or in combination, all service devices can periodically or continuously announce or advertise the services they provide. Information apparatus 100 "listens to" such announcements and identifies the service it needs. In a third scenario, service devices of the same network (e.g., LAN) register their services with a control point. A control point is a computing system (e.g. a server, controller) that maintains records on all service devices within the same network. Information apparatus 100 may contact the control point to search for the service it needs.

Various protocols may be implemented in the discovery process 502. Wireless communication protocols are preferred. Wired communication, on the other hand, may also be implemented. Examples of applicable protocols may include, without limitation, Bluetooth, HAVi, Jini, Salutation, Service Location Protocol, and Universal Plug-and-play, among others. Other proprietary protocols or combinations may also be implemented in the discovery process.

In the discovery process 502, information apparatus 100 may or may not find an output device 140 available to accept its print or output job. Exemplary factors that may impact the availability of output devices 140 may include, without limitation, the following:

Physical distance—Some wireless communication links may impose limitations on physical distance between communicating devices. The restrictions on physical distance may vary among different wireless communication technologies. Wired communication, on the other hand, is also subject to the availability and length of cable or other wired lines.

Compatibility—The output process with reference to FIG. 5 employs communication and coordination among various devices such as an information apparatus 100 having output manager 308, and output controllers 120 associated with output devices 140. Compatible hardware and software components may need to reside in each of the communicating nodes (e.g., information apparatus 100 and output device 140). Any missing part may cause compatibility problems. Other factors may also cause lack of compatibility. For example, components stored in the memory unit of output controller 120 may not support the operating system or application software 312 included in the information apparatus 100.

Security authentication—Security authentication may be implemented in various steps of communication, including the discovery step 502. Security authentication may be required for example when an output service is restricted to a certain group of users or information apparatuses. When a user requests service, output device 140 or output controller 120 may process an authentication step by automatically detecting the identification or other information provided by the user, output manager 308 or information apparatus 100. As a result of such an authentication process, the information apparatus 100 of a particular user may not be able to discover an available output device 140 because access is not authorized for the user or the apparatus.

User specified search criteria—The user may specify certain search criteria for discovery process 502, such as output device model, quality of service provided, range or price of service charge, etc. Output devices 140 not satisfying user criteria or a default profile may not be shown to the user.

Step 506 indicates that the user is notified if no available output device 140 is found in the discovery process 502. The user may be notified by an application such as the output manager 308 through a user interface of the information apparatus 100. The information apparatus 100 may also provide more detailed information such as the reasons why the requested service is not available. Examples of possible reasons may include, among others: no output device within limited physical distance, no compatible hardware or software components, technical difficulties, security authentication not satisfied, no subscription to the service, search criteria not met, etc.

Step 508 indicates that alternatives are provided when a requested service is not available at the current moment. The user may be provided with alternatives such as canceling the service request, trying again, or being notified when the requested service is available or the requested output device 140 is identified or becomes available. As an example, the user's information apparatus 100 may not detect any available output devices 140 in the current wired/wireless network. The print requests are then queued or registered within the information apparatus 100. When the user enters a new network having available printers, or when new compatible printers are added to the current network or when a printer becomes available for any reason, the user would be notified of such availability through the information apparatus 100. The user may then output the print job to the newly detected or now available printer with, for example, a mere click of a button. This detection and notification function may be implemented by a software program or as a feature of the output manager 308. This feature may also be implemented in hardware or combination of hardware and software residing in the information apparatus 100.

Step 514 indicates that service negotiation is performed, such as when one or more available printers are discovered in the discovery process 502. In service negotiation process 514, information apparatus 100 exchanges information with output controllers 120 connected to or installed in the available output devices 140. The output manager 308 may participate in, coordinate or manage negotiation process 514 with output controller 120. Information being exchanged may include, for example, the following:

- Type, make and model of each available output device 140, including information about the printer engine, its technology and specifications of the output device.
- Type and parameters of the output device 140 such as font or international character code supported, paper size, resolution, bit depth, color space, number of colors supported, color or grayscale etc.
- Type of service and quality of service provided by each available output device 140.
- Conditions under which the services are provided (e.g., service charge, subscription charge) and whether, for example, transaction and service charges are satisfied.
- Whether the usage or service of each output device 140 is restricted to certain groups, in which case the user may have to provide authentication information to be identified as member of such a group before use of that device is allowed.
- Type, make and model (including operating system) of the information apparatus 100.
- The type of input format, encoding, language, data, color space, and or compression that the output controller 120 or other device may take as input, for example, PostScript, PCL, RTL, XML, etc.
- The type of component or data that may need to be uploaded from output controller 120 to information apparatus 100 so as to enable output to a specific output device.

The information being exchanged may be entered manually by the user or may be automatically detected and or synchronized between the information apparatus 100 and the output controller 120 or it may be partially assisted by the user or partially automated. Some or all of the information being exchanged may be provided to the user through a user interface in the information apparatus 100. The user may monitor the status or approve certain transactions. One embodiment of the service negotiation process 514 is described below with reference to FIG. 6. Based on the information provided and obtained in the service negotiation process 514, the user may choose one or more output devices 140 that can take the print or output job.

Step 516 indicates that a synchronization process is performed once an output device 140 has been identified and selected. Before synchronization process 516 begins, the information apparatus 100 may communicate with the output controller or controllers 120 of the selected output device or devices 140 to identify what components, if any, need to be uploaded to the information apparatus 100 to enable printing or other output. This communication between information apparatus 100 and output controller or controllers 120 may not be necessary if adequate information has been obtained in the discovery process 502 and or service negotiation process 514. Synchronization process 516 may be optional or it may be partially skipped if the necessary components (e.g., identified in the service negotiation step 514) already exist in information apparatus 100.

After they have been identified, the necessary components or parts of components or data may be uploaded to the information apparatus 100 from output controller 120. Examples of possible components may include, without limitation, one or more of the following: data, device driver, printer driver, application software, software components, metafiles, user interface etc. The output manager 308 may participate in, coordinate or manage the synchronization process 516. Encryption techniques may be implemented in the synchronization process 516 to prevent eavesdropping.

The newly uploaded components may be incorporated into the output manager 308 residing in the user's information apparatus 100. Alternatively or in combination, the newly uploaded components may be installed into the information apparatus 100 as a separate application or as part of the output manager 308. The process of uploading and installing may be done automatically or manually by the user, or a combination of the two.

Part or all of synchronization process 516 may be skipped in some instances. For example, the information apparatus 100 may already include all the software components and data or drivers necessary for output to the selected output device or devices 140. This may be due to the components having been uploaded from a previous synchronization process 516 and left undeleted, or alternatively the user may have preinstalled all the necessary components for output in the information apparatus 100. In these cases, no software components are being uploaded and the user may be notified of this status for possible override of synchronization process 516. Alternatively synchronization process 516 may be automatically skipped transparently to the user.

Step 518 indicates that print or output job processing is performed. In this step 518, the print request or print job is processed and digital content or document may be converted to the final format to send to the output device 140 for output. At the beginning of this step 518, the user may be provided with options to select or change or input printing or output preferences such as page layout, number of copies, color/grayscale, print quality parameters, etc. These options may include or offer pre-configured user preferences or factory defaults. Some options, parameters and preferences may be device-dependent while others may be device-independent. For example, device dependent parameters and preferences may be presented after having synchronized or uploaded device dependent components or information from the output controller 120. Device independent parameters and preferences may also be uploaded and synchronized like the device dependent parameters and preferences or may be pre-installed as part of the output manager 308 prior to the synchronization and uploading of information.

With reference to FIGS. 4A-4F, output controller 120 may be implemented in a variety of ways. Different implementations of output controller 120 may impact the procedures described here. The original digital document or content included or generated in an application 312 in information apparatus 100 may be processed by different applications in different locations (application software 312, output manager 308, output controller 120, printer controller) before being converted to a final print data that can be accepted by a printer engine for output. For example, raster image processing of the digital document to convert it to print data suitable to output device 140 may occur entirely or partially in application software 312, output manager 308, output controller 120, or the printer controller, depending on the implementation, configuration, and the type of output system and output device among others. Different processing procedures and embodiments that may be implemented in this step 518 are described in more detail below with reference to FIG. 7.

Step 520 indicates that the printer engine or display engine 908 generates a final output. In this step 520, the processing result of step 518 is sent to a printer engine or display engine 908 of an output device 140 to generate final output on a substrate, for example. Memory buffers may be needed to temporarily store print data before output. Firmware, DSP, ASIC, FPGA, system-on-a-chip, software, or a combination, may be used or involved to convert digital data into signals suitable for the printer engine or display engine 908.

After a print job or output job has been successfully printed or displayed, the user may be provided a choice (not shown) to delete the components that have been uploaded to the information apparatus 100 during the synchronization process 516. This optional feature may be useful when the information apparatus 100 has limited storage space. One implementation of this optional feature is to provide a setting in the output manager 308 in which the user has a choice to (1) always keep the uploaded data or components; or (2) always automatically delete the uploaded data or components upon completion of the print job, or upon exit of the application, or upon shutting down of the information apparatus or upon elapse of certain amount of time; or (3) always ask the user whether to delete or keep the uploaded component or data.

The above description illustrates an exemplary embodiment of output process 501. A printer is referred to as output device 140 in the above illustration, however, it should be recognized that output process 501 could be easily applied to other output devices 140 such as fax machines, digital copiers, display screens, TVs, monitors, projectors, voice output devices etc.

A pervasive output process implementing fewer or additional steps may also be possible. For example step 502, the discovery process, may be skipped if the user already knows which printer or printers are to output the content. As another example, a payment-processing step may be added to the above-described output process 501 if the printing service is provided for a fee. Output controller 120, in this case, may provide services such as calculating payment amount or collecting payments in a variety of possible forms, for example, credit card, bank card, cash, E-cash, smart card, among others. The payment information (e.g., credit card number or other credit identification or payment) may be stored in the information apparatus 100 and released to the output controller 120 at the user's choice. Adding additional processes or skipping one or more steps in output process 501 does not, however, depart from the spirit and scope of present invention.

Figure 6:
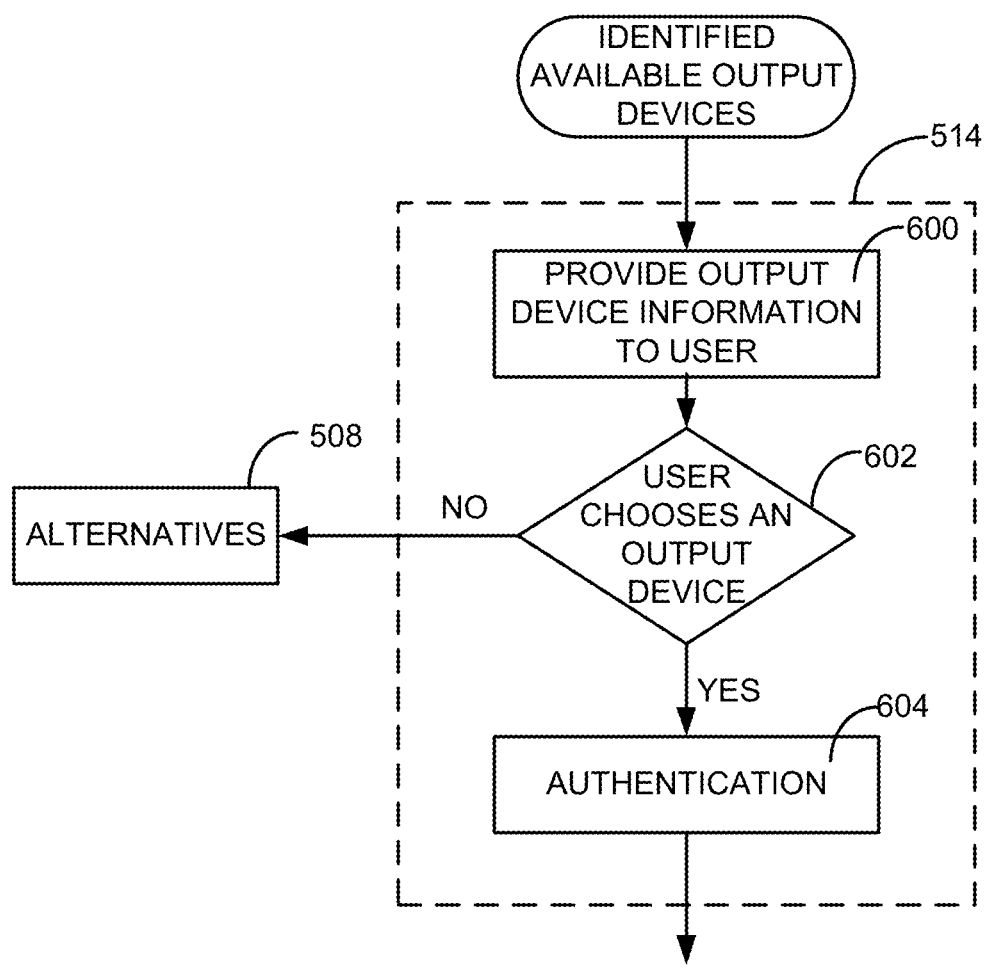
FIG. 6 is a flow diagram of an exemplary implementation of service negotiation process optionally included in the output process of FIG. 5.

FIG. 6 illustrates an embodiment of service negotiation process 514. In this illustration, it is assumed that available output devices 140 have been identified from the discovery process 502. In the service negotiation process 514, information apparatus 100 exchanges information with output controller 120 or output devices 140. Service negotiation process 514 may include one or more of the following:

(1) The user may be provided with information on the available output devices 140.
(2) The user may select a desired output service according to the information provided.

The output manager 308 residing in the information apparatus 100 may participate in, coordinate and manage the service negotiation process 514, together with the output controller 120.

In step 600, the user may be provided at information apparatus 100 with information on some or all available output devices 140 identified in the discovery process 502. Information being provided here may include one or more of the following:

Total number of available output devices discovered.
Model and make of each available output device.
Type and capability of the output device.
Type of service and quality of service provided by each available output device.
Conditions under which the services are provided. For example, if service charge or subscription fee is required and the acceptable payment method.
Whether the use of each output device is restricted to certain groups.
The components or information, if any, need to be uploaded to the information apparatus to enable output to the selected output devices.

Information collected during discovery process 502 may be provided to the user through a user interface on the information apparatus 100, such as a GUI or voice or another interface.

In step 602, based on some or all of the information provided, the user may choose one or more output devices to take the print request or print job. On the other hand, the user may choose to decline the output service offered, and choose not to output the document or content to any of those devices. In this case, alternatives may be provided to the user as previously described with reference to step 508 (FIG. 508).

Authentication step 604 is optional, but may be necessary if, for example, the use of an output device 140 is restricted to a group of users. In this case, the user may have to provide authentication information to identify him/herself as part of the authorized group to use the service. Examples of authentication methods may include a user's name, password, personal identification number (PIN), ID number, signatures, security keys (physical or digital), biometric, fingerprint, voice, etc. ID number or IP address of the information apparatus 100 may also be used as authentication information. Such authentication information may be provided by the user manually or detected automatically by the output controller 120 or output device 140.

It should be recognized that FIG. 6 only provides one embodiment of the service negotiation process 514 of present invention. A service negotiation process 514 having fewer or additional steps may also be possible. As an example, step 604 (authentication) may not be necessary if the use of an output device 140 is not restricted. As another example, one or more steps, such as credit verification, payment, deposit, escrow, and receipt processing may be added to the negotiation process 514 if a service charge is involved. All these and other possible variations, however, shall not depart from the spirit and scope of present invention.

Figure 7:
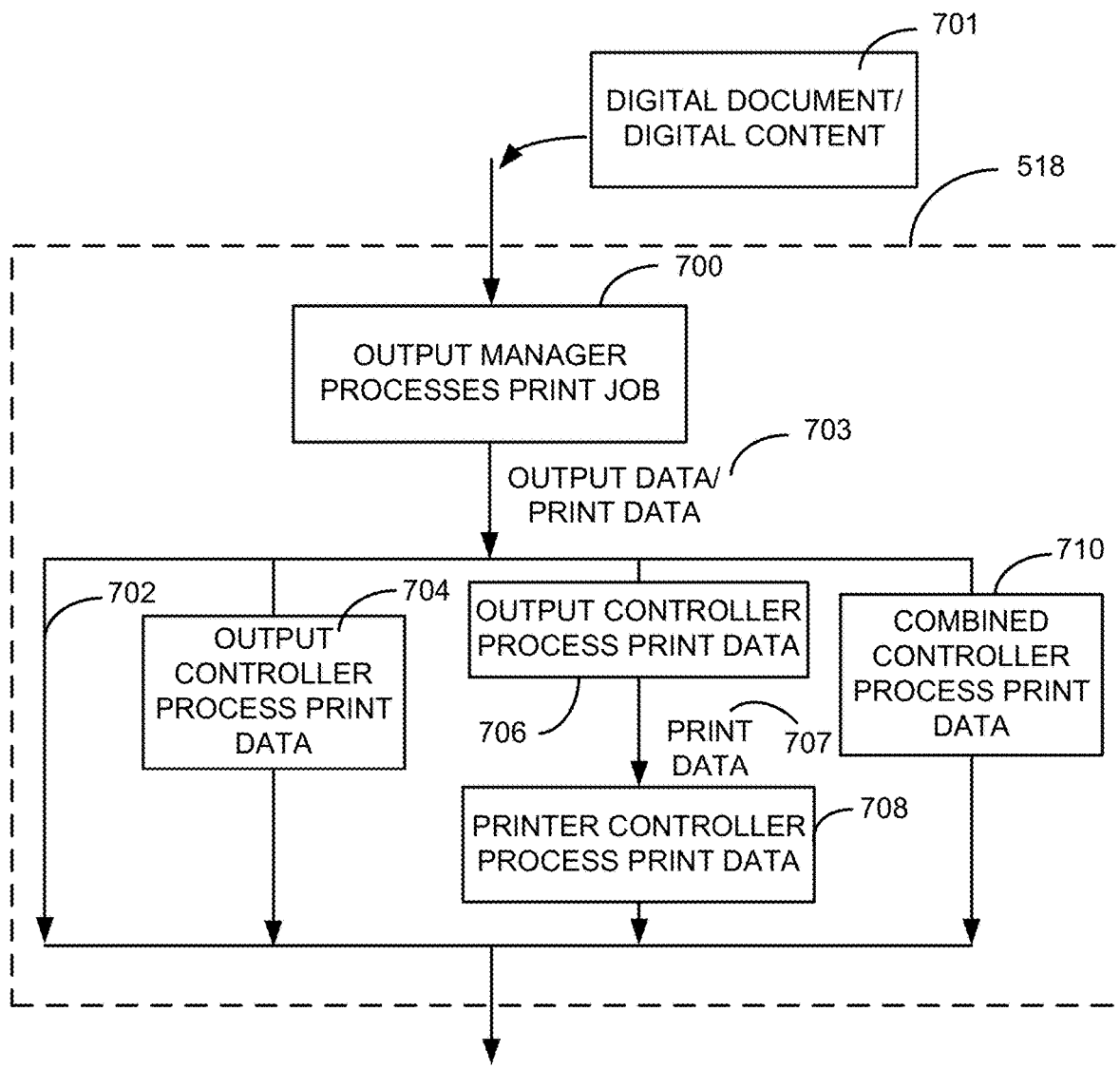
FIG. 7 is a flow diagram of different possible configuration of print job process included in the output process of FIG. 5.

FIG. 7 illustrates different processing procedures that may be implemented as part of output or print job processing step 518. For this description, output device 140 is referred to as a printer and output data is referred to as print data. It should be understood that a printer is only one embodiment of an output device. Display, projection and audio devices are also output devices within the scope of present invention. In no way should the use of printer, in place of output device, and print data, in place of output data, be viewed as restricting the scope to a printing device in the following discussion.

In step 700, output manager 308 processes an input digital document or content 701 and converts it to print data 703 that can be transmitted to output controller 120, combined controller (120C, 120F) or directly to printer engine 908. Rasterization, interpretation, encoding, decoding, etc. may take place in this step. In one implementation, print data 703 may utilize an intermediate format or language to facilitate the transmission of the digital document or content 701 to the output controller 120. This intermediate format or language may be a predefined input format or language that the output controller 120 can understand. It is also possible in this step 700 that the output manager 308 simply passes the digital document 701 in its original format to the output controller 120 with little processing. In still another exemplary implementation, the output manager 308 may process (e.g. raster image process) the digital content or document 701 into a final print data or output data format compatible to the input requirements of the output device 140. Encryption techniques may be used to assure the security of communication between information apparatus 100 and output devices 140.

As indicated above, output data or print data (in case of a printer) 703 generated by step 700 may be in various formats. In one embodiment, the print data 703 may be in a final format suitable for sending directly to the printer engine. In this case, the output controller 120 does little or no processing. One exemplary use of this configuration can be implemented in a low cost inkjet printer that does not have a printer controller. In this example, the print data 703 may be in a compressed 1 bit or more CMYK data format that can be sent directly to the printer engine 908 for final output as shown in step 702. Or print data 703 can be sent to the output controller 120 for possible optional features such as buffering, queuing, and print job management as shown in step 704.

In another embodiment, output manager 308 may generate print data 703 in an intermediate format, language, or instruction that requires further processing. Examples of such format, language or instruction may include, without limitations, Page description languages (e.g. PostScript, PCL), metafiles (e.g. EMF), markup languages (e.g. XML, HTML), image or graphics formats (TIFF, GIF, PNG, JPEG compressed), among others. The intermediate format may also include proprietary solutions in page description languages, markup languages, metafiles, image and graphics formats, encoding and decoding, compression and decompression. The above-mentioned intermediate formats may be used independently, or in combinations.

As described above with reference to FIG. 4, output controller 120 may be implemented in a variety of ways. Different implementations of output controller 120 may impact the processing procedures described here with reference to FIG. 7.

As shown in step 702, the print data 703 is sent directly to the printer or display engine 908 for final output with little or no further processing from output controller 120 or a printer controller 910. In this case, the print data or output data 703 is preferably to be in a final format or language that can be understood by the printer or display engine 908 that is part of the selected output devices or devices 140.

Alternatively, as shown in step 704, print data 703 is sent to an output controller 120 connected to or installed within a selected printer or output device 140. In one embodiment, the print data 703 may be in a final format or language that can be understood and processed by the printer or display engine 908. In this case, the output controller may buffer the input print data 703 before passing it to the printer or display engine 908 with little or no further processing. In another embodiment, print data 703 maybe in an intermediate format or language not understood by the printer 900 or output engine 908. Therefore, the output controller 120 may process the print data and convert it into a final format, language or instruction that can be sent to the printer engine (or other output engine, in the case of other type of output device).

Regardless of the format of input print data 703, the output controller 120 may perform additional management functions such as payment processing, service verification, authentication, print job management, queuing, spooling, quality of service among others.

As illustrated in step 706 and 708, the print data 703 may be processed by both output controller 120 (in step 706) and printer controller 910 (in step 708) separately before being sent to the printer engine 908 for final output. For example, some printers, such as high-speed laser printers, already include a printer controller 910 that has the capability of processing certain types of input such as PostScript, PCL, and XML, among others. In this case, the output controller 120 may process or convert the print data 703 into the input 707 required by the printer controller 910. Alternatively, in a different implementation, if the print data 703 is already in one of the formats or languages that are compatible and can be understood by the printer controller 910, the output controller 120 may simply buffer the print data 703 and sent it directly to the printer controller 910 as needed with little or no processing. In step 708, the printer controller 910 may perform functions such as interpretation, decoding, and raster image processing operations on the input print data 707 (such as a page description language) if such operations were not already performed by output controller 120 or by output manager 308. The processed result of the printer controller 910 may be sent to the printer engine 908 for final output.

As illustrated in step 710, a single combined controller 120F, 120C (as illustrated in FIGS. 4C and 4F) that combines the functionalities of output controller 120 and a printer controller 910 may process the print data. Applications that provide feature sets for each controller may share the same resources, such as processor, memory space, storage unit, etc. Under this configuration, the combined controller (120C, 120F) may further process the print data 703 in step 710 if the print data 703 is not already in the format or language required by printer engine. The combined controller (120C, 120F) may need to perform interpretation, decoding and rasterization operations in addition to converting the input print data 703 (in one or more of intermediate formats described previously) to the required format, language or instruction of the printer engine 908 for output. If the print data 703 is already in the final format, language or instruction understood by the printer engine 908, the combined controller (120C, 120F) might simply buffer the print data 703 and send it as needed to the printer engine 908 for output.

Similarly, other than processing print data, the output controller 120 and the combined controller (120C, 120F) may perform functions such as payment processing (if service charge applies); print job management, queuing, spooling, etc.

FIGS. 8A-8E show a series of exemplary graphical user interfaces (GUIs) rendered at different times on a display screen 800 of an information apparatus 100 to illustrate one implementation of the output process 501 described with reference to FIG. 5. The user interfaces shown can be implemented in an information apparatus 100 with or without an operating system. The user interfaces illustrated here are only one example, and other user interfaces may also be implemented within the scope of the present invention.

Figure 8A:
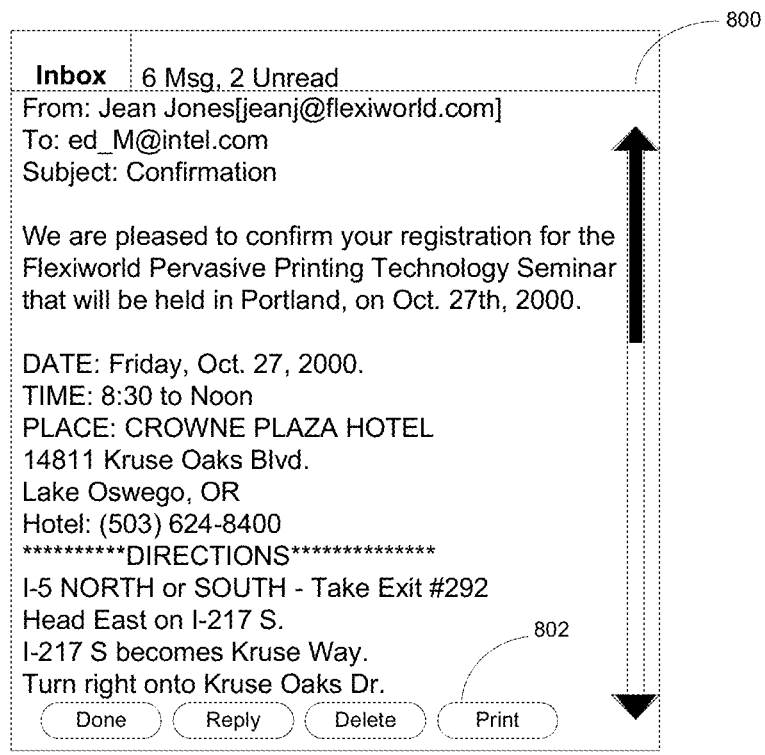
FIGS. 8A-8G show a series of graphical user interfaces (GUIs) rendered at different times on a display screen of an information apparatus.

Referring to FIG. 8A, a user receives an email on an information apparatus 100 using an email application. Functions available to the user are displayed at the bottom of the screen 800. Printing is one of the functions displayed by the "print" function control or icon 802. The user may invoke such functions by selecting the icons displayed. The user can make the selection by using, for example, any one or combination of a keyboard, keypad, mouse, stylus, soft keys, push buttons, software command, touch sensitive screen, etc. The user may also make such selection by, for example, a pull down menu, voice-activated command, etc.

As the user selects "Print" function control 802, the output process described with reference to FIG. 5 is invoked. As a result, the user is notified of all the printers, if any, available that can take the print or output job. If no available printers are detected, the user may also be notified and provided with alternatives as described with reference to steps 506 and 508 of FIG. 5.

Figure 8B:
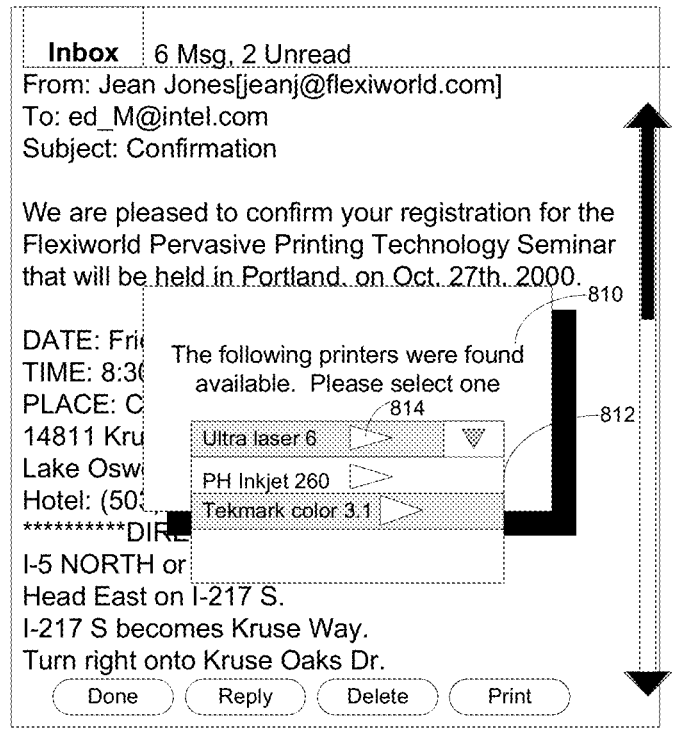

Assume in this example that three printers are found available as the result of discovery process step 502. In FIG. 8B, screen 810 informs the user of the make and model of each available printer. The user may obtain further information on each available printer by, for example, selecting a "more information" control or arrow sign 814 displayed after the name of each printer. Further information provided here may include, without limitation, service options offered by each printer, quality of services provided, service charge if any, acceptable payment method, and whether the use of such printer is restricted to a certain group.

If a printer is restricted to be used by a certain group, the user may be required to provide identification information before being able to select this printer. For example, to use a printer placed in the hallway of a company office building, a user may have to identify himself or herself as an employee of such company. Password, personal identification number or I.D. number of the information apparatus 100 may be required for authorization purposes. The identification information may be provided by the user manually or detected by the output controller 120 or output device 140 automatically. If the printer provides fee-based service, certain payment process steps may be required additionally, which are not shown in the figures for simplicity.

After the user has successfully selected the desired output device or devices in the service negotiation process 514, the information apparatus 100 may communicate with output controller 120 to identify data or software components, if any, which need to be uploaded to the information apparatus 100 to enable printing. The output manager 308 residing in the information apparatus 100 may participate in, coordinate and manage the communications between applications in the information apparatus 100 and the output controller 120.

Figure 8C:

In this particular example, as illustrated in FIG. 8C, the communication between the information apparatus 100 and the output controller 120 has identified that a printer driver needs to be uploaded as displayed on screen 820. Options are provided to the user as whether or not to continue the process. This information and selection are optional as the process may be implemented transparently to the user. Other optional information that the information apparatus 100 may provide to the user includes, for example, the estimation of time needed for the uploading.

Figure 8D:
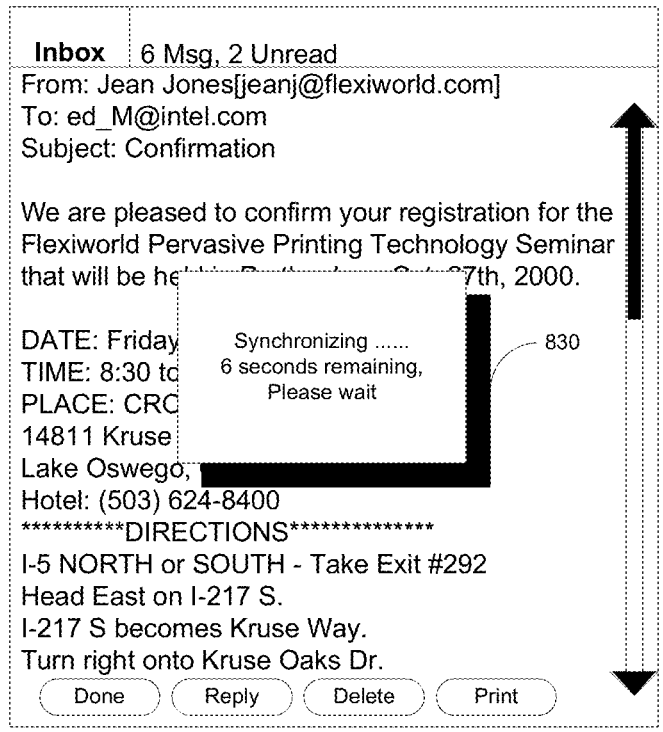

The above description gives an example of a printer driver component that may need to be uploaded. Other components and combinations may also be possible; this may include for example a partial print driver, data, software components, or a user interface. A partial print driver or component may for example include only device dependent software components and data specific to an output device. Device independent code and data of the device driver may have been previously installed in the information apparatus 100 and therefore need not be uploaded. It is also possible that no components need to be uploaded because all the components needed for printing to the selected output device 140 may already reside in the information apparatus 100. Assuming in this example that the user agrees to upload the driver, FIG. 8D illustrates an example of an interface when synchronization process 516 proceeds.

Figure 8E:
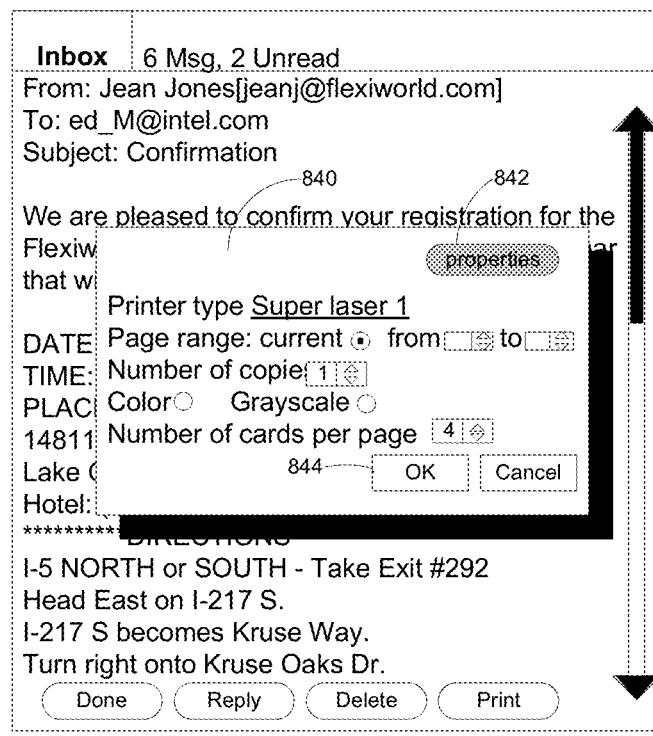

When the synchronization process 516 is completed, screen 840 is displayed to the user as shown in FIG. 8E. The user may use screen 840 to select a preference such as page range, number of copies, number of cards per page, color or grayscale, page layout parameters, etc. Selecting "property" control or button 842, the user may be provided with more device-dependent options such as color and tone adjustments, halftoning parameters, duplexing, resolution, watermarking, etc.

Figure 8F:
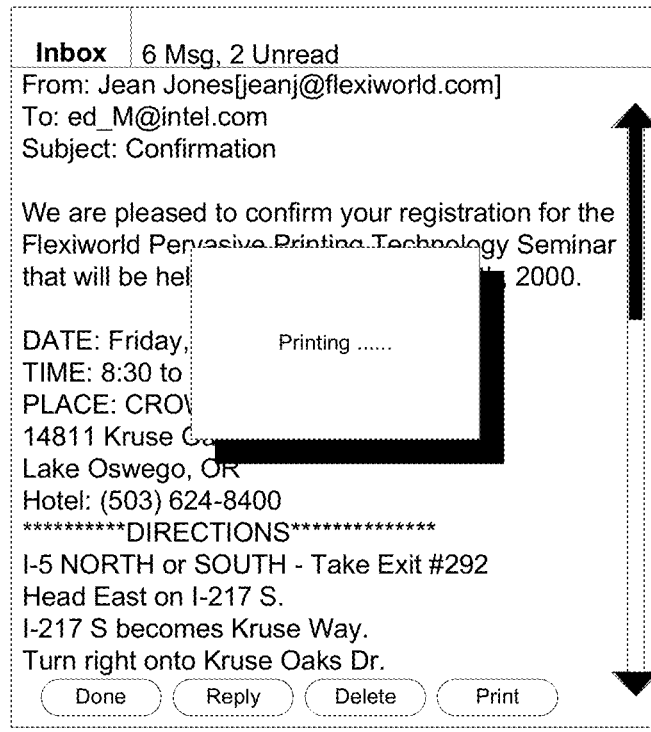
Figure 8G:
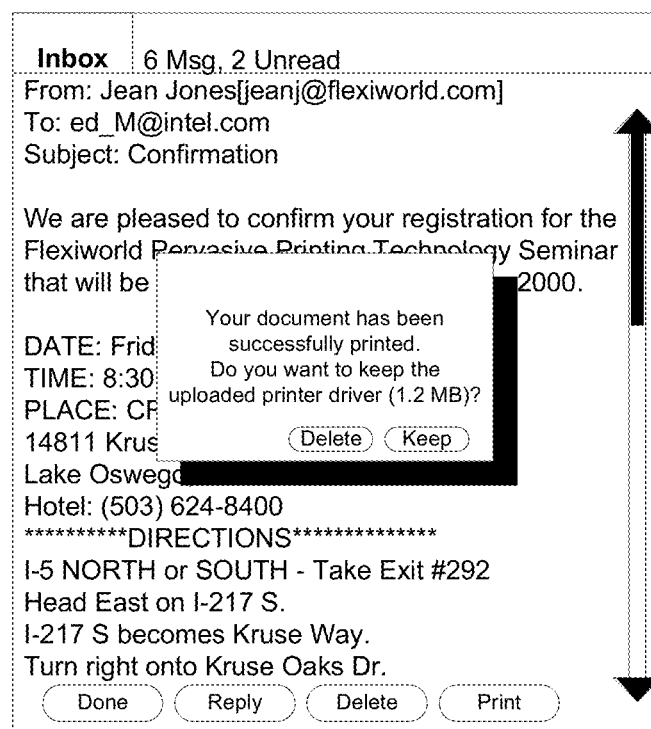

Steps 518 and 520 can proceed after the user finishes selecting any preferences. The user, after selecting the confirmation control or "OK" button 844 shown in FIG. 8E, waits to obtain the printout or other output from the printer or printers 140 selected. FIG. 8F illustrates an interface for the printing process of steps 518 and 520.

After the print job has been successfully finished, the user may be provided with an option to keep or delete the printer driver or software components or synchronized device dependent data, which was uploaded to information apparatus 100 in the earlier steps. This option may be beneficial to those mobile information apparatuses 100 with limited memory space or a casual user of that particular output device 140. A user who frequently uses a selected printer may wish to keep the printer driver, software components, or data installed so that synchronization for uploading components may be skipped when the printer is used again.

FIGS. 8A-8E illustrate only one example of the output process shown in FIG. 5. While the above descriptions contain much specificity, these should not be construed as limitations on the scope of the invention, but rather as exemplary embodiment thereof. Other user interfaces and embodiments may also be implemented. The process may also be implemented with more or fewer steps. As an example, security verification, authentication, and payment processing may be added to steps illustrated in FIGS. 8A-8E. As another example, the step illustrated by FIG. 8C may be skipped as the loading process proceeds automatically when the user selects a desired printer or printers. These and other possible variations do not however depart from the scope of present invention.

Accordingly, the scope of the invention should be determined not by the embodiments illustrated, but by the appended claims and their legal equivalents.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto.

What is claimed is:

1. An information apparatus supporting a touch sensitive screen interface for interacting with a user, the information apparatus being a mobile and wireless information apparatus, and the information apparatus including one or more applications that are installed or preinstalled in the information apparatus, the one or more applications having access to digital content, and the one or more applications include at least one of an e-mail application, a messaging application, a digital imaging application, an audio application, a video application, a document creation application, or an Internet browsing application, individually or in any combination; and wherein the information apparatus further including:

operating system software supporting an object model or an application programming interface (API) to facilitate at least one of said e-mail application, said messaging application, said audio application, said video application, said digital imaging application, said document creation application, or said Internet browsing application interfacing with device management applications in the information apparatus;

a touch sensitive screen, one or more processors, memory or storage for storing at least a portion of the digital content accessed by the one or more applications, and wireless communication circuitry that includes one or more wireless communication units for wireless communication, the one or more wireless communication units being compatible with at least a protocol within IEEE 802.11 wireless standards, the wireless communication circuitry being operable to:

(a) couple the information apparatus, using the one or more wireless communication units included in the wireless communication circuitry of the information apparatus, to a wireless local area network, the coupling to the wireless local area network includes establishing a wireless communication link that is compatible with at least a protocol within IEEE 802.11 wireless standards;

(b) wirelessly connect, using the wireless communication circuitry of the information apparatus and over the wireless local area network coupled in (a), by the one or more applications of the information apparatus to one or more servers over a network for accessing the digital content; and wherein the one or more applications include at least the e-mail application and the e-mail application includes:

a graphical user interface, provided by the e-mail application and over the touch sensitive screen of the information apparatus, that includes at least an inbox, a reply function control or item displayed on the touch sensitive screen of the information apparatus, provided by the e-mail application, for user selection over the touch sensitive screen for replying to an e-mail, and the information apparatus being further operable to:

(1) receive, by the e-mail application, using the wireless communication circuitry of the information apparatus and over the wireless communication link established in (a), one or more emails, the one or more emails being available in the inbox;

(2) display, by the e-mail application and over the touch sensitive screen of the information apparatus, content of an email from among the one or more emails received by the e-mail application in (1);

(3) receive, using the touch sensitive screen of the information apparatus, an input from the user to scroll down or up the content of the email displayed on the touch sensitive screen in (2);

(4) receive from the user, using the touch sensitive screen of the information apparatus, selection of the reply function control or item, which is provided by the e-mail application and displayed on the touch sensitive screen of the information apparatus, for replying to the email, which is displayed in (2), from among the one or more emails received by the e-mail application in (1);

(5) wirelessly discover, using the wireless communication circuitry of the information apparatus, a wireless output device; and (6) wirelessly output, using the wireless communication circuitry of the information apparatus, from the information apparatus, and to the wireless output device wirelessly discovered in (5), at least part of the email, which is displayed in (2), from among the one or more emails that are received in (1); and wherein the information apparatus is a mobile and wireless information apparatus that is at least one of a smart phone, an information pad, a digital pad or an e-book, individually or in any combination, and the information apparatus is neither a stationary computer nor a desktop computer, and the information apparatus is operable to further allow the user to install additional applications for running on the operating system software to further expand functionalities of the information apparatus.

2. The information apparatus of claim 1, wherein the information apparatus is further operable to:

wirelessly establish, using the wireless communication circuitry of the information apparatus, radio frequency wireless communication between the information apparatus and one or more wireless output devices that are available in the wireless local area network coupled in (a), the one or more wireless output devices being distinct devices from the information apparatus;

receive, via the touch sensitive screen of the information apparatus, an input from the user to wirelessly transmit or output at least part of the digital content from the information apparatus to the one or more wireless output devices that are available in the wireless local area network coupled in (a);

pass, at the information apparatus, the at least part of the digital content, from at least one of said e-mail application, said digital imaging application, said audio application, said video application, said messaging application, said document creation application, or said Internet browsing application, individually or in any combination, to an output manager included in the information apparatus for wireless transmission or output of the at least part of the digital content from the information apparatus to the one or more wireless output devices, the passing of the at least part of the digital content being facilitated, at least in part, by the object model or the application programming interface (API) supported by the operating system software included in the information apparatus; and wirelessly transmit or output, by the information apparatus and using the wireless communication circuitry of the information apparatus and over the wireless local area network coupled in (a), output data, related, at least in part, to the digital content, to the one or more wireless output devices for output of the at least part of the digital content accessed by the one or more applications of the information apparatus.

3. The information apparatus of claim 1, further comprising:

a microphone interface;

a speaker for outputting sound; and a voice activated command function for receiving voice commands from the user using the microphone interface, and wherein the e-mail application in the information apparatus is further operable to receive from the user, using the voice activated command function of the information apparatus, a request to reply to an email from among the one or more emails received by the e-mail application in (1); and wherein the information apparatus is operable to support voice activated commands from the user to reply to the email.

4. The information apparatus of claim 1, wherein the information apparatus is further operable to:
provide to the user, via the touch sensitive screen of the information apparatus, one or more items related to one or more wireless output devices for selection by the user, the one or more wireless output devices being available for wirelessly outputting or playing at least part of the digital content;
receive, via the touch sensitive screen of the information apparatus, selection of an item from the user, the item is related to a selected wireless output device from among the one or more items, the one or more items being related to the one or more wireless output devices and being provided on the touch sensitive screen for the user selection; and
establish, using the wireless communication circuitry of the information apparatus, a radio frequency wireless connection between the information apparatus and the selected wireless output device to wirelessly transfer the at least part of the digital content to the selected wireless output device, wherein the selected wireless output device is at least one of a television, a display device, an audio output device, a printer, an output controller externally connectable to a television device, or a projector, individually or in any combination; and
wherein the wireless output of at least part of the email in (6) from the information apparatus to the wireless output device is subsequent to the information apparatus having received, using the touch sensitive screen of the information apparatus, the selection of the item related to the wireless output device.

5. The information apparatus of claim 4, wherein the wireless communication circuitry of the information apparatus includes one or more chips or chipsets, the one or more chips or chipsets are compatible, at least partly, with at least a protocol within IEEE 802.11 wireless standards or Bluetooth specifications for establishing the radio frequency wireless connection; and wherein the wireless discovery of the wireless output device by the information apparatus in (5) is by using the one or more chips or chipsets of the information apparatus; and wherein the wireless output of the at least part of the email by the information apparatus in (6) is by using the one or more chips or chipsets of the information apparatus.

6. The information apparatus of claim 4, wherein the information apparatus is further operable to:
obtain, by the information apparatus, authentication information or security information; and
wherein based, at least in part, on the information apparatus having successfully obtained the authentication information or the security information, the information apparatus is further operable to enable the information apparatus to wirelessly discover or wirelessly access services provided by the selected wireless output device.

7. The information apparatus of claim 1, wherein the information apparatus is enabled to wirelessly output at least part of the email in (6) from the information apparatus to the wireless output device without using a stationary computer to transfer or synchronize the email with the stationary computer such that the stationary computer can output the email.

8. A method of managing e-mails from an information apparatus, the information apparatus being a mobile and wireless computing device and supporting a touch sensitive screen interface for interacting with a user, and the information apparatus comprising:
a touch sensitive screen,
one or more processors,
memory or storage, and
wireless communication circuitry that includes a radio frequency link controller and an antenna for establishing radio frequency wireless communication, the wireless communication circuitry includes one or more wireless communication units that are compatible with at least a protocol within IEEE 802.11 wireless standards; and
wherein the information apparatus further including:
one or more applications, stored at least partly in the memory or the storage of the information apparatus, the one or more applications with access to digital content and include at least one of an e-mail application, a messaging application, a digital imaging application, an audio application, a video application, a document creation application, or an Internet browsing application, individually or in any combination; and
operating system software in the information apparatus, the operating system software allowing the user to install additional applications in the information apparatus that are implemented for running on the operating system software to further expand functionalities of the information apparatus, and the operating system software supporting an object model or an application programming interface (API) to facilitate operation of at least one of said e-mail application, said messaging application, said audio application, said video application, said digital imaging application, said document creation application, or said Internet browsing application interfacing with device management applications in the information apparatus; and
wherein the one or more applications include at least the e-mail application, and the e-mail application including:
a graphical user interface, provided by the e-mail application and over the touch sensitive screen of the information apparatus, the graphical user interface including:
an inbox showing one or more messages,
a reply function control or reply item displayed on the touch sensitive screen of the information apparatus, provided by the e-mail application, for user selection over the touch sensitive screen for replying to an e-mail, and
a delete function control or delete item displayed on the touch sensitive screen of the information apparatus, provided by the e-mail application, for user selection over the touch sensitive screen for deleting an e-mail; and
wherein the method comprising:
(1) in coupling the information apparatus, using the wireless communication circuitry of the information apparatus, to a wireless local area network for accessing one or more servers over a network;
(2) receiving, by the e-mail application and using the wireless communication circuitry of the information apparatus and over the wireless local area network coupled in (1), one or more e-mails;

(3) showing, on the touch sensitive screen of the information apparatus, availability of the one or more e-mails that are received in (2), in the inbox of the e-mail application;
(4) displaying, on the touch sensitive screen of the information apparatus, content of an e-mail from among the one or more e-mails that are shown to be available in the inbox in (3);
(5) receiving from the user, via the touch sensitive screen of the information apparatus, an indication of scrolling up or down the content of the e-mail displayed on the touch sensitive screen of the information apparatus in (4);
(6) receiving from the user, via the touch sensitive screen of the information apparatus, a selection of the reply function control or the reply item displayed on the graphical user interface of the information apparatus, provided by the e-mail application, for replying to the e-mail displayed on the touch sensitive screen of the information apparatus in (4);
(7) wirelessly discover, by the information apparatus and using the wireless communication circuitry of the information apparatus, a wireless output device; and
(8) wirelessly output, using the wireless communication circuitry of the information apparatus, from the information apparatus, and to the wireless output device wirelessly discovered in (7), at least part of the e-mail, which is displayed in (4), from among the one or more e-mails received in (2); and
wherein the information apparatus is operable to reply at least to the e-mail displayed in (4), from among the one or more e-mails received by the e-mail application in (2), via a selection of the reply function control or the reply item displayed on the touch sensitive screen of the information apparatus; and
wherein the method further comprises receiving from the user, via the touch sensitive screen of the information apparatus, a selection of the delete function control or the delete item displayed on the graphical user interface, which is provided by the e-mail application, for deleting at least one e-mail from among the one or more e-mails received by the e-mail application in (2); and
wherein the information apparatus is at least one of a smart phone, an information pad, a digital pad or an e-book, individually or in any combination, and the information apparatus is neither a stationary computer nor a desktop computer.

9. The method of claim 8, wherein the information apparatus further includes a microphone interface, a speaker for outputting sound, and a voice activated command function for receiving voice commands from the user via the microphone interface, and wherein the method further comprises:
receiving, from the user and via the voice activated command function of the information apparatus, a request to reply to an e-mail from among the one or more e-mails received by the e-mail application in (2), and wherein the information apparatus is operable to support voice activated commands from the user to reply to an e-mail.

10. The method of claim 9, further comprising:
providing, on the touch sensitive screen of the information apparatus, one or more items that are related to one or more wireless output devices that are available in the wireless local area network coupled in (1), the one or more wireless output devices being distinct devices from the information apparatus;
receiving, from the user and via the touch sensitive screen of the information apparatus, selection of an item related to a selected wireless output device from among the one or more items that are provided on the touch sensitive screen of the information apparatus for the user selection; and
wirelessly transferring, by the information apparatus using the wireless communication circuitry of the information apparatus, over the wireless local area network coupled in (1) and to the selected wireless output device, at least part of the digital content that includes, at least partly, the e-mail, which is displayed in (4), from among the one or more e-mails received in (2).

11. The method of claim 8, further comprising:
passing, by the e-mail application, at least part of the digital content, accessed by the e-mail application at the information apparatus, to an output manager in the information apparatus, for managing wireless transfer of the at least part of the digital content from the information apparatus to one or more wireless output devices, the passing of the at least part of the digital content being facilitated, at least in part, by the application programming interface (API) provided by the operating system software included in the information apparatus, wherein the one or more wireless output devices are separate devices from the information apparatus.

12. The method of claim 11, wherein the wireless communication circuitry of the information apparatus includes one or more chips or chipsets, and wherein the one or more chips or chipsets are compatible, at least partly, with at least a protocol within IEEE 802.11 wireless standards or Bluetooth specifications for establishing radio frequency wireless communication with one or more wireless output devices, the radio frequency wireless communication being at least one of a short range wireless communication or a wireless local area network communication, and
wherein the coupling of the information apparatus to the wireless local area network in (1) uses, at least in part, a chip or chipset included in the wireless communication circuitry that is compatible, at least partly, with a protocol within IEEE 802.11 wireless standards.

13. The method of claim 12, further comprising:
wirelessly discovering, by the information apparatus using the wireless communication circuitry of the information apparatus and over the radio frequency wireless communication, the one or more wireless output devices that are available in the wireless local area network coupled in (1) for service;
providing to the user, via the touch sensitive screen of the information apparatus, one or more items, related to the one or more wireless output devices that are wirelessly discovered by the information apparatus, for selection by the user, the one or more wireless output devices being available for outputting or playing at least part of the digital content;
receiving, from the user via the touch sensitive screen of the information apparatus, a selection of an item related to a selected wireless output device from among the one or more items that are provided to the user for the user selection; and
establishing, using the wireless communication circuitry of the information apparatus, a radio frequency wireless connection between the information apparatus and the selected wireless output device for wireless transfer of the at least part of the digital content from the information apparatus to the selected wireless output device, wherein the selected wireless output device is at least one of a television, a display device, an audio output device, a printer, an output controller externally connectable to a television device, or a projector, individually or in any combination.

14. The method of claim 13, further comprising:
obtaining, at the information apparatus, authentication information or security information; and
enabling the information apparatus to wirelessly discover or wirelessly access the service provided by the selected wireless output device based, at least in part, on the information apparatus having successfully obtained the authentication information or the security information.

15. A non-transitory computer readable recording medium having recorded therein software or firmware executable by one or more processors at an information apparatus for managing e-mails at the information apparatus, the information apparatus supporting a touch sensitive screen interface for interacting with a user, the information apparatus being a mobile and wireless information apparatus, and the information apparatus including one or more applications that are either installed or pre-installed, the one or more applications including:
an e-mail application,
a messaging application,
a digital imaging application,
an audio application,
a video application,
a document creation application,
an Internet browsing application; and
operating system software supporting an application programming interface (API) to facilitate at least one of said e-mail application, said messaging application, said audio application, said video application, said digital imaging application, said document creation application, or said Internet browsing application interfacing with device management applications in the information apparatus, and
wherein the information apparatus is operable to allow the user to install additional applications for running on the operating system software to further expand functionalities of the information apparatus, the information apparatus further including at least:
a touch sensitive screen,
memory or storage for storing at least a portion of digital content, and
wireless communication circuitry that includes one or more wireless communication units for wireless communication, at least one wireless communication unit of the one or more wireless communication units being compatible, at least partly, with at least a protocol within IEEE 802.11 wireless standards, the wireless communication circuitry being operable for coupling the information apparatus, using the at least one wireless communication unit, to a wireless local area network, the coupling to the wireless local area network includes establishing a wireless communication link that is compatible with at least a protocol within IEEE 802.11 wireless standards; and
wherein the e-mail application including:
a graphical user interface, provided by the e-mail application and over the touch sensitive screen of the information apparatus, that includes an inbox;
a done function control or done item displayed on the graphical user interface, provided by the e-mail application, for user selection over the touch sensitive screen of the information apparatus;
a reply function control or reply item displayed on the graphical user interface, provided by the e-mail application, for user selection over the touch sensitive screen of the information apparatus for replying to an e-mail; and
a delete function control or delete item displayed on the graphical user interface, provided by the e-mail application, for user selection over the touch sensitive screen of the information apparatus for deleting an e-mail; and
wherein execution of the software or the firmware, by the one or more processors of the information apparatus, causes the information apparatus to:
(1) receive, by the e-mail application and using the wireless communication circuitry of the information apparatus, and over the established wireless communication link, one or more e-mails;
(2) display, on the touch sensitive screen of the information apparatus, content of at least an e-mail from among the one or more e-mails received by the e-mail application in (1);
(3) receive from the user, via the touch sensitive screen of the information apparatus, an indication of scrolling up or down the content of the e-mail displayed on the touch sensitive screen of the information apparatus in (2);
(4) receive from the user, via the touch sensitive screen of the information apparatus, selection of the delete function control or the delete item displayed on the graphical user interface, provided by the e-mail application, for deleting at least one e-mail from among the one or more e-mails received by the e-mail application in (1);
(5) receive from the user, via the touch sensitive screen of the information apparatus, selection of the done function control or the done item displayed on the graphical user interface, provided by the e-mail application;
(6) receive from the user, via the touch sensitive screen of the information apparatus, selection of the reply function control or the reply item displayed on the graphical user interface, provided by the e-mail application, for replying to an e-mail from among the one or more e-mails received by the email application in (1);
(7) wirelessly discover, using the wireless communication circuitry of the information apparatus, a wireless output device; and
(8) wirelessly output, using the wireless communication circuitry of the information apparatus, from the information apparatus, and to the wireless output device wirelessly discovered in (7), at least part of the e-mail, which is displayed in (2), from among the one or more e-mails that are received in (1); and
wherein the software or the firmware is executable by the one or more processors of the information apparatus to initiate the reply to the e-mail in response to the selection of the reply function control or the reply item in (6), displayed on the graphical user interface, provided by the e-mail application on the touch sensitive screen of the information apparatus; and
wherein the information apparatus is at least one of a smart phone, an information pad, a digital pad or an e-book, individually or in any combination.

16. The non-transitory computer readable recording medium of claim 15, wherein execution of the software or the firmware, by the one or more processors of the information apparatus, causes the information apparatus to:

pass, by the e-mail application at the information apparatus, at least part of the digital content accessed by the e-mail application, from the e-mail application to an output manager included in the information apparatus, the passing of the at least part of the digital content being facilitated, at least in part, by the application programming interface (API) provided by the operating system software included in the information apparatus; and wirelessly transfer, via the output manager included in the information apparatus and using the wireless communication circuitry of the information apparatus, the at least part of the digital content accessed by the e-mail application, to one or more wireless output devices, the one or more wireless output devices being distinct devices from the information apparatus, and wherein the information apparatus is neither a stationary computer nor a desktop computer, and wherein the information apparatus is enabled to wirelessly output at least part of the e-mail in (8) from the information apparatus to the wireless output device without using a stationary computer to transfer or synchronize the e-mail with the stationary computer such that the stationary computer can output the e-mail.

17. The non-transitory computer readable recording medium of claim 15, wherein the information apparatus further includes:

a microphone interface, a speaker for outputting sound, and a voice activated command function for receiving voice commands from the user over the microphone interface, and wherein execution of the software or the firmware, by the one or more processors of the information apparatus, causes the information apparatus to receive from the user, via the microphone interface and using the voice activated command function of the information apparatus, a request to reply to an e-mail, and wherein the information apparatus supports voice activated commands from the user to reply to the e-mail.

18. The non-transitory computer readable recording medium of claim 16, wherein execution of the software or the firmware, by the one or more processors of the information apparatus, causes the information apparatus to:

interact with the user, via an interface that includes a voice activated command function, and wherein the interaction includes showing an e-mail from the inbox over the touch sensitive screen of the information apparatus to the user.

19. The non-transitory computer readable recording medium of claim 15, wherein at least one wireless communication unit of the one or more wireless communication units of the information apparatus, is compatible, at least partly, with at least a protocol within IEEE 802.11 wireless standards or Bluetooth specifications for establishing the wireless communication link; and wherein execution of the software or the firmware, by the one or more processors of the information apparatus, causes the information apparatus to:

obtain, at the information apparatus, authentication information or security information; and wirelessly discover or wirelessly access, using the at least one wireless communication unit of the information apparatus, services provided by one or more wireless output devices based, at least in part, on the information apparatus having successfully obtained the authentication information or the security information at the information apparatus, the one or more wireless output devices being distinct devices from the information apparatus.

20. The non-transitory computer readable recording medium of claim 19, wherein execution of the software or the firmware, by the one or more processors of the information apparatus, causes the information apparatus to:

provide to the user, via the touch sensitive screen of the information apparatus, one or more items related to the one or more wireless output devices for selection by the user, the one or more wireless output devices being available for outputting or playing digital content, accessed by the one or more applications, from the information apparatus;

receive, from the user via the touch sensitive screen of the information apparatus, a selection of an item related to a selected wireless output device from among the one or more items that are provided to the user for the user selection; and wirelessly transfer, using the at least one wireless communication unit of the wireless communication circuitry of the information apparatus, at least part of the digital content, accessed by the one or more applications, from the information apparatus to the selected wireless output device; and wherein the selected wireless output device is at least one of a television, a display device, an audio output device, a printer, an output controller externally connectable to a television device, or a projector, individually or in any combination.

* * * * *